US012262035B2

(12) United States Patent
Skupin et al.

(10) Patent No.: US 12,262,035 B2
(45) Date of Patent: *Mar. 25, 2025

(54) CONCEPT FOR PICTURE/VIDEO DATA STREAMS ALLOWING EFFICIENT REDUCIBILITY OR EFFICIENT RANDOM ACCESS

(71) Applicant: Fraunhofer-Gesellschaft zur Foerderung der angewandten Forschung e.V., Munich (DE)

(72) Inventors: Robert Skupin, Berlin (DE); Yago Sánchez De La Fuente, Berlin (DE); Thomas Schierl, Berlin (DE); Cornelius Hellge, Berlin (DE); Karsten Grueneberg, Berlin (DE); Thomas Wiegand, Berlin (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/665,493

(22) Filed: May 15, 2024

(65) Prior Publication Data
US 2024/0305798 A1    Sep. 12, 2024

Related U.S. Application Data

(63) Continuation of application No. 18/359,202, filed on Jul. 26, 2023, which is a continuation of application (Continued)

(30) Foreign Application Priority Data

Feb. 9, 2016 (EP) .................................. 16154947

(51) Int. Cl.
H04N 19/33        (2014.01)
H04N 19/119       (2014.01)
(Continued)

(52) U.S. Cl.
CPC ........... *H04N 19/33* (2014.11); *H04N 19/119* (2014.11); *H04N 19/132* (2014.11);
(Continued)

(58) Field of Classification Search
CPC .... H04N 19/33; H04N 19/119; H04N 19/132; H04N 19/146; H04N 19/167
See application file for complete search history.

(56) References Cited

U.S. PATENT DOCUMENTS 6,141,034 A    10/2000  Mccutchen
6,259,826 B1    7/2001  Pollard et al.
(Continued)

FOREIGN PATENT DOCUMENTS

CN    1774934 A    5/2006
CN    1781316 A    5/2006
(Continued)

OTHER PUBLICATIONS

Giovanni Ballocca: "Requirements for Frame Compatible Format", 104. MPEG Meeting; Apr. 24, 2013, Incheon; Motion Picture Expert Group or ISO/IEC JTC1/SC29/WG11, No. m29229, XP030057761, Apr. 24, 2013.
(Continued)

*Primary Examiner* — On S Mung
(74) *Attorney, Agent, or Firm* — Perkins Coie LLP; Michael A. Glenn

(57) ABSTRACT

A video data stream is rendered reducible in a manner so that the reduction leads to a restriction of pictures of the reduced video data stream to merely a predetermined subarea of the pictures of the original video data stream and in a manner so
(Continued)

that transcoding, such as re-quantization, may be avoided and a conformance of the reduced video data stream relative to the codec underlying the original video data stream be maintained. This is achieved by providing the video data stream with information including an indication of the predetermined subarea and replacement indices for redirecting the indices included by the payload portion so as to refer to, and/or replacement parameters for adjusting the first set of coding parameter settings so as to result in, a second set of coding parameter settings.

2 Claims, 28 Drawing Sheets

Related U.S. Application Data

No. 17/122,753, filed on Dec. 15, 2020, now Pat. No. 11,770,546, which is a continuation of application No. 16/118,146, filed on Aug. 30, 2018, now Pat. No. 10,958,921, which is a continuation of application No. PCT/EP2017/052769, filed on Feb. 8, 2017.

(51) Int. Cl.
*H04N 19/132* (2014.01)
*H04N 19/146* (2014.01)
*H04N 19/167* (2014.01)
*H04N 19/174* (2014.01)
*H04N 19/34* (2014.01)
*H04N 19/46* (2014.01)
*H04N 19/70* (2014.01)
*H04N 19/88* (2014.01)

(52) U.S. Cl.
CPC ......... *H04N 19/146* (2014.11); *H04N 19/167* (2014.11); *H04N 19/174* (2014.11); *H04N 19/34* (2014.11); *H04N 19/46* (2014.11); *H04N 19/70* (2014.11); *H04N 19/88* (2014.11)

(56) References Cited

U.S. PATENT DOCUMENTS

| | | |
|---|---|---|
| 7,588,314 B1 | 9/2009 | Nisnevich et al. |
| 10,244,252 B2 | 3/2019 | Lim et al. |
| 10,958,921 B2 | 3/2021 | Skupin et al. |
| 2003/0095338 A1 | 5/2003 | Singh et al. |
| 2004/0008766 A1 | 1/2004 | Wang et al. |
| 2004/0239763 A1 | 12/2004 | Notea et al. |
| 2005/0190774 A1 | 9/2005 | Wiegand |
| 2006/0115001 A1 | 6/2006 | Wang et al. |
| 2006/0239353 A1 | 10/2006 | De et al. |
| 2006/0250505 A1 | 11/2006 | Gennetten et al. |
| 2007/0041611 A1 | 2/2007 | Hersch et al. |
| 2007/0154072 A1 | 7/2007 | Taraba et al. |
| 2009/0041130 A1 | 2/2009 | Yoon et al. |
| 2009/0074070 A1 | 3/2009 | Mn et al. |
| 2009/0290009 A1 | 11/2009 | Suzuki et al. |
| 2010/0046803 A1 | 2/2010 | Tomita |
| 2010/0128801 A1 | 5/2010 | Hashimoto |
| 2010/0169349 A1 | 7/2010 | Zou et al. |
| 2010/0253793 A1 | 10/2010 | Auberger et al. |
| 2012/0013748 A1 | 1/2012 | Stanwood et al. |
| 2012/0033731 A1 | 2/2012 | Yamamoto et al. |
| 2012/0195356 A1 | 8/2012 | Yi et al. |
| 2012/0265901 A1 | 10/2012 | Swenson et al. |
| 2013/0076855 A1 | 3/2013 | Miyamoto et al. |
| 2013/0114694 A1 | 5/2013 | Chen et al. |
| 2013/0294499 A1 | 11/2013 | Wang |
| 2013/0294500 A1 | 11/2013 | Wang |
| 2013/0308708 A1 | 11/2013 | Sugio et al. |
| 2014/0022240 A1 | 1/2014 | Lee et al. |
| 2014/0086328 A1 | 3/2014 | Chen et al. |
| 2014/0092964 A1 | 4/2014 | Ugur et al. |
| 2014/0301464 A1 | 10/2014 | Wu et al. |
| 2014/0301479 A1 | 10/2014 | Pandit et al. |
| 2014/0348235 A1 | 11/2014 | Yamamoto et al. |
| 2014/0362173 A1 | 12/2014 | Doepke et al. |
| 2015/0003513 A1 | 1/2015 | Hashimoto et al. |
| 2015/0023405 A1 | 1/2015 | Joshi et al. |
| 2015/0103926 A1 | 4/2015 | Hannuksela |
| 2015/0110192 A1 | 4/2015 | Wang et al. |
| 2015/0156501 A1 | 6/2015 | Hannuksela |
| 2015/0189298 A1 | 7/2015 | Ye et al. |
| 2015/0195577 A1 | 7/2015 | Hannuksela |
| 2015/0264404 A1 | 9/2015 | Hannuksela |
| 2015/0304667 A1 | 10/2015 | Suehring et al. |
| 2015/0341552 A1 | 11/2015 | Chen et al. |
| 2016/0005435 A1 | 1/2016 | Campbell et al. |
| 2016/0100187 A1 | 4/2016 | Lee et al. |
| 2016/0100189 A1 | 4/2016 | Pang et al. |
| 2016/0105670 A1 | 4/2016 | Pang et al. |
| 2016/0337668 A1 | 11/2016 | Le Leannec et al. |
| 2017/0118540 A1 | 4/2017 | Thomas et al. |
| 2017/0142442 A1 | 5/2017 | Tsukuba et al. |
| 2017/0155912 A1 | 6/2017 | Thomas et al. |
| 2017/0200255 A1 | 7/2017 | Lin et al. |
| 2018/0005343 A1 | 1/2018 | Rhoads et al. |
| 2018/0041762 A1 | 2/2018 | Ikai et al. |
| 2018/0098091 A1 | 4/2018 | Wiegand et al. |
| 2018/0176601 A1 | 6/2018 | Jeong et al. |
| 2018/0234697 A1 | 8/2018 | Jang et al. |
| 2018/0249192 A1 | 8/2018 | Denoual et al. |
| 2019/0014337 A1 | 1/2019 | Skupin et al. |
| 2019/0020884 A1 | 1/2019 | Skupin et al. |
| 2019/0068985 A1 | 2/2019 | Yamamoto et al. |
| 2019/0253734 A1 | 8/2019 | Lee et al. |
| 2019/0297326 A1 | 9/2019 | Reda et al. |
| 2020/0045329 A1 | 2/2020 | Hashimoto et al. |
| 2020/0128252 A1 | 4/2020 | Fu et al. |
| 2020/0204829 A1 | 6/2020 | Stepin et al. |
| 2020/0221104 A1 | 7/2020 | Deshpande |
| 2020/0275129 A1 | 8/2020 | Deshpande |
| 2021/0211695 A1 | 7/2021 | Skupin et al. |

FOREIGN PATENT DOCUMENTS

| | | |
|---|---|---|
| CN | 101160975 A | 4/2008 |
| CN | 101636761 A | 1/2010 |
| CN | 101656822 A | 2/2010 |
| CN | 102209241 A | 10/2011 |
| CN | 103546737 A | 1/2014 |
| CN | 104813660 A | 7/2015 |
| CN | 105144720 A | 12/2015 |
| JP | H11346370 A | 12/1999 |
| JP | 2008005531 A | 1/2008 |
| JP | 2011120305 A | 6/2011 |
| JP | 5729237 B2 | 4/2015 |
| KR | 20180111969 A | 10/2018 |
| KR | 20210019137 A | 2/2021 |
| KR | 20210019597 A | 2/2021 |
| KR | 20210034127 A | 3/2021 |
| TW | 201524192 A | 6/2015 |
| WO | 2011128366 A1 | 10/2011 |
| WO | 2014001573 A1 | 1/2014 |
| WO | 2015059194 A1 | 4/2015 |

OTHER PUBLICATIONS

Auyeung, Cheung, , HLS: Non-significant slice segments with tiles for single layer HEVC extensions, JCTVC-No. 269_r1. docx[online], Jul. 25, 2013, http://phenix.int-evry.fr/jct/doc_end_user/documents/14_Vienna/wg11/JCTVC-NO269-v2.zip, Jul. 25, 2013, 7 pages.
Ballocca, Giovanni, et al., "Rectangular Region Frame Packing Arrangement, Joint Collaborative Team on Video Coding", (JCT-VC) of ITU-T SG16 WP3 and ISO/IEC JTC1/SC29/WG11, JCTVC-Q0256_r1, Apr. 3, 2014.
Hattori, Sally, et al., "HLS: Extensions to Temporal Motion-Constrained Tile Sets SEI Message", JCTVC-O0063; Joint Collab-

(56) References Cited

OTHER PUBLICATIONS orative Team on Video Coding (JCT-VC) of ITU-T SG 16 WP 3 and ISO/IEC JTC 1/SC 29/WG 11 15th Meeting: Geneva, CH, Oct. 23-Nov. 1, 2013, 1-3.

Stockhammer, Thomas, "Dynamic Adaptive Streaming over HTTP—Standards and Design Principles", In Proceedings of the ACM Multimedia Systems (MMSys11), San Jose, California, USA, pp. 133-143.

Tokumo, Yasuaki, et al., "DASH: Signaling Tile Encapsulation Modes", 108, MPEG meeting, Mar. 31-Apr. 4, 2014, No. M33111, Mar. 26, 2014, ISO/IEC JTC1/SC29/WG11, MPEG2014/NiLU111, 6 pages.

Wu, Yongjun, et al., "Motion-constrained tile sets SEI message", JCTVC-M0235, Joint Collaborative Team on Video Coding (JCT-VC) of ITU-T SG 16 WP 3 and ISO/IEC JTC1/SC 29/WG 11, 13th Meeting: Incheon, KR, Apr. 18-26, 2013, v. 2.

Wu, Yongjun, et al., "Motion-Constrained Title Sets SEI Message", Document: JCTVC-M0235 (v.1); Joint Collaborative Team on Video Coding (JCT-VC) of ITU-T SG 16 WP 3 and ISO/IEC JTC 1/SC 29/WG 11 13th Meeting: Incheon, KR, Apr. 18-26, 2013, 1-4.

Auyeung, Cheung, HLS: Non-Significant Slice Segments with Tiles for Single Layer HEVC Extensions, JCTVC-N0269 (version 2), ITU, Jul. 25, 2013, pp. 1-4, JCTVC-N0269_r1.docx.

High Efficiency Video Coding, Recommendation ITU-T H.265 (04/15), ITU, Jul. 9, 2015, pp. 244-248, 357-360.

| Signaling1A( payloadSize ) { | Descriptor |
|---|---|
| num_extraction_information_sets_minus1 | ue(v) |
| for( i = 0; i <= num_extraction_information_sets_minus1; i++ ) { | |
| num_applicable_tile_set_identifiers_minus1 | ue(v) |
| for( k = 0; k <= num_applicable_tile_set_identifiers_minus1; k++ ) | |
| mcts_identifier[ i ][ k ] | ue(v) |
| mcts_vps_id[ i ] | u(4) |
| mcts_sps_id[ i ] | ue(v) |
| num_mcts_pps_replacements[ i ] | ue(v) |
| for( j = 0; j <= num_mcts_pps_replacements[ i ]; j++ ) { | |
| mcts_pps_id_in[ i ][ j ] | ue(v) |
| mcts_pps_id_out[ i ][ j ] | ue(v) |
| } | |
| } | |
| } | |

(mcts_vps_id[ i ] and mcts_sps_id[ i ] highlighted as group 90)

Fig. 8

| Signaling1B( payloadSize ) { | Descriptor |
|---|---|
|   num_vps_in_message_minus1 | ue(v) |
|   num_sps_in_message_minus1 | ue(v) |
|   num_pps_in_message_minus1 | ue(v) |
|   num_extraction_information_sets_minus1 | ue(v) |
|   for( i = 0; i <= num_extraction_information_sets_minus1; i++ ) { | |
|     num_applicable_tile_set_identifiers_minus1 | ue(v) |
|     for( k = 0; k <= num_applicable_tile_set_identifiers_minus1; k++) | |
|       mcts_identifier[ i ][ k ] | ue(v) |
|     mcts_vps_idx[ i ] | u(4) |
|     mcts_sps_idx[ i ] | ue(v) |
|     num_mcts_pps_replacements[ i ] | ue(v) |
|     for( j = 0; j <= num_mcts_pps_replacements[ i ]; j++ ) { | |
|       mcts_pps_id_in[ i ][ j ] | ue(v) |
|       mcts_pps_idx_out[ i ][ j ] | ue(v) |
|     } | |
|   } | |
|   while( !byte_aligned( ) ) | |
|     nesting_zero_bit /* equal to 0 */ | u(1) |
|   for( i = 0; i <= num_vps_in_message_minus1; i++ ) | |
|     video_parameter_set_rbsp( )[ i ] | |
|   while( !byte_aligned( ) ) | |
|     nesting_zero_bit /* equal to 0 */ | u(1) |
|   for( i = 0; i <= num_sps_in_message_minus1; i++ ) | |
|     sequence_parameter_set_rbsp( )[ i ] | |
|   while( !byte_aligned( ) ) | |
|     nesting_zero_bit /* equal to 0 */ | u(1) |
|   for( i = 0; i <= num_pps_in_message_minus1; i++ ) | |
|     picture_parameter_set_rbsp( )[ i ] | |
| } | |

Fig. 9

| | Descriptor |
|---|---|
| Signaling1C( payloadSize ) { | |
|   num_extraction_information_sets_minus1 | ue(v) |
|   for( i = 0; i <= num_extraction_information_sets_minus1; i++ ) { | |
|     num_applicable_tile_set_identifiers_minus1 | ue(v) |
|     for( k = 0; k <= num_applicable_tile_set_identifiers_minus1; k++ ) | |
|       mcts_identifier[ i ][ k ] | ue(v) |
|     mcts_vps_timing_info_present_flag[ i ] | u(1) |
|     if( mcts_vps_timing_info_present_flag ) { | |
|       mcts_vps_num_units_in_tick[ i ] | u(32) |
|       mcts_vps_time_scale[ i ] | u(32) |
|       mcts_vps_poc_proportional_to_timing_flag[ i ] | u(1) |
|       if( mcts_vps_poc_proportional_to_timing_flag[ i ] ) | |
|         mcts_vps_num_ticks_poc_diff_one_minus1[ i ] | ue(v) |
|       mcts_vps_num_hrd_parameters[ i ] | ue(v) |
|       for( j = 0; j < mcts_vps_num_hrd_parameters[ i ]; j++ ) { | |
|         mcts_hrd_layer_set_idx[ i ][ j ] | ue(v) |
|         if( j > 0 ) | |
|           mcts_cprms_present_flag[ i ][ j ] | u(1) |
|         hrd_parameters(mcts_cprms_present_flag[ i ][ j ], mcts_vps_max_sub_layers_minus1[ i ] ) | |
|       } | |
|     } | |
|   } | |
| } | |

Fig. 10

| | Descriptor |
|---|---|
| Signaling2A( payloadSize ) { | |
|   bitstream_subset_flag | u(1) |
|   all_tile_sets_flag | u(1) |
|   if( !all_tile_sets_flag ) { | |
|     tile_sets_max_temporal_id_plus1 | u(3) |
|     num_applicable_tile_set_identifiers_minus1 | ue(v) |
|     for( i = 0; i <= num_applicable_tile_set_identifiers_minus1; i++ ) | |
|       mcts_identifier[ i ] | u(6) |
|   } | |
|   while( !byte_aligned( ) ) | |
|     nesting_zero_bit /* equal to 0 */ | u(1) |
|   do | |
|     sei_message( ) | |
|   while( more_rbsp_data( ) ) | |
| } | |

Fig. 11

| | Descriptor |
|---|---|
| inter_layer_constrained_tile_sets( payloadSize ) { | |
|   il_all_tiles_exact_sample_value_match_flag | u(1) |
|   il_one_tile_per_tile_set_flag | u(1) |
|   if( !il_one_tile_per_tile_set_flag ) { | |
|     il_num_sets_in_message_minus1 | ue(v) |
|     if( il_num_sets_in_message_minus1 ) | |
|       skipped_tile_set_present_flag | u(1) |
|     numSignificantSets = il_num_sets_in_message_minus1 - skipped_tile_set_present_flag + 1 | |
|     for( i = 0; i < numSignificantSets; i++ ) { | |
|       ilcts_id[ i ] | ue(v) |
|       il_num_tile_rects_in_set_minus1[ i ] | ue(v) |
|       for( j = 0; j <= il_num_tile_rects_in_set_minus1[ i ]; j++ ) { | |
|         il_top_left_tile_index[ i ][ j ] | ue(v) |
|         il_bottom_right_tile_index[ i ][ j ] | ue(v) |
|       } | |
|       ilc_idc[ i ] | u(2) |
|       if ( !il_all_tiles_exact_sample_value_match_flag ) | |
|         il_exact_sample_value_match_flag[ i ] | u(1) |
|     } | |
|   } else | |
|     all_tiles_ilc_idc | u(2) |
| } | |

Fig. 12

| sample_group_displacement( payloadSize){ | Descriptor |
|---|---|
| resulting_pic_height | ue(v) |
| resulting_pic_width | ue(v) |
| default_luma_value | u(8) |
| default_cb_value | u(8) |
| default_cr_value | u(8) |
| num_sample_groups | ue(v) |
| for (sGIdx=0; sGIx<num_sample_group; sGIdx++) { | |
| sG_top_left_sample_hor[sGIdx] | ue(v) |
| sG_top_left_sample_ver[sGIdx] | ue(v) |
| sG_bottom_right_sample_hor[sGIdx] | ue(v) |
| sG_bottom_right_sample_ver[sGIdx] | ue(v) |
| sG_displacement_hor[sGIdx] | ue(v) |
| sG_displacement_ver[sGIdx] | ue(v) |
| } | |
| } | |

Fig. 17

| temporal_motion_constrained_tile_sets( payloadSize ) { | Descriptor |
|---|---|
| mc_all_tiles_exact_sample_value_match_flag | u(1) |
| each_tile_one_tile_set_flag | u(1) |
| if( !each_tile_one_tile_set_flag ) { | |
| limited_tile_set_display_flag | u(1) |
| num_sets_in_message_minus1 | ue(v) |
| for( i = 0; i <= num_sets_in_message_minus1; i++ ) { | |
| mcts_id[ i ] | ue(v) |
| if( limited_tile_set_display_flag ) | |
| display_tile_set_flag[ i ] | u(1) |
| num_tile_rects_in_set_minus1[ i ] | ue(v) |
| for( j = 0; j <= num_tile_rects_in_set_minus1[ i ]; j++ ) { | |
| top_left_tile_index[ i ][ j ] | ue(v) |
| bottom_right_tile_index[ i ][ j ] | ue(v) |
| } | |
| if( !mc_all_tiles_exact_sample_value_match_flag ) | |
| mc_exact_sample_value_match_flag[ i ] | u(1) |
| mcts_tier_level_idc_present_flag[ i ] | u(1) |
| if( mcts_tier_level_idc_present_flag[ i ] ) { | |
| mcts_tier_flag[ i ] | u(1) |
| mcts_level_idc[ i ] | u(8) |
| } | |
| } | |
| } else { | |
| max_mcs_tier_level_idc_present_flag | u(1) |
| if( mcts_max_tier_level_idc_present_flag ) { | |
| mcts_max_tier_flag | u(1) |
| mcts_max_level_idc | u(8) |
| } | |
| } | |
| } | |

Fig. 29

CONCEPT FOR PICTURE/VIDEO DATA STREAMS ALLOWING EFFICIENT REDUCIBILITY OR EFFICIENT RANDOM ACCESS

CROSS-REFERENCES TO RELATED APPLICATIONS

This application is a continuation of U.S. application Ser. No. 18/359,202, filed Jul. 26, 2023, which is a continuation of copending U.S. application Ser. No. 17/122,753, filed Dec. 15, 2020, now U.S. Pat. No. 11,770,546, issued Sep. 26, 2023, which is incorporated herein by reference in its entirety, which in turn is a continuation of U.S. application Ser. No. 16/118,146, filed Aug. 30, 2018, now U.S. Pat. No. 10,958,921, issued Mar. 23, 2021, which in turn is a continuation of copending International Application No. PCT/EP2017/052769, filed Feb. 8, 2017, which are incorporated herein by reference in their entirety, and additionally claims priority from European Application No. EP 16 154 947.2, filed Feb. 9, 2016, which is incorporated herein by reference in its entirety.

The present application is concerned with video/picture coding, and particularly with a concept allowing for an efficient reduction of such data streams, a concept allowing for an easier handling of such data streams and/or concept allowing for a more efficient random access into a video data stream.

BACKGROUND OF THE INVENTION

There are many video codecs allowing for a scalability of the video data stream without transcoding, i.e. without the need for a sequential performance with decoding and encoding. An example of such scalable video data streams are data streams which are scalable in terms of, for example, temporal resolution, spatial resolution or signal-to-noise ratio by simply leaving off some of the enhancement layers of the respective scalable video data stream. However, until now there is no video codec allowing for an computationally non-complex scalability in terms of scene sectioning. In HEVC, there are, or there have been proposed, also concepts for restricting an HEVC data stream to a picture subarea, but still same are computationally complex.

Moreover, depending on the application, the picture content to be encoded into a data stream might be in a form which may not be effectively coded within the usually offered rectangular picture areas. For example, panoramic picture content may have been projected onto a two-dimensional plane, forming the picture area, in a manner so that the projection target, i.e. the footprint of the panoramic scene onto the picture area, may be non-rectangular and even non-convex. In that case, a more efficient coding of the picture/video data would be advantageous.

Further, random access points are provided in existing video data streams in a manner causing considerable bitrate peaks. In order to reduce the negative effect resulting from these bitrate peaks one could think of a reduction in the temporal granularity of the occurrence of these random access points. However, this increases the mean time duration for randomly accessing such a video data stream and accordingly it would be advantageous to have a concept at hand which solves this problem in a more efficient way.

SUMMARY

According to an embodiment, a video data stream representing a video may have:

a parameter set portion indicating coding parameter settings;
a payload portion into which pictures of the video are coded in a manner parameterized using a first set of the coding parameter settings, the first set being indexed by indices included in the payload portion,
wherein the video data stream includes an information including
an indication of a predetermined subarea of the pictures, and
replacement indices for redirecting the indices included in the payload portion so as to refer to, and/or replacement parameters for adjusting the first set of coding parameter settings so as to result in, a second set of coding parameter settings,
wherein the second set of coding parameters are selected so that a reduced video data stream modified compared to the video data stream by
removing portions of the payload portion referring to an area of the pictures outside the predetermined subarea, and
changing location indications in the payload portion so to indicate a location in a manner measured from a circumference of the predetermined subarea instead of the pictures,
has a reduced payload portion having encoded thereinto subarea-specific pictures showing the predetermined subarea of the pictures in a manner parameterized using the second set of coding parameter settings.

According to another embodiment, an encoder for encoding a video into a video data stream may have:

a parameter setter configured to determine coding parameter settings and generate a parameter set portion of the video data stream indicating the coding parameter settings; a coding core configured to encode pictures of the video into a payload portion of the video data stream in a manner parameterized using a first set of the coding parameter settings, the first set being indexed by indices included in the payload portion,
wherein the encoder is configured to provide the video data stream with an information including
an indication of a predetermined subarea of the pictures, and
replacement indices for redirecting the indices included in the payload portion so as to refer to, and/or replacement parameters for adjusting the first set of coding parameter settings so as to result in, a second set of coding parameter settings,
wherein the second set of coding parameters are selected so that a reduced video data stream modified compared to the video data stream by
removing portions of the payload portion referring to an area of the pictures outside the predetermined subarea, and
changing location indications in the payload portion so to indicate a location in a manner measured from a circumference of the predetermined subarea instead of the pictures,
has a reduced payload portion having encoded thereinto subarea-specific pictures showing the subarea of the pictures in a manner parameterized using the second set of coding parameter settings.

Another embodiment may have a network device for processing a video data stream, which video data stream may have:

a parameter set portion indicating coding parameter settings;

a payload portion into which pictures of the video are coded in a manner parameterized using a first set of the coding parameter settings, the first set being indexed by indices included in the payload portion, wherein the network device is configured to read from the video data stream an information including
an indication of a predetermined subarea of the pictures, and
replacement indices for redirecting the indices included in the payload portion so as to refer to, and/or replacement parameters for adjusting the first set of coding parameter settings so as to result in, a second set of coding parameter settings, reduce the video data stream to a reduced video data stream modified by
performing the redirection and/or adjustment so that the second set of coding parameter settings is indexed by the payload portion's indices;
removing portions of the payload portion referring to an area of the pictures outside the predetermined subarea, and
changing location indications in the payload portion so to indicate a location measured from a circumference of the predetermined subarea instead of the pictures, so that the reduced video data stream has a reduced payload portion which has encoded thereinto subarea-specific pictures showing the predetermined subarea of the pictures in a manner parameterized using the second set of coding parameter settings.

According to another embodiment, a video data stream representing a video may have:

a payload portion into which pictures of the video are coded,
a supplemental enhancement information message indicating supplemental enhancement information matching the manner at which the pictures of the video are coded into the payload portion,
wherein the video data stream includes an information including
an indication of a predetermined subarea of the pictures, and
a replacement supplemental enhancement information message for replacing the supplemental enhancement information message,
wherein the replacement supplemental enhancement information message is selected so that a reduced video data stream modified compared to the video data stream by removing portions of the payload portion referring to an area of the pictures outside the predetermined subarea, and
changing location indications in the payload portion so to indicate a location in a manner measured from a circumference of the predetermined subarea instead of the pictures, has a reduced payload portion having encoded thereinto subarea-specific pictures showing the predetermined subarea of the pictures in a manner so that the replacement supplemental enhancement information message indicates replacement supplemental enhancement information matching the manner at which the subarea-specific pictures are coded into the reduced payload portion.

According to another embodiment, an encoder for encoding a video into a video data stream may have:
a coding core configured to encode pictures of the video into a payload portion of the video data stream,
a parameter setter configured to generate a supplemental enhancement information message indicating supplemental enhancement information matching the manner at which the pictures of the video are coded into the payload portion;
wherein the encoder is configured to provide the video data stream with an information including
an indication of a predetermined subarea of the pictures, and
a replacement supplemental enhancement information message for to be replace the supplemental enhancement information message,
wherein the replacement supplemental enhancement information message is selected so that a reduced video data stream modified compared to the video data stream by removing portions of the payload portion referring to an area of the pictures outside the predetermined subarea, and
changing location indications in the payload portion so to indicate a location in a manner measured from a circumference of the predetermined subarea instead of the pictures, has a reduced payload portion having encoded thereinto subarea-specific pictures showing the subarea of the pictures in a manner so that the replacement supplemental enhancement information message indicates replacement supplemental enhancement information matching the manner at which the subarea-specific pictures are coded into the reduced payload portion.

Another embodiment may have a network device for processing a video data stream, which video data stream may have:

a payload portion into which pictures of the video are coded,
a supplemental enhancement information message indicating supplemental enhancement information matching the manner at which the pictures of the video are coded into the payload portion,
wherein the network device is configured to
read from the video data stream an information including
an indication of a predetermined subarea of the pictures, and
a replacement supplemental enhancement information message for to be replace the supplemental enhancement information message,
reduce the video data stream to a reduced video data stream modified by
replacing the supplemental enhancement information message by the replacement supplemental enhancement information message;
removing portions of the payload portion referring to an area of the pictures outside the predetermined subarea, and
changing location indications in the payload portion so to indicate a location measured from a circumference of the predetermined subarea instead of the pictures, so that the reduced video data stream has a reduced payload portion which has encoded thereinto subarea-specific pictures showing the predetermined subarea of the pictures in a manner so that the replacement supplemental enhancement information message indicates replacement supplemental enhancement information matching the manner at which the subarea-specific pictures are coded into the reduced payload portion.

Yet another embodiment may have a network device for processing a video data stream, configured to
receive a video data stream which includes a fraction of a payload portion into which pictures of the video are coded, wherein the fraction corresponds to an exclusion of portions of the payload portion referring to an area of the pictures outside a predetermined subarea of the pictures, wherein the pictures of the video are coded into the payload portion,
in a manner parameterized, without exclusion, using coding parameter settings in a parameter set portion of the video data stream, and/or
in a manner matching, without exclusion, supplemental enhancement information indicated by a supplemental enhancement message of the video data stream,
modify the video data stream by
changing location indications in the payload portion so to indicate a location measured from a circumference of the predetermined subarea instead of the pictures, and
adjust the coding parameter settings in the parameter set portion and/or adjust the supplemental enhancement information message so that the video data stream has the fraction of the payload portion into which subarea-specific pictures showing the predetermined subarea of the pictures are encoded in a manner
parameterized using the coding parameter settings and/or
matching the supplemental enhancement information supplemental enhancement information indicated by the adjusted supplemental enhancement information supplemental enhancement message as adjusted.

According to another embodiment, a data stream having a picture encoded thereinto may have: a displacing information which indicates for a set of at least one predetermined subregion of the picture a displacement of the set of at least one predetermined subregion within a target picture area relative to an undisplaced copying of the set of at least one predetermined subregion into the target picture area.

According to another embodiment, a decoder for decoding a data stream having a picture encoded thereinto may have: a decoding core configured to reconstruct the picture from the data stream, and a displacer configured to synthesize a target picture on the basis of the picture by, according to displacing information contained in the data stream, displacing each of a set of at least one predetermined subregion of the picture within an area of the target picture.

Yet another embodiment may have a network device configured to reduce a data stream having encoded thereinto a first picture, into a reduced data stream having encoded thereinto a subareas-specific picture showing a predetermined subarea of the first picture, wherein the data stream includes a displacing information which indicates for a set of at least one predetermined subregion of the first picture a displacement of the set of at least one predetermined subregion within a target picture area relative to an undisplaced copying of the set of at least one predetermined subregion into the target picture area, wherein the network device is configured to modify the displacing information into modified displacing information so that the subarea-specific picture, copied into the target picture area with having a set of at least one predetermined subregion of the subarea-specific picture displaced according to the modified displacing information, coincides within the target picture area with the predetermined subarea of the first picture copied into the target picture area with the set of at least one predetermined subregion of the picture displaced according to the displacing information, and, in reducing the data stream, replace the displacing information with the modified displacing information, or the modified displacing information is included in the data stream associated with the predetermined subarea of the first pictures and the displacing information is included in the data stream associated with the first pictures and the network device is configured to, in reducing the data stream, remove the displacing information and carry over the modified displacing information into the reduced data stream so as to be associated with the subarea-specific pictures.

Another embodiment may have a video data stream having encoded thereinto a sequence of pictures using temporal prediction such that a first set of one or more pictures are encoded into the video data stream with suspending temporal prediction at least within a first picture subarea so as to form a set of one or more first random access points, and a second set of one or more pictures are encoded into the video data stream with suspending temporal prediction within a second picture subarea different from the first picture subarea as to form a set of one or more second random access points.

Yet another embodiment may have an encoder for encoding into a video data stream a sequence of pictures using temporal prediction, the encoder configured to encode a first set of one or more pictures into the video data stream with suspending temporal prediction at least within a first picture subarea so as to form a set of one or more first random access points, and encode a second set of one or more pictures into the video data stream with suspending temporal prediction within a second picture subarea different from the first picture subarea as to form a set of one or more second random access points.

Still another embodiment may have a decoder for decoding from a video data stream a sequence of pictures using temporal prediction, the decoder supporting random access using a set of one or more first random access points at a first set of one or more pictures which are encoded into the video data stream with suspending temporal prediction at least within a first picture subarea, and a set of one or more second random access points at a second set of one or more pictures which are encoded into the video data stream with suspending temporal prediction within a second picture subarea different from the first picture subarea.

Still another embodiment may have a network device configured to receive a video data stream having encoded thereinto a sequence of pictures using temporal prediction according to claim 54 and claim 55, wherein the network device is configured to reduce the data stream to obtain a reduced video data stream having subarea-specific pictures encoded thereinto which show the second picture subarea, by removal of portions video data stream having encoded thereinto a picture area of the pictures external to the second picture subarea and replacing an information within the video data stream which indicates the second set of one or more pictures as subarea-specific random access points by picture type information which indicates the second set of one or more pictures as picture-wise random access pictures.

According to another embodiment, a digital storage medium may have an inventive data stream stored thereon.

According to another embodiment, a method for encoding a video into a video data stream may have the steps of:
determining coding parameter settings and generate a parameter set portion of the video data stream indicating the coding parameter settings;

encoding pictures of the video into a payload portion of the video data stream in a manner parameterized using a first set of the coding parameter settings, the first set being indexed by indices included in the payload portion, providing the video data stream with an information including an indication of a predetermined subarea of the pictures, and replacement indices for redirecting the indices included in the payload portion so as to refer to, and/or replacement parameters for adjusting the first set of coding parameter settings so as to result in, a second set of coding parameter settings, wherein the second set of coding parameters are selected so that a reduced video data stream modified compared to the video data stream by removing portions of the payload portion referring to an area of the pictures outside the predetermined subarea, and changing location indications in the payload portion so to indicate a location in a manner measured from a circumference of the predetermined subarea instead of the pictures, has a reduced payload portion having encoded thereinto subarea-specific pictures showing the subarea of the pictures in a manner parameterized using the second set of coding parameter settings.

Another embodiment may have a method for processing a video data stream, which video data stream may have a parameter set portion indicating coding parameter settings; a payload portion into which pictures of the video are coded in a manner parameterized using a first set of the coding parameter settings, the first set being indexed by indices included in the payload portion, which method may have the steps of:

reading from the video data stream an information including an indication of a predetermined subarea of the pictures, and replacement indices for redirecting the indices included in the payload portion so as to refer to, and/or replacement parameters for adjusting the first set of coding parameter settings so as to result in, a second set of coding parameter settings, reducing the video data stream to a reduced video data stream modified by performing the redirection and/or adjustment so that the second set of coding parameter settings is indexed by the payload portion's indices;

removing portions of the payload portion referring to an area of the pictures outside the predetermined subarea, and changing location indications in the payload portion so to indicate a location measured from a circumference of the predetermined subarea instead of the pictures, so that the reduced video data stream has a reduced payload portion which has encoded thereinto subarea-specific pictures showing the predetermined subarea of the pictures in a manner parameterized using the second set of coding parameter settings.

According to another embodiment, a method for encoding a video into a video data stream may have the steps of:

encoding pictures of the video into a payload portion of the video data stream, generating a supplemental enhancement information message indicating supplemental enhancement information matching the manner at which the pictures of the video are coded into the payload portion;

providing the video data stream with an information including an indication of a predetermined subarea of the pictures, and a replacement supplemental enhancement information message for to be replace the supplemental enhancement information message, wherein the replacement supplemental enhancement information message is selected so that a reduced video data stream modified compared to the video data stream by removing portions of the payload portion referring to an area of the pictures outside the predetermined subarea, and changing location indications in the payload portion so to indicate a location in a manner measured from a circumference of the predetermined subarea instead of the pictures, has a reduced payload portion having encoded thereinto subarea-specific pictures showing the subarea of the pictures in a manner so that the replacement supplemental enhancement information message indicates replacement supplemental enhancement information matching the manner at which the subarea-specific pictures are coded into the reduced payload portion.

Another embodiment may have a method for processing a video data stream, which video data stream may have:

a payload portion into which pictures of the video are coded, a supplemental enhancement information message indicating supplemental enhancement information matching the manner at which the pictures of the video are coded into the payload portion, which method may have the steps of:

reading from the video data stream an information including an indication of a predetermined subarea of the pictures, and a replacement supplemental enhancement information message for to be replace the supplemental enhancement information message, reducing the video data stream to a reduced video data stream modified by replacing the supplemental enhancement information message by the replacement supplemental enhancement information message;

removing portions of the payload portion referring to an area of the pictures outside the predetermined subarea, and changing location indications in the payload portion so to indicate a location measured from a circumference of the predetermined subarea instead of the pictures, so that the reduced video data stream has a reduced payload portion which has encoded thereinto subarea-specific pictures showing the predetermined subarea of the pictures in a manner so that the replacement supplemental enhancement information message indicates replacement supplemental enhancement information matching the manner at which the subarea-specific pictures are coded into the reduced payload portion.

According to another embodiment, a method for processing a video data stream may have the steps of:

receiving a video data stream which includes a fraction of a payload portion into which pictures of the video are coded, wherein the fraction corresponds to an exclusion of portions of the payload portion referring to an area of the pictures outside a predetermined subarea of the pictures, wherein the pictures of the video are coded into the payload portion, in a manner parameterized, without exclusion, using coding parameter settings in a parameter set portion of the video data stream, and/or in a manner matching, without exclusion, supplemental enhancement information indicated by a supplemental enhancement message of the video data stream, modifying the video data stream by changing location indications in the payload portion so to indicate a location measured from a circumference of the predetermined subarea instead of the pictures, and adjust the coding parameter settings in the parameter set portion and/or adjust the supplemental enhancement information message so that the video data stream has the fraction of the payload portion into which subarea-specific pictures showing the predetermined subarea of the pictures are encoded in a manner parameterized using the coding parameter settings and/or matching the supplemental enhancement information supplemental enhancement information indicated by the adjusted supplemental enhancement information supplemental enhancement message as adjusted.

According to another embodiment, a method for decoding a data stream having a picture encoded thereinto may have the steps of: reconstructing the picture from the data stream, and synthesizing a target picture on the basis of the picture by, according to displacing information contained in the data stream, displacing each of a set of at least one predetermined subregion of the picture within an area of the target picture.

Another embodiment may have a method for reducing a data stream having encoded thereinto a first picture, into a reduced data stream having encoded thereinto a subareas-specific picture showing a predetermined subarea of the first picture, wherein the data stream includes a displacing information which indicates for a set of at least one predetermined subregion of the first picture a displacement of the set of at least one predetermined subregion within a target picture area relative to an undisplaced copying of the set of at least one predetermined subregion into the target picture area, wherein the method may have the steps of modifying the displacing information into modified displacing information so that the subarea-specific picture, copied into the target picture area with having a set of at least one predetermined subregion of the subarea-specific picture displaced according to the modified displacing information, coincides within the target picture area with the predetermined subarea of the first picture copied into the target picture area with the set of at least one predetermined subregion of the picture displaced according to the displacing information, and, in reducing the data stream, replacing the displacing information with the modified displacing information, or the modified displacing information is included in the data stream associated with the predetermined subarea of the first pictures and the displacing information is included in the data stream associated with the first pictures and the method includes, in reducing the data stream, removing the displacing information and carrying over the modified displacing information into the reduced data stream so as to be associated with the subarea-specific pictures.

According to another embodiment, a method for encoding into a video data stream a sequence of pictures using temporal prediction may have the steps of: encoding a first set of one or more pictures into the video data stream with suspending temporal prediction at least within a first picture subarea so as to form a set of one or more first random access points, and encoding a second set of one or more pictures into the video data stream with suspending temporal prediction within a second picture subarea different from the first picture subarea as to form a set of one or more second random access points.

Another embodiment may have a method for decoding from a video data stream a sequence of pictures using temporal prediction, which method may have the step of: randomly accessing the video data stream using a set of one or more first random access points at a first set of one or more pictures which are encoded into the video data stream with suspending temporal prediction at least within a first picture subarea, and a set of one or more second random access points at a second set of one or more pictures which are encoded into the video data stream with suspending temporal prediction within a second picture subarea different from the first picture subarea.

According to yet another embodiment, a method may have the steps of: receiving an inventive video data stream having encoded thereinto a sequence of pictures using temporal prediction, reducing the data stream to obtain a reduced video data stream having subarea-specific pictures encoded thereinto which show the second picture subarea, by removal of portions video data stream having encoded thereinto a picture area of the pictures external to the second picture subarea and replacing an information within the video data stream which indicates the second set of one or more pictures as subarea-specific random access points by picture type information which indicates the second set of one or more pictures as picture-wise random access pictures.

According to yet another embodiment, a non-transitory digital storage medium may have a computer program stored thereon to perform the inventive methods, when said computer program is run by a computer.

In accordance with a first aspect of the present application, a video data stream is rendered reducible in a manner so that the reduction leads to a restriction of pictures of the reduced video data stream to merely a predetermined subarea of the pictures of the original video data stream and in a manner so that transcoding, such as re-quantization, may be avoided and a conformance of the reduced video data stream relative to the codec underlying the original video data stream be maintained. This is achieved by providing the video data stream with information comprising an indication of the predetermined subarea and replacement indices for redirecting the indices comprised by the payload portion so as to refer to, and/or replacement parameters for adjusting the first set of coding parameter settings so as to result in, a second set of coding parameter settings. The payload portion of the original video data stream has the pictures of the video encoded thereinto parameterized using the first set of coding parameter settings indexed by indices comprised by the payload portion. Additionally or alternatively, similar measures are feasible with respect to supplemental enhancement information. Thus, it is feasible to reduce the video data stream to the reduced video data stream by performing the redirection and/or adjustment so that the second set of coding parameter settings is indexed by the payload portion's indices and accordingly becomes the effective coding parameter setting set, removing portions of the payload portion referring to an area of the pictures outside the predetermined subarea and changing location indications such as slice address in the payload portion to indicate a location measured from a circumference of the predetermined subarea instead of the circumference of the pictures. Alternatively, a data stream already reduced so as to not comprise the portions of the payload portion referring to outside the predetermined subarea, may be modified by in the fly adjustment of the parameters and/or supplement enhancement information.

In accordance with a further aspect of the present application, the transmission of picture content is rendered more efficient in that the picture content does not need to be shaped or ordered in a predetermined manner, such as in such a manner that typically rectangular picture area supported by the underlying codec is filled-out. Rather, a data stream having a picture encoded thereinto is provided to comprise a displacing information which indicates, for a set of at least one predetermined subregion of the picture, a displacement within an area of a target picture relative to an undistorted or one-to-one or congruent copying of the set into the area of the target picture. The provision of such displacing information is useful, for instance, in conveying within the picture a projection of a panoramic scene in cases where the projection is non-rectangular, for instance. This displacing information is also effective in cases where, owing to data stream reduction, the picture content lost its suitability for being conveyed within the smaller pictures of the reduced video data stream such as, for instance, in case of an interesting panoramic view section to be transmitted within the reduced video data stream crossing the transition borders of the prediction or the like.

In accordance with a further aspect of the present application, the negative effects of bitrate peaks in a video data stream caused by random access points are reduced by providing the video data stream with two sets of random access points: a first set of one or more pictures are encoded into the video data stream with suspending temporal prediction at least within a first picture subarea so as to form a set of a set of one or more first random access points and a second set of one or more pictures is encoded into the video data stream with suspending temporal prediction within a second picture subarea different from the first picture subarea so as to form a set of one or more second random access points. In this manner, it is feasible for a decoder seeking to randomly access, or resume decoding of, the video data stream to choose one of the first and second random access points which, in turn, may be distributed temporally and allow for at least a random access with respect to the second picture subarea in case of the second random access points and with respect to the at least first picture subarea with respect to the first random access points.

BRIEF DESCRIPTION OF THE DRAWINGS

Embodiments of the present invention will be detailed subsequently referring to the appended drawings, in which:

FIG. 8 shows a syntax example for an information with which a reducible video data stream could be provided;

FIG. 9 shows an alternative syntax example of the information with which a reducible video data stream could be provided;

FIG. 10 shows an even further example for a syntax of the information with which the reducible video data stream could be provided.

FIG. 11 shows a further example of a syntax for the information, here in order to replace SEI messages;

FIG. 12 shows an example for a syntax table which could be used in order to form the information in connection with multilayer video data streams;

FIG. 17 shows a syntax table example for displacing information using which a data stream could be provided in accordance with an embodiment concerning a second aspect of the present application;

FIG. 29 shows a syntax table of a TMCTS SEI message of HEVC.

DETAILED DESCRIPTION OF THE INVENTION

Figure 1:
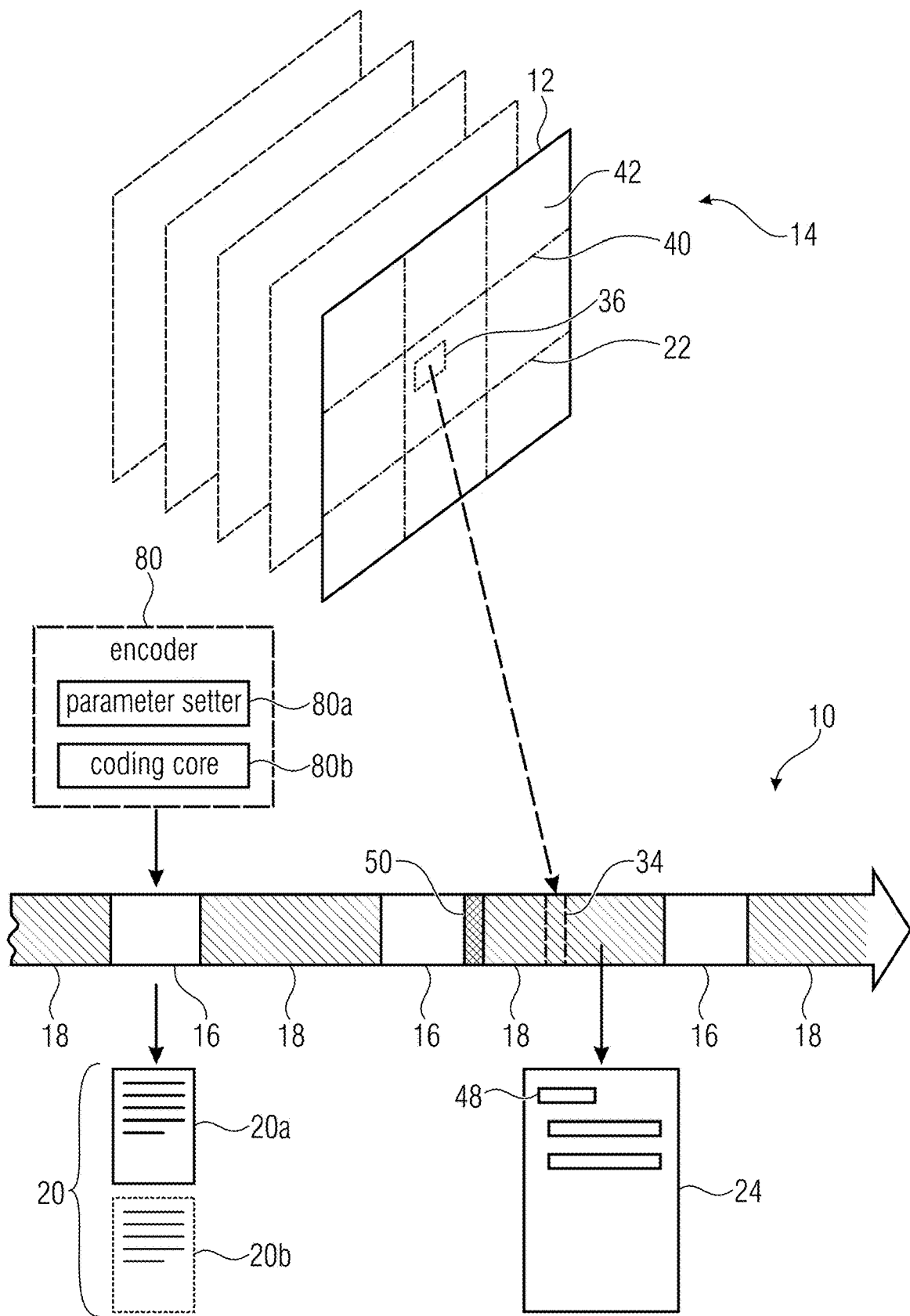
FIG. 1 shows a schematic diagram of a video data stream in accordance with an embodiment of the present application pertaining to a first aspect according to which the video data stream is reducible to a reduced video data stream concerning a subregion of the pictures of the reducible video data stream.

The description of the present application is concerned with the above-identified aspects of the present application. In order to provide a background relating to a first aspect of the present application, which is concerned with subarea-extraction/reduction of video data streams, an example of an application where such a desire may stem from and the problems in fulfilling this desire are described and their overcoming motivated in the following by exemplarily referring to HEVC.

Spatial subsets, i.e. sets of tiles, can be signaled in HEVC using the Temporal Motion Constraint Tile Sets (TMCTS) SEI Message. The tile sets defined in such a message have the characteristic that "the inter prediction process is constrained such that no sample value outside each identified tile set, and no sample value at a fractional sample position that is derived using one or more sample values outside the identified tile set, is used for inter prediction of any sample within the identified tile set". In other words, the samples of a TMCTS can be decoded independently of samples that are not associated with the same TMCTS in the same layer. A TMCTS encompasses one or more rectangular union of one or more tiles as illustrated in Fig. A using a rectangle 900. In the figure, the region of interest 900 looked at by a user encompasses two disjoint image patches.

The precise syntax of the TMCTS SEI message is given in Fig. B for reference.

There are numerous applications where it is beneficial to create an independently decodable rectangular spatial subset of a video bitstream, i.e. a region of interest (RoI), without the burden of heavy processing such as video transcoding. These applications comprise but are not limited to:

Panorama video streaming: only a specific spatial region of a wide angle video, e.g. 360° viewing angle, is displayed to the end user through a head mounted display.

Aspect ratio adjusted streaming: the aspect ratio of coded video is adjusted live on server side according to the display characteristics on client side.

Decoding complexity adjustment: low-cost/low-tech devices that are not able to decode a given encoded video bitstream due to level limits could potentially cope with a spatial subset of the video.

A number of problems arise given the so far described state-of-the-art techniques for the above list of exemplary applications.

There exist no means to make HRD parameters, i.e. buffering/timing information, of a spatial subset of the video bitstream available to the system layer.

There exists no conformance point in the video in order to trivially convert a spatial subset of a given video bitstream into a conforming video bitstream.

There exist no means for an encoder to convey the guarantee that the tile set with a given identifier may be trivially converted into a conforming video bitstream.

Given solutions to the listed problems, all of the above example applications could be realized in a standard conformant way. Defining this capability within the video coding layer is expected to be an important conformance point for applications and systems layers.

The HEVC specification already includes processes for the extraction of sub-bitstreams that may reduce the temporal resolution or the amount of layers, i.e. reduce the spatial resolution, signal fidelity or number of views, of a coded video bitstream.

The present invention provides solutions for the identified problems, in particular:

1. Means for extraction of a spatial subset, i.e. a video bitstream based on a single TMCTS, from a coded video sequence via the definition of sub picture extraction process based on TMCTS
2. Means to convey and identify the correct Parameter Set values and (optionally) SEI information for an extracted sub picture video sequence.
3. Means for an encoder to convey the guarantee of certain sub-region extraction enabling bitstream constraints regarding the video bitstream and the TMCTS.

The embodiment described in the following overcomes the just outlined problem by providing a video data stream with information which is not required for reconstruction of the video's pictures from the payload portion of the video data stream, the information comprising an indication of the predetermined subarea and replacement indices and/or replacement parameters, the significance and function of which is described in more detail below. The following description is not to be restricted to HEVC or a modification of HEVC only. Rather, the embodiment described next could be implemented in any video codec technology so as to provide such video coding technology with an additional conformance point for providing a reduced subarea specific video data stream. Later on, details are presented how the embodiment described next may be specifically implemented to form an extension of HEVC.

FIG. 1 shows a video data stream 10 in accordance with an embodiment of the present application. That is, the video data stream is, in a conformance-maintaining manner, reducible to a reduced video data stream, the pictures of which merely show a predetermined subarea of the pictures 12 of the video 14 encoded into video data stream 10 without the need for transcoding or, to be more precise, time consuming and computationally complex operations such as re-quantization, spatial-to-spectral transformation and the inverse thereof and/or re-performing motion estimation.

The video data stream 10 of FIG. 1 is shown to comprise a parameter set portion 16 indicating coding parameter settings 80 and a payload portion 18 into which the pictures 12 of the video 14 are coded. In FIG. 1, portions 16 and 18 are exemplarily distinguished from one another by using hatching for the payload portion 18 while showing the parameter set portion 16 non-hatched. Moreover, portions 16 and 18 are exemplarily shown to be mutually interleaved within data stream 10 although this is not necessarily the case.

The payload portion 18 has the pictures 12 of video 14 encoded thereinto in a special manner. In particular, FIG. 1 shows an exemplary predetermined subarea 22 with respect to which video data stream 10 is to have the capability of being reducible to a reduced video data stream. The payload portion 18 has pictures 12 encoded thereinto in such a manner that, as far as the predetermined subarea 22 is concerned, any coding dependency is restricted so as to not cross a boundary of subarea 22. That is, a certain picture 12 is coded into payload portion 18 such that, within subarea 22, the coding of the subarea 22 does not depend on a spatial neighborhood of such area 22 within this picture. In case of pictures 12 being encoded into payload portion 18 also using temporal prediction, temporal predication may be restricted within subarea 22 such that no portion within the subarea 22 of a first picture of video 14 is coded in a manner dependent on an area of a reference (other picture) of video 14 external to subarea 22. That is, the corresponding encoder generating the video data stream 14 restricts the set of available motion vectors for coding subarea 22 in such a manner that same do not point to portions of reference pictures the formation of the motion-compensated prediction signal resulting from which would entail or involve samples outside the subarea 22 of the reference picture. As far as the spatial dependencies are concerned, it is noted that the restriction of same may pertain to spatial prediction concerning sample-wise spatial prediction, spatial prediction of coding parameters and coding-dependencies which would, for instance, result from continuing arithmetic coding across the boundary of subarea 22 spatially.

Figure 2:
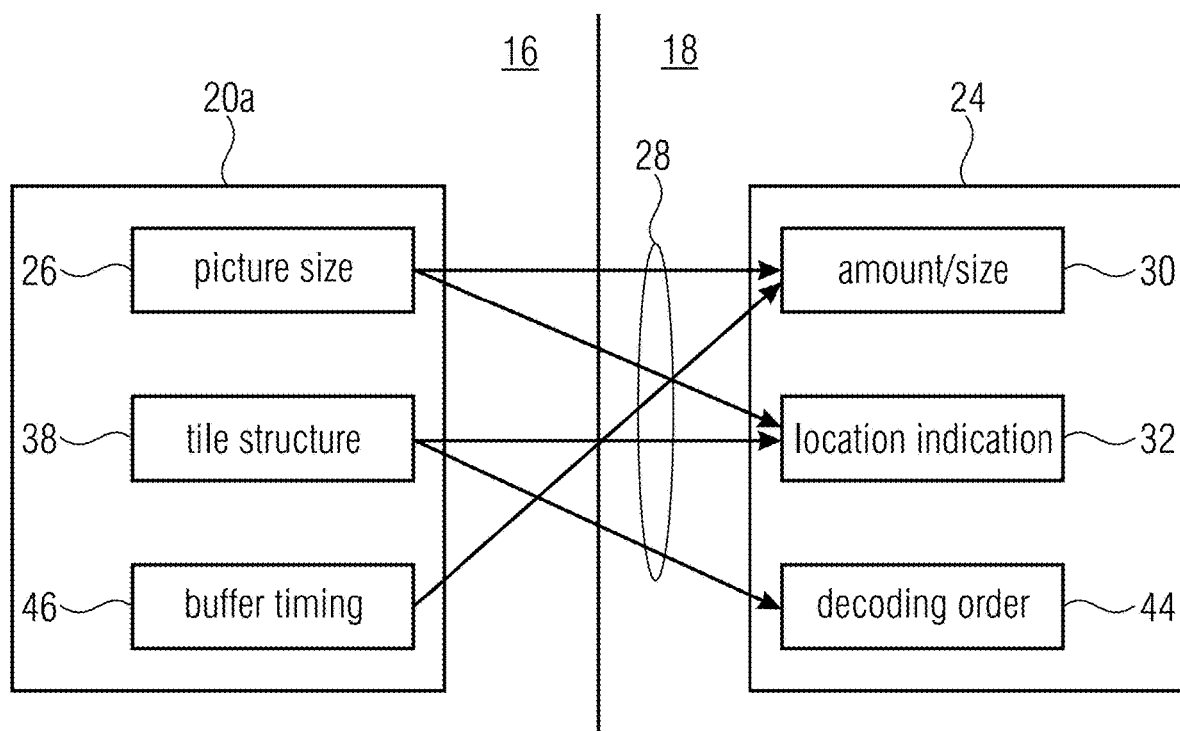
FIG. 2 shows a schematic diagram illustrating the interdependency between payload portion and parameter set portion of the reducible video data stream of FIG. 1 in accordance with an embodiment so as to illustrate the parameterization at which the pictures are encoded into the reducible video data stream.

Thus, the payload portion 18 has encoded thereinto the pictures 12 with the just-outlined obeying of restricting coding dependencies so as to not reach-out towards portions external to predetermined subarea 22 and may accordingly be composed of a syntactically ordered sequence 24 of syntax elements including, for example, motion vectors, picture reference indices, partitioning information, coding modes, transform coefficients or residual samples values representing a quantized prediction residual, or one or any combination thereof. Most importantly, however, the payload portion 18 has the pictures 12 of video 14 encoded thereinto in a manner parameterized using a first set 20a of the coding parameter settings 20. For example, the coding parameter settings in set 20a define, for instance the picture size of pictures 12 such as the vertical height and the horizontal width of pictures 12. In order to illustrate how the picture size "parameterizes" the coding of pictures 12 into payload portion 18, reference is made briefly to FIG. 2. FIG. 2 shows the picture size coding parameter 26 as an example of one of the coding parameter settings of set 20a. Obviously, picture size 26 indicates the size of the picture area which has to be "coded" by payload portion 18 and it may be by signaling that a respective subblock of a certain picture 12 is left uncoded and accordingly, for instance, to be filled by a predetermined sample value such as zero, which may correspond to black. Accordingly, the picture size 26 influences 28 an amount or size 30 of the syntactical description 24 of the payload portion 18. Further, the picture size 26 influences 28 location indication 32 within the syntactical description 24 of payload portion 18 in terms of, for instance, value range of the location indication 32 and the order at which location indication 32 may appear in the syntactical description 24. For instance, location indication 32 may comprise slice addresses within the payload portion 18. Slices 34 are, as illustrated in FIG. 1, portions of data stream 10 in units of which, for instance, data stream 10 is transmittable to a decoder. Each picture 12 may be coded into data stream 10 in units of such slices 34, with the subdivision into slices 34 following a decoding order at which pictures 12 are coded into data stream 10. Each slice 34 corresponds to, and has thus encoded thereinto, a corresponding area 36 of a picture 12, wherein area 36 is, however, either within or external to subarea 22, i.e. it does not cross the boundary of the subarea. In such a case, each slice 34 may be provided with a slice address indicating the position of the corresponding area 36 within the picture area of pictures 12, i.e. relative to a circumference of pictures 12. To mention a concrete example, the slice address may be measured relative to an upper-left hand corner of pictures 12. Obviously, such a slice address may not exceed a value exceeding the values of slice addresses within a picture with the picture size 26.

In a manner similar to picture size 26, the set 20a of coding parameter settings may also define a tile structure 38 of tiles into which picture 12 may be subdivided. Using dash-dotted lines 40, FIG. 1 presents an example of a sub-division of pictures 12 into tiles 42 such that the tiles are arranged in a tile array of columns and rows. In the optional case of pictures 12 being encoded into payload portion 18 using tile subdivision into tiles 42, this may, for instance, mean that 1) spatial interdependencies across tile boundaries is disallowed and, accordingly, not used and that 2) the decoding order at which pictures 12 are coded into data stream 10 traverses pictures 12 in a raster scan tile order, i.e. each tile is traversed before visiting the next tile in tile order. Accordingly, the tile structure 38 influences 28 the decoding order 44 at which pictures 12 are encoded into payload portion 18 and accordingly influences the syntactical description 24. In a way similar to picture size 26, the tile structure 38 also influences 28 the location indication 32 within payload portion 18, namely in terms of the order at which different instantiations of the location indication 32 are allowed to occur within the syntactical description 24.

The coding parameter settings of set 20a may also comprise buffer timing 46. Buffer timing 46 may, for instance, signal coded picture buffer removal times at which certain portions of data stream 10, such as individual slices 34 or portions of data stream 10 referring to one picture 12, are to be removed from a coded picture buffer of a decoder and these temporal values influence 28, or are related to, the sizes of the corresponding portions within data stream 10 so that the buffer timing 46 also influences 28 the amount/size 30 of payload portion 18.

That is, as the description of FIG. 2 exemplified, the coding of pictures 12 into payload portion 18 is "parameterized" or "described" using the set 20a of coding parameter settings in the sense that any discrepancy between the set 20a of coding parameter settings 20 on the one hand and the payload portion 18 and its syntactical description 24 on the other hand would be identified as being in conflict with the conformance requirements which may be obeyed by any data stream to be identified as conforming.

The first set 20a of coding parameter settings is referred to, or indexed, by indices 48 comprised by the payload portion 18 and being interspersed or comprised by the syntactical description 24. For instance, indices 48 may be contained in slice headers of slices 34.

Although the indexed set 20a of coding parameter settings could, in concert or along with the payload portion 18, be amended in a manner so that portions of payload portion 18 are canceled which do not pertain to subarea 22 and the resulting reduced data stream maintains conformance, this approach is not followed by the embodiment of FIG. 1. Although such correlated modification of both coding parameter settings within indexed set 20a on the one hand and payload portion 18 on the other hand would not use a detour via a complete decoding and encoding, the computational overhead in order to perform this correlated modification would nevertheless use a considerable amount of parsing steps and the like.

Figure 3:
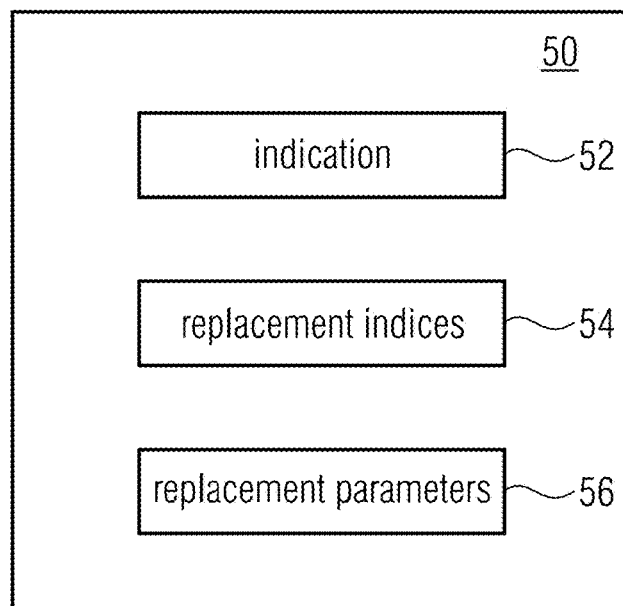
FIG. 3 shows a schematic diagram for illustrating a possible content of the information with which the video data stream of FIG. 1 is provided in accordance with an embodiment to allow for the reduction.

Accordingly, the embodiment of FIG. 1 follows another approach according to which the video data stream 10 comprises, i.e. is provided with, an information 50 which is not required for reconstruction of the video's pictures 12 from payload portion 18, the information comprising an indication of the predetermined subarea and replacement indices and/or replacement parameters. For example, information 50 may indicate the predetermined subarea 22 in terms of its location within pictures 12. The information 50 could, for instance, indicate the location of subarea 22 in units of tiles. Thus, information 50 may identify a set of tiles 42 within each picture so as to form subarea 22. The set of tiles 42 within each picture 12 may be fixed among pictures 12, i.e. the tiles forming, within each picture 12, subarea 22 may be co-located to each other and the tile boundaries of these tiles forming subarea 22 may spatially coincide between different pictures 12. It should be mentioned that the set of tiles is not restricted to form a contiguous rectangular tile subarray of pictures 12. An overlay-free and gapless abutment of the tiles within each picture 12 which form subarea 22 may, however, exist with this gapless and overlay-free abutment or juxtaposition forming an rectangular area. Naturally, however, indication 50 is not restricted to indicate subarea 22 in units of tiles. It should be recalled that the usage of the tile subdivision of pictures 12 is merely optional anyway. Indication 50 may, for instance, indicate subarea 22 in units of samples or by some other means. In an even further embodiment, the location of subarea 22 could even form a default information known to participating network devices and decoders supposed to handle the video data stream 10 with information 50 merely indicating the reducibility with respect to, or the existence of, subarea 22. As already described above and as illustrated in FIG. 3, information 50 comprises, besides the indication 52 of the predetermined subarea, replacement indices 54 and/or replacement parameters 56. Replacement indices and/or replacement parameters are for changing the indexed set of coding parameter settings, i.e. the set of coding parameter settings indexed by the indices within payload portion 18, such that the indexed set of coding parameter settings fits to the payload portion of a reduced video data stream wherein the payload portion 18 has been modified by removal of those portions relating to portions of pictures 12 external to subarea 22 on the one hand and changing the location indicates 32 so as to relate to a circumference of subarea 22 rather than a circumference of pictures 12.

Figure 4:
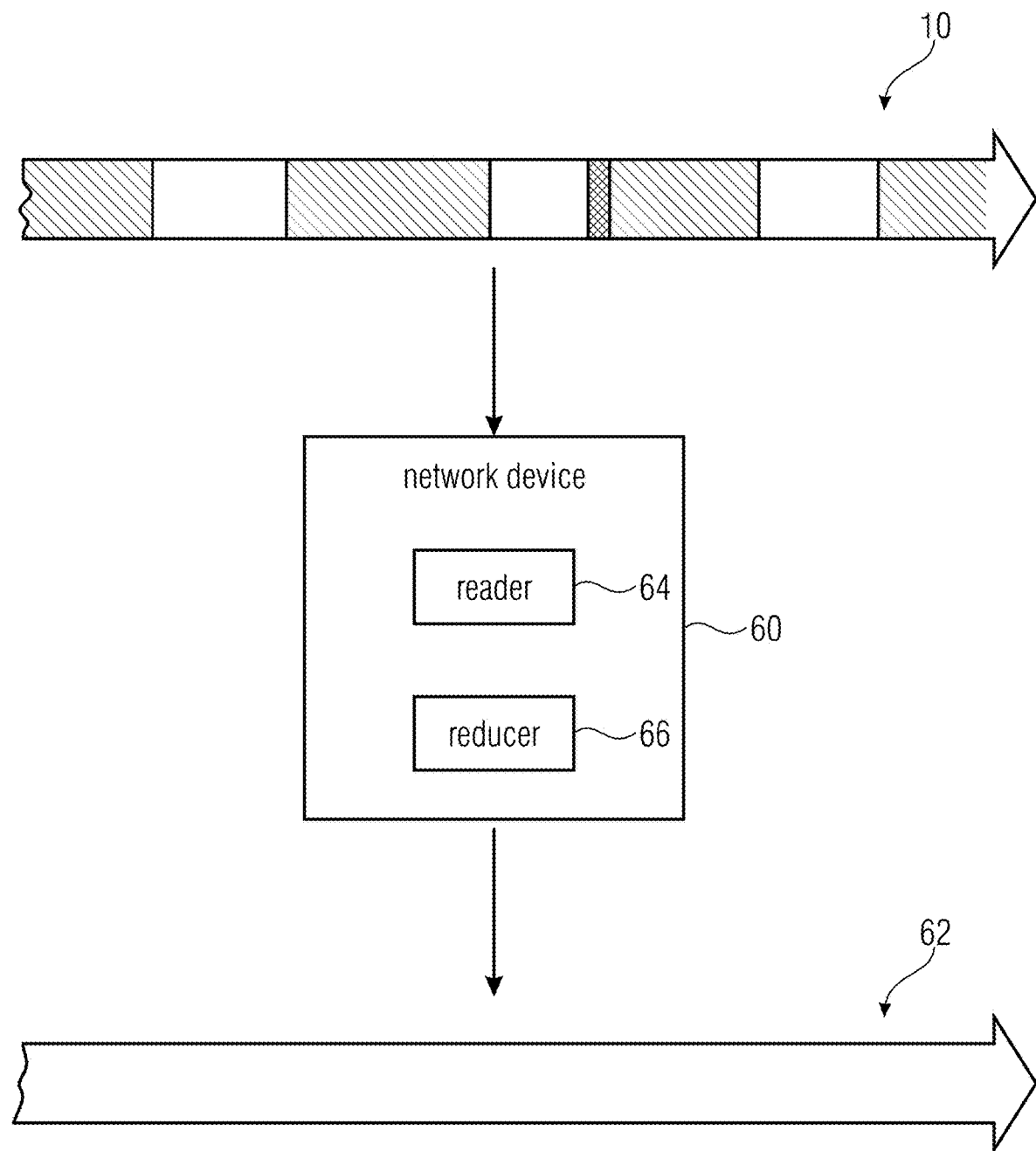
FIG. 4 shows a schematic diagram showing a network device receiving a reducible video data stream and deriving therefrom a reduced video data stream.

To render the latter circumstance clear, reference is made to FIG. 4 which shows a network device 60 configured to receive and process a video data stream 10 according to FIG. 1 so as to derive therefrom a reduced video data stream 62. The term "reduced" in "reduced video data stream" 62 shall denote two things, namely first, the fact that the reduced video data stream 62 corresponds to a lower bitrate than compared to video data stream 10, and second, pictures which the reduced video data stream 62 has encoded thereinto are smaller than pictures 12 of video data stream 10 in that the smaller pictures of reduced video data stream 62 merely show subarea 22 of pictures 12.

In order to fulfill its task as explained in more detail below, method device 60 comprises a reader 64 configured to read from data stream 10 information 50, and a reducer 66 which performs the reduction or extraction process on the basis of information 50 in a manner described in more detail below.

Figure 5:
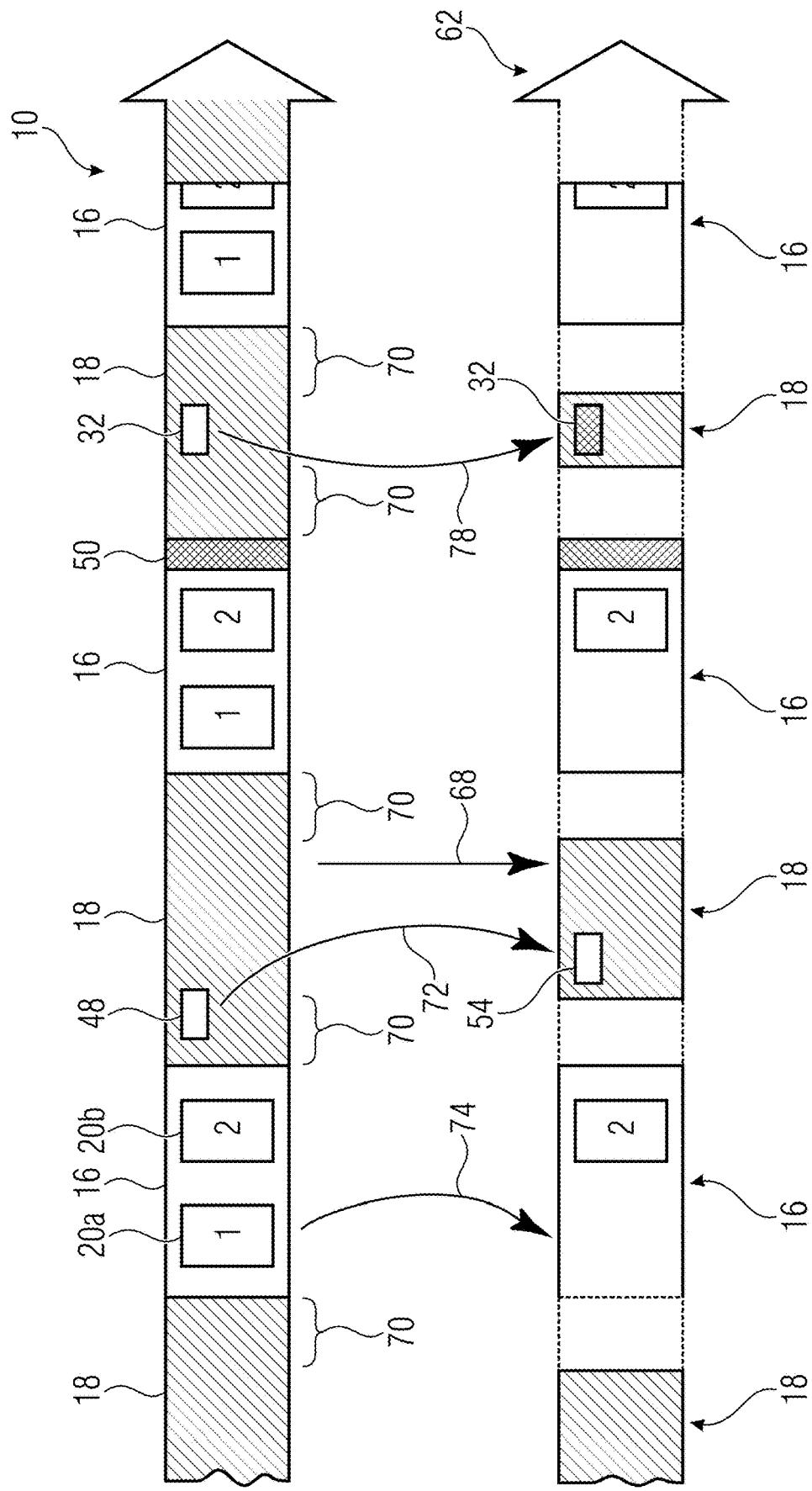
FIG. 5 shows a schematic diagram illustrating the mode of operation in reducing a video data stream in accordance with an embodiment using parameter set redirection.

FIG. 5 illustrates the functionality of network device 60 for the exemplary case of using replacement indices 54 in information 50. In particular, as illustrated in FIG. 5, network device 60 uses information 50, for instance, in order to remove 68 from the payload portion 18 of data stream 10 portions 70 which do not relate to subarea 22, i.e. refer to an area of pictures 12 outside subarea 22. The removal 68 may, for instance, be performed on a slice basis, wherein reducer 66 identifies, on the basis of location indication or slice addresses within slice headers of slices 34 on the one hand and indication 52 within information 50 on the other hand, those slices 34 within payload portion 18 which do not relate to subarea 22.

In the example of FIG. 5, where information 50 carries replacement indices 54, the parameter set portion 16 of video data stream 10 carries besides the index set 20a of coding parameter settings, a non-indexed set 20b of coding parameter settings which are not referred to, or indexed, by the indices 48 within payload portion 18. In performing the reduction, reducer 66 replaces the indices 48 within data stream 10, with one being illustratively shown in FIG. 5, by the replacement indices 54 with the replacement being illustrated in FIG. 5 using curved arrow 72. By the replacement of indices 48 with replacement indices 54 a redirection 72 takes place according to which the indices comprised by the payload portion of the reduced video data stream 62 refer to, or index, the second set 20b of coding parameter settings so that the first set 20a of coding parameter settings becomes not-indexed. The redirection 72 may accordingly also involve reducer 66 removing 74 the no longer indexed set 20a of coding parameter settings from parameter set portion 16.

Reducer 66 also changes location indications 32 within the payload portion 18 so as to be measured relative to the circumference of the predetermined subarea 22. The change is indicated in FIG. 5 by way of a curved arrow 78, with the change of the exemplarily merely one depicted location indication 32 from data stream 10 to reduced video data stream 62 being schematically indicated by showing location indication 32 in the reduced video data stream 62 in a cross-hatched manner while showing location indication 32 in data stream 10 using no hatching.

Thus, summarizing the description of FIG. 5, network device 60 is able to obtain reduced video data stream 62 in a manner which involves merely a relatively low complexity. The cumbersome task of correctly adapting the set 20b of coding parameter settings to correctly parameterize, or fit to, the amount/size 30, location indication 32 and decoding order 44 of the payload portion 18 of the reduced video data stream 62, may have been performed elsewhere such as within an encoder 80 which is representatively illustrated by using a dashed box in FIG. 1. An alternative would be to change the order among assessment of information 50 and reduction by reducer 66 as described further below.

Figure 6:
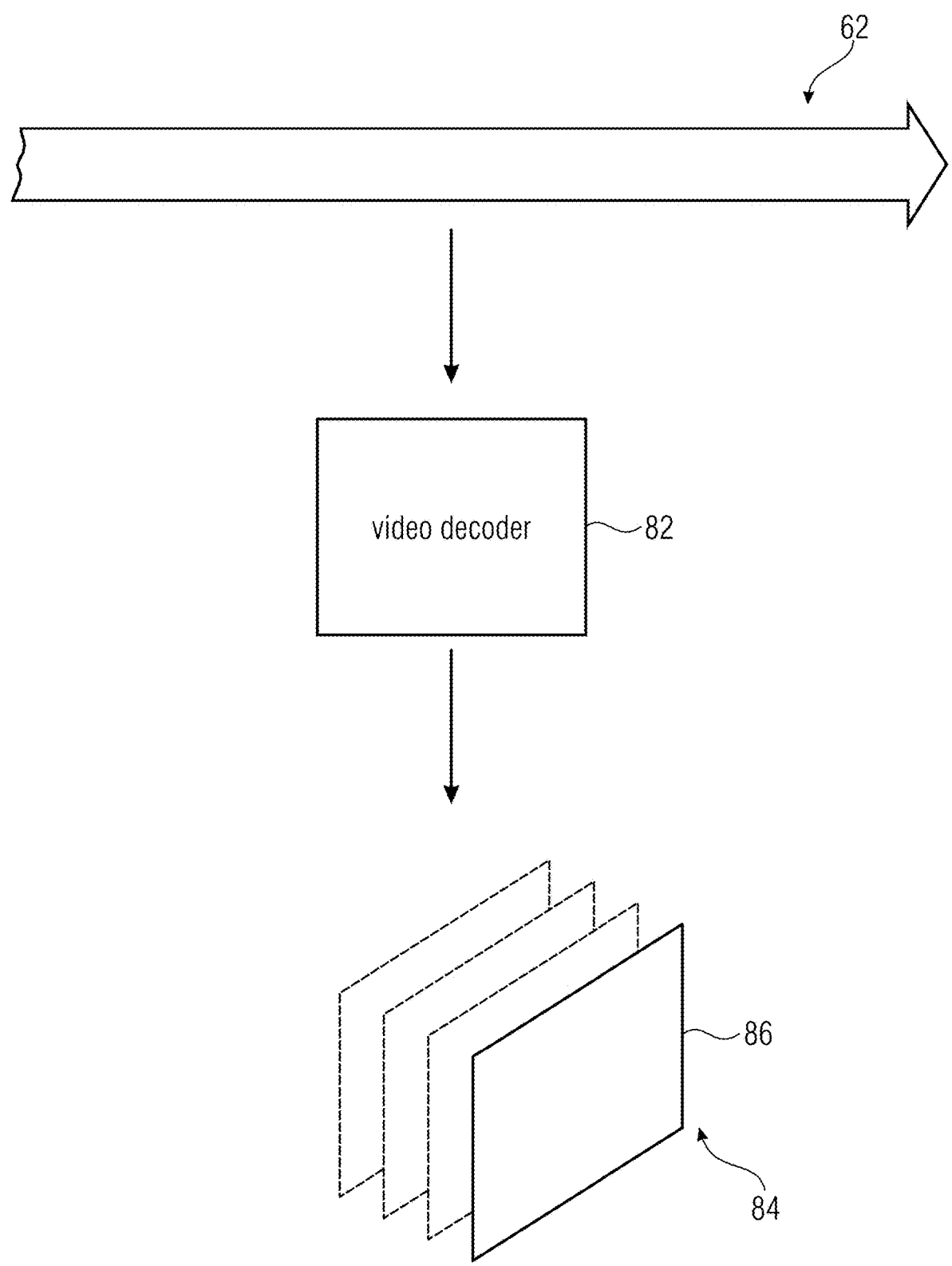
FIG. 6 shows a schematic diagram showing a video decoder 82 receiving a reduced video data stream to reconstruct therefrom the pictures of the reduced video data stream which, in turn, merely show the subarea of the pictures of the original video data stream.

FIG. 6 illustrates a situation where the reduced video data stream 62 is fed to a video decoder 82 in order to illustrate that the reduced video data stream 62 has encoded thereinto a video 84 of smaller pictures 86, i.e. pictures 86 smaller in size than compared to pictures 12 and merely showing subarea 22 thereof. Thus, a reconstruction of video 84 results by video decoder 82 decoding reduced video data stream 62. As explained with respect to FIG. 5, reduced video data stream 62 has a reduced payload portion 18 which has encoded thereinto the smaller pictures 86 in a manner parameterized, or correspondingly described, by the second set 20b of coding parameter settings.

The video encoder 80 may, for instance, encode pictures 12 into video data stream 10 while obeying the coding restrictions explained above with respect to FIG. 1 in connection with subarea 22. Encoder 80 may, for instance, perform this encoding using an optimization of an appropriate rate-distortion optimization function. As an outcome of this encoding, the payload portion 18 indexes set 20a. Additionally, encoder 80 generates set 20b. To this end, encoder 80 may, for instance, adapt picture size 26 and tile structure 38 from their values in set 20a so as to correspond to the size and occupied tile set of subarea 22. Beyond that, encoder 80 would substantially perform the reduction process as explained above with respect to FIG. 5 itself and compute the buffer timing 46 so as to enable a decoder, such as the video decoder 82, to correctly manage its coded picture buffer using the thus computed buffer timing 46 within the second set 20b of coding parameter settings.

Figure 7:
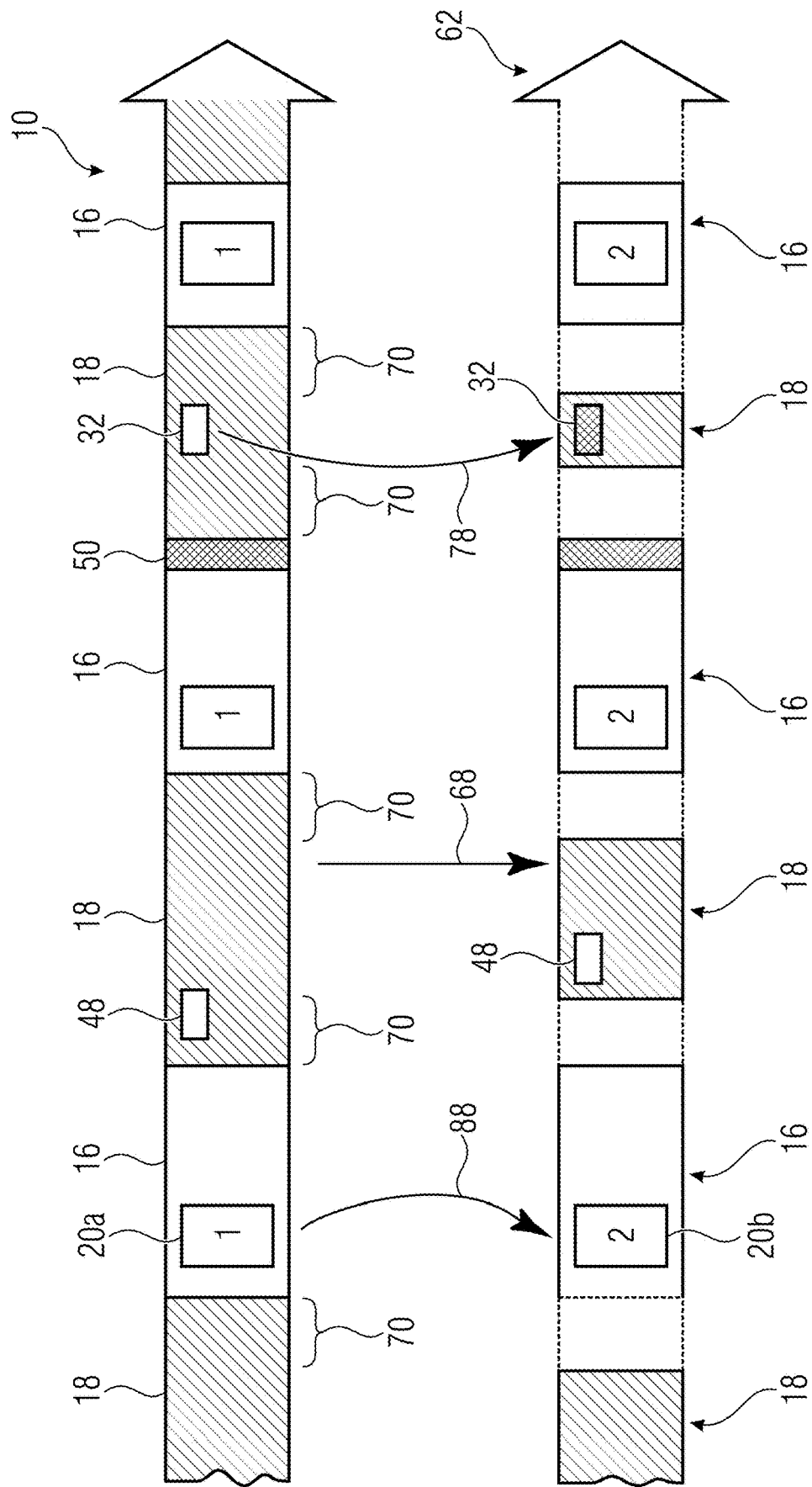
FIG. 7 shows a schematic diagram of an alternative mode of operation in reducing a reducible video data stream, this time using parameter set adjustment using replacements within the information with which the reducible video data stream is provided.

FIG. 7 illustrates an alternative way of network device's mode of operation, namely in case of using replacement parameters 56 within information 50. According to this alternative, as it is depicted in FIG. 7, the parameter set portion 16 merely comprises the indexed set 20a of coding parameter settings so that re-indexing or redirection 72 and set remover 74 do not need to be performed by reducer 66. However, instead of this, reducer 66 uses replacement parameters 56 obtained from information 50 so as to adjust 88 indexed set 20a of coding parameter settings so as to become set 20b of coding parameter settings. Even in accordance with this alternative, reducer 66, which performs steps 68, 78 and 88, is free of relatively complex operations in order to derive the reduced video data stream 62 out of original video data stream 10.

In other words, in the case of FIG. 7, the replacement parameters 56 may, for instance, comprise one or more of picture size 26, tile structure 38 and/or buffer timing 46, for example.

It should be noted with respect to FIGS. 5 and 7 that there may also be mixtures of both alternatives with information 50 comprising both replacement indices and replacement parameters. For instance, coding parameter settings which are subject to a change from set 20a to 20b could be distributed onto, or comprised by, different parameter set slices such as SPS, PPS, VPS, or the like. Accordingly, for different ones of these slices, for instance different processing according to FIG. 5 or 7 could be performed.

With respect to the task of changing 78 the location indications, it is noted that this task has to be performed relatively often since it is to be performed, for example, for each payload slice of slices 34 within payload portion 18, but the computation of the new replacement values for the location indications 32 is relatively incomplex. For example, location indicates could indicate a location by way of horizontal and vertical coordinates and change 78 could, for instance, compute a new coordinate of a location indication by forming a subtraction between the corresponding coordinate of the original location indication 32 and data stream 10 and the offset of subarea 22 relative to the upper left corner of pictures 12. Alternatively, location indicates 32 may indicate a location using some linear measure following, for instance, the aforementioned decoding order in some appropriate units such as, for instance, in units of coding blocks, such as tree root blocks, in which pictures 12 are regularly divided in rows and columns. In such a case, the location indication would be computed within step 78 anew with considering a coding order of these code blocks within subarea 22 only. In this regard, it should also be noted that the just-outlined reduction/extraction process so as to form the reduced video data stream 62 out of video data stream 10 would also be suitable for forming the reduced video data stream 62 in such a manner that the smaller pictures 86 of video 84 coded into reduced video data stream 62 show section 22 in a manner spatially stitched, and that the same picture content of pictures 84 may be located within pictures 12 at subarea 22 in a different spatially arranged manner.

With respect to FIG. 6, it is noted that video decoder 82 shown in FIG. 6 may or may not be able to decode video data stream 10 so as to reconstruct therefrom pictures 12 of video 14. The reason for video decoder 82 not being able to decode video data stream 10 could be that a profile level of video decoder 82 could, for instance, suffice to cope with the size and complexity of the reduced video data stream 62, but could be insufficient to decode the original video data stream 10. In principle, however, both data streams 62 and 10 conform to one video codec owing to the above-outlined appropriate adaptation of the indexed set of coding parameter settings by way of re-indexing and/or parameter adjustment.

After having described rather generally embodiments for video stream reduction/extraction with respect to a certain subarea of pictures of the video data stream to be reduced, the above description of the motivation and problems relating to such extraction with respect to HEVC is resumed in the following to provide a specific example for implementing the above described embodiments.

1. Signaling Aspects for Single Layer Sub Region
1.1. Parameter Sets:

The following Parameter Sets aspects need adjustment when a spatial subset is to be extracted:
- VPS: no normative information for single layer coding
- SPS:
  - Level information
  - Picture dimensions
  - Cropping or conformance window information
  - Buffering and timing information (i.e. HRD information)
  - Potentially further Video Usability Information (VUI) items such as motion_vectors_over_pic_boundaries_flag, min_spatial_segmentation_idc
- PPS:
  - Spatial segmentation information, i.e. Tiling information with respect to amount and dimension of tiles in horizontal and vertical direction.

Signaling Embodiments

Signaling 1A: An encoder may send additional unused (i.e. never activated) VPS, SPS and PPS in band (i.e. as respective NAL units) for each TMCTS and provide a mapping to TMCTS in a Supplemental Enhancement Information (SEI) message.

Exemplary Syntax/semantics for Signaling 1A SEI is shown in FIG. 8.

The syntax elements 90 are optional as they could be derived from the picture parameter set identifiers.

The semantics are provided below.

num_extraction_information_sets_minus1 indicates the number of information sets contained in the given Signaling1A SEI to be applied in the sub picture extraction process.

num_applicable_tile_set_identifiers_minus1 indicates the number of values of mcts_id of the tile sets that the following i-th information set applies to for the sub picture extraction process.

mcts_identifier[i][k] indicates all num_applicable_tile_set_identifers_minus1 plus 1 values of mcts_id of the tile sets that the following i-th information set applies to for the sub picture extraction process.

num_mcts_pps_replacements[i] indicates the number of pps identifier replacements signaling in the Signaling1A SEI for the tile set with mcts_id equal to mcts_id_map[i].

mcts_vps_id[i] indicates that the mcts_vps_idx[i]-th video parameter set is to be used for the tile set with mcts_id equal to mcts_id_map[i] in the sub picture extraction process.

mcts_sps_id[i] indicates that the mcts_sps_idx[i]-th sequence parameter set is to be used for the tile set with mcts_id equal to mcts_id_map[i] in the sub picture extraction process.

mcts_pps_id_in[i][j] indicates the j-th value of the num_mcts_pps_replacements[i] pps identifiers in slice header syntax structures of the tile set with mcts_id equal to mcts_id_map[i] to be replaced in the sub picture extraction process.

mcts_pps_id_out[i][j] indicates the j-th value of the num_mcts_pps_replacements pps identifiers in slice header syntax structures of the tile set with mcts_id equal to mcts_id_map[i] to replace pps identifiers equal to the value mcts_pps_id_in[i][j] in the sub picture extraction process.

Signaling 1B: An encoder may send VPS, SPS and PPS for each TMCTS and a mapping to TMCTS all contained within a container-style SEI.

Exemplary Syntax/semantics for Signaling 1B SEI is shown in FIG. 9.

The yellow syntax elements 92 are optional as they could be derived from the picture parameter set identifiers.

The semantics are as outlined below:

num_vps_in_message_minus1 indicates the number of vps syntax structures in the given Signaling1B SEI to be used in the sub picture extraction process.

num_sps_in_message_minus1 indicates the number of sps syntax structures in the given Signaling1B SEI to be used in the sub picture extraction process.

num_pps_in_message_minus1 indicates the number of pps syntax structures in the given Signaling1B SEI to be used in the sub picture extraction process.

num_extraction_information_sets_minus1 indicates the number of information sets contained in the given Signaling1B SEI to be applied in the sub picture extraction process.

num_applicable_tile_set_identifiers_minus1 indicates the number of values of mcts_id of the tile sets that the following i-th information set applies to for the sub picture extraction process.

mcts_identifier[i][k] indicates all num_applicable_tile_set_identifers_minus1 plus 1 values of mcts_id of the tile sets that the following i-th information set applies to for the sub picture extraction process.

mcts_vps_idx[i] indicates that the mcts_vps_idx[i]-th video parameter set signaled in the Signaling1B SEI is to be used for the tile set with mcts_id equal to mcts_id_map[i] in the sub picture extraction process.

mcts_sps_idx[i] indicates that the mcts_sps_idx[i]-th sequence parameter set signaled in the Signaling1B SEI is to be used for the tile set with mcts_id equal to mcts_id_map[i] in the sub picture extraction process.

num_mcts_pps_replacements[i] indicates the number of pps identifier replacements signaling in the Signaling1B SEI for the tile set with mcts_id equal to mcts_id_map[i].

mcts_pps_id_in[i][j] indicates the j-th value of the num_mcts_pps_replacements[i] pps identifiers in slice header syntax structures of the tile set with mcts_id equal to mcts_id_map[i] to be replaced in the sub picture extraction process.

mcts_pps_idx_out[i][j] indicates that the picture parameter set with pps identifier equal to mcts_pps_id_in[i][j] is to be replaced with the mcts_pps_idx_out[i][j]-th signaled picture parameter set in the Signaling1C SEI during the sub picture extraction process.

Signaling 1C: An encoder may provide parameter set information associated with the TMCTS that cannot be derived (essentially additional buffering/timing (HRD) parameters and a mapping to the applicable TMCTS within a SEI.

Exemplary Syntax/semantics for Signaling 1C SEI is shown in FIG. 10. The HRD information in the following SEI is structured in a fashion that the extraction process is able to replace a consecutive block of syntax elements in the original VPS with a respective consecutive block of syntax elements from the SEI.

num_extraction_information_sets_minus1 indicates the number of information sets contained in the given Signaling1C SEI to be applied in the sub picture extraction process.

num_applicable_tile_set_identifiers_minus1 indicates the number of values of mcts_id of the tile sets that the following i-th information set applies to for the sub picture extraction process.

mcts_identifier[i][k] indicates all num_applicable_tile_set_identifers_minus1 plus 1 values of mcts_id of the tile sets that the following i-th information set applies to for the sub picture extraction process.

mcts_vps_timing_info_present_flag[i] equal to 1 specifies that mcts_vps_num_units_in_tick[i], mcts_vps_time_scale[i], mcts_vps_poc_proportional_to_timing_flag[i] and mcts_vps_num_hrd_parameters[i] are present in the VPS. mcts_vps_timing_info_present_flag[i] equal to 0 specifies that mcts_vps_num_units_in_tick[i], mcts_vps_time_scale[i], mcts_vps_poc_proportional_to_timing_flag[i] and mcts_vps_num_hrd_parameters[i] are not present in the Signaling1C SEI.

mcts_vps_num_units_in_tick[i] is the i-th number of time units of a clock operating at the frequency mcts_vps_time_scale Hz that corresponds to one increment (called a clock tick) of a clock tick counter. The value of mcts_vps_num_units_in_tick[i] shall be greater than 0. A clock tick, in units of seconds, is equal to the quotient of mcts_vps_num_units_in_tick divided by mcts_vps_time_scale. For example, when the picture rate of a video signal is 25 Hz, mcts_vps_time_scale may be equal to 27 000 000 and mcts_vps_num_units_in_tick may be equal to 1 080 000, and consequently a clock tick may be 0.04 seconds.

mcts_vps_time_scale[i] is the i-th number of time units that pass in one second. For example, a time coordinate system that measures time using a 27 MHz clock has a vps_time_scale of 27 000 000. The value of vps_time_scale shall be greater than 0.

mcts_vps_poc_proportional_to_timing_flag[i] equal to 1 indicates that the picture order count value for each picture in the CVS that is not the first picture in the CVS, in decoding order, is proportional to the output time of the picture relative to the output time of the first picture in the CVS. mcts_vps_poc_proportional_to_timing_flag[i] equal to 0 indicates that the picture order count value for each picture in the CVS that is not the first picture in the CVS, in decoding order, may or may not be proportional to the output time of the picture relative to the output time of the first picture in the CVS.

mcts_vps_num_ticks_poc_diff_one_minus1[i] plus 1 specifies the number of clock ticks corresponding to a difference of picture order count values equal to 1. The value of mcts_vps_num_ticks_poc_diff_one_minus1[i] shall be in the range of 0 to 232-2, inclusive.

mcts_vps_num_hrd_parameters[i] specifies the number of hrd_parameters( ) syntax structures present in the i-th entry of the Signaling1C SEI. The value of mcts_vps_num_hrd_parameters shall be in the range of 0 to vps_num_layer_sets_minus1+1, inclusive.

mcts_hrd_layer_set_idx[i][j] specifies the index, into the list of layer sets specified by the VPS of the i-th entry in the Signaling1C SEI, of the layer set to which the j-th hrd_parameters( ) syntax structure in in the Signaling1C SEI applies and to be used in the sub-picture extraction process. The value of mcts_hrd_layer_set_idx[i][j] shall be in the range of (vps_base_layer_internal_flag?0:1) to vps_num_layer_sets_minus1, inclusive. It is a requirement of bitstream conformance that the value of mcts_hrd_layer_set_idx[i][j] shall not be equal to the value of hrd_layer_set_idx[i][k] for any value of j not equal to k.

mcts_cprms_present_flag[i][j] equal to 1 specifies that the HRD parameters that are common for all sub-layers are present in the j-th hrd_parameters( ) syntax structure of the i-th entry of the Signaling1C SEI. mcts_cprms_present_flag[i][j] equal to 0 specifies that the HRD parameters that are common for all sub-layers are not present in the i-th hrd_parameters( ) syntax structure of the i-th entry of the Signaling1C SEI and are derived to be the same as the (i−1)-th hrd_parameters( ) syntax structure of the i-th entry of the Signaling1C SEI. mcts_cprms_present_flag[i][0] is inferred to be equal to 1.

As the above HRD information is VPS related, signaling of similar information for the SPS VUI HRD parameters may be embodied in the same fashion, e.g. extending the above SEI or as an individual SEI message.

It is worth noting that further embodiments of the invention may use the mechanisms exercised by Signaling 1A, 1B and 1C in other bitstream syntax structures such as VUI or as extensions of parameter sets.

1.2. SEI Messages

Occurrence of any of the following SEI messages in the original video bitstream may use mechanisms for adjustment to avoid incoherencies after TMCTS extraction:

HRD related Buffering Period, Picture Timing and Decoding Unit Information SEI
PanScan SEI
*FramePackingArrangement*SEI
DecodedPictureHash SEI
TMCTS SEI Signaling Embodiments:

Signaling 2A: An encoder may provide suitable replacements for the above SEIs in association with a TMCTS in a container-style SEI for all TMCTS. Such signaling could be combined with the embodiment in Signaling 1C and is shown in FIG. 11. In other words, additionally or alternatively to the description provided above, the video data stream 10 which represents video 14 may comprise a payload portion 18 into which pictures 12 of the video are coded and a supplemental enhancement information message indicating supplemental enhancement information matching the payload portion 18, or, to be more precise, the manner at which the pictures 12 of the video are coded into the payload portion 18, and further comprise an information 50 comprising an indication 52 of a predetermined subarea 22 of the pictures 12, and a replacement supplemental enhancement information message for replacing the supplemental enhancement information message, wherein the replacement supplemental enhancement information message is selected so that a reduced video data stream 62 modified compared to the video data stream by removing 68 portions 70 of the payload portion 18 referring to an area of the pictures 12 outside the predetermined subarea 22, and changing 78 location indications 32 in the payload portion 18 so to indicate a location in a manner measured from a circumference of the predetermined subarea 22 instead of the pictures 12, has a reduced payload portion having encoded thereinto subarea-specific pictures 86 showing the predetermined subarea 22 of the pictures in a manner so that the replacement supplemental enhancement information message indicates replacement supplemental enhancement information matching the reduced payload portion, i.e. the manner at which the subarea-specific pictures 86 are coded into the reduced payload portion 18. The parameter setter 80a would, in addition to or alternative to the parameter generation described above, generate the supplemental enhancement information message which is the object of potential replacement by the replacement SEI message. The replacement would be, in addition to or alternative to the redirection and/or adjustment described above, performed by the network device 60.

all_tile_sets_flag equal to 0 specifies that the list applicable_mcts_id[0] is specified by wapplicable_mcts_id[i] for all tile sets defined within the bitstream. all_tile_sets_flag equal to 1 specifies that the list applicable_mcts_id[0] consists of all values of nuh_layer_id present in the current access unit that are greater than or equal to nuh_layer_id of the current SEI NAL unit, in increasing order of the values.

tile_sets_max_temporal_id_plus1 minus 1 indicates the maximum temporal level to be extracted in the sub picture extraction process for a tile set with mcts_id equal to an element o the array applicable_mcts_id[i].

num_applicable_tile_set_identifiers_minus1 plus 1 specifies the number of following applicable mcts ids for which the following SEI messages should be used in the sub picture extraction process.

mcts_identifier[i] indicates all num_applicable_tile_set_identifiers_minus1 values of mcts_id for which the following SEI messages should be inserted when extracting the respective tile set with mcts_id equal to applicable_mcts_id[i] using the sub-picture extraction process for tile sets.

2. Sub Picture Extraction Process:

The extraction process details obviously depend on the applied signaling scheme.

Constraints regarding the tile setup and the TMCTS SEI, specifically the extracted TMCTS, may be formulated to ensure conformant output. Presence of any of the above signaling embodiments win the bitstream represents a guarantee that the encoder obeyed the constraints formulated below during creation of the video bitstream.

Input:
  A bitstream.
  Target MCTS identifier MCTSIdTarget.
  Target layer identifier list layerIdListTarget.
Constraints or Bitstream Requirements:
  tiles_enabled_flag equal to 1.
  num_tile_columns_minus1>0||num_rows_minus1>0.
  TMCTS SEI message with mcts_id[i] equal to MCTSId-Target is present and associated with all pictures to be output.
  TMCTS with mcts_id[i] equal to MCTSIdTarget is present in TMCTS SEI.
  A suitable level for the TMCTS with mcts_id[i] equal to MCTSIdTarget may be signaled, either via the TMCTS SEI syntax elements mcts_tier_level_idc_present_flag [i], mcts_tier_idc[i], mcts_level_idc[i] or one of the above signaling variants 1A or 1B.
  HRD information for the TMCTS is present in the bitstream through one of the signaling variants 1A, 1B or 1C.
  All rectangles in the TMCTS with mcts_id[i] equal to MCTSIdTarget have equal height or equal width or both in terms of luma samples.
Process:
  Remove all tile NALUs that are not in the tile set associated with mcts_id[i] equal to MCTSIdTarget.
  Replace/Adjust parameter sets depending on signaling 1X.
  Adjust remaining NALU slice header according to the following
    Adjust slice_segement_address and first_slice_segment_in_pic_flag create a common picture plane from all rectangles in the tile set.
    Adjust pps_id if need be
  Remove or, in presence of signaling 2A, replace SEIs.

As an alternative embodiment, the constraints or bitstream requirements described above as part of the extraction process could take the form of dedicated signaling within the bitstream, e.g. a separate SEI message or VUI indication, the presence of which would be a requirement for them above extraction process.

2. Multi Layer

In some scenarios, layered codecs might be of interest, e.g. to provide varying quality per region. It may be interesting to provide a larger spatial area at lower layer quality, so that if demanded by the user, and some specific area of the wide-angle video is not available at the higher layer, the content is available in lower layers to be upsampled and presented alongside higher layer content. The degree to which lower layer video regions extends the higher layer video regions should be allowed to vary depending on use case.

In addition to the described TMCTS SEI, in the layered extensions of the HEVC specification (i.e. Annex F), the Inter-layer Constrained Tile Sets (ILCTS) SEI message is specified which indicates similar in nature constraints for inter layer prediction. For reference, the syntax table is given in FIG. 12.

Therefore, as further part of the invention, an extraction process of similar fashion as above is realized for layered coded video bitstreams taking into account additional information.

The main difference to the above disclosed signaling and processing in case of considering signaling aspects for multi layer sub picture is that the targeted data portions of the bitstream are no longer identified by a single value of a mcts_id identifier. Instead, the identifier of a layer set and multiple identifiers of the TMCTS within each included layer if applicable and respective ILCTS identifiers between the included layers if applicable form a multidimensional vector identifying the targeted portion of the bitstream.

Embodiments of the invention are variants of the above disclosed single layer signaling 1A, 1B, 1C and 2A for which the syntax element mcts_identifier[i][k] is replaced with the described multidimensional identifier vector.

Furthermore, the encoder constraints or bitstream requirements are extended as follows.

2.2. Extraction Process:

Input:
  Multidimensional identifier vector consisting of . . .
    Target layer set layerSetIdTarget
    Target layer TMCTS identifier MCTSIdTarget_Lx at least for the highest layer within the layer set with identifier layerSetIdTarget
    Target ILCTS identifiers LTCTSIdTarget_Lx_refLy corresponding to
  A bitstream
Bitstream Requirements:
  In addition to what has be defined for the single layer case:
    TMCTS SEI messages with mcts_id[i] equal to MCTSId-Target_Lx are present for the respective layers Lx and ILCTS SEI messages with ilcts_id[i] equal to ILTCTS/dTarget_Lx_refLy are present in the respective layers Lx for any used reference layers Ly contained in the bitstream and the layer set layerSetIdTarget
  In order to rule out the existence of missing reference samples in the extracted bitstream portion, the TMCTS and ILCTS defining the bitstream portion further have to fulfill the following constraints.
    For each referencing layer A with tile set tsA associated with mcts_id[i] equal to MCTSIdTarget LA: The tiles in layer A constituting tsA are the same tiles that are associated with the tile set with ilcts_id[i] equal to ILTCTSIdTarget_LA_refLy.
    For each referenced layer B with tile set tsB associated with mcts_id[i] equal to MCTSIdTarget_LB: The tiles in layer B constituting tsB are completely contained in the associated reference tile set that is indicated ilcts_id[i] ILCTSIdTarget_Lx_refLB.
Process
  Per layer x: remove all tile NAL units that are not within the tile set with mcts_id[i] identifiers MCTSIdTarget_Lx.

Before turning to the next aspect of the present application, a brief note shall be made with respect to the above mentioned possibility that subarea 22 may be composed of a set of tiles, the relative location of which within pictures 12 may differ from the relative location to one another of these tiles within the smaller pictures 86 of video 84 represented by the reduced video data stream 62.

Figure 13:
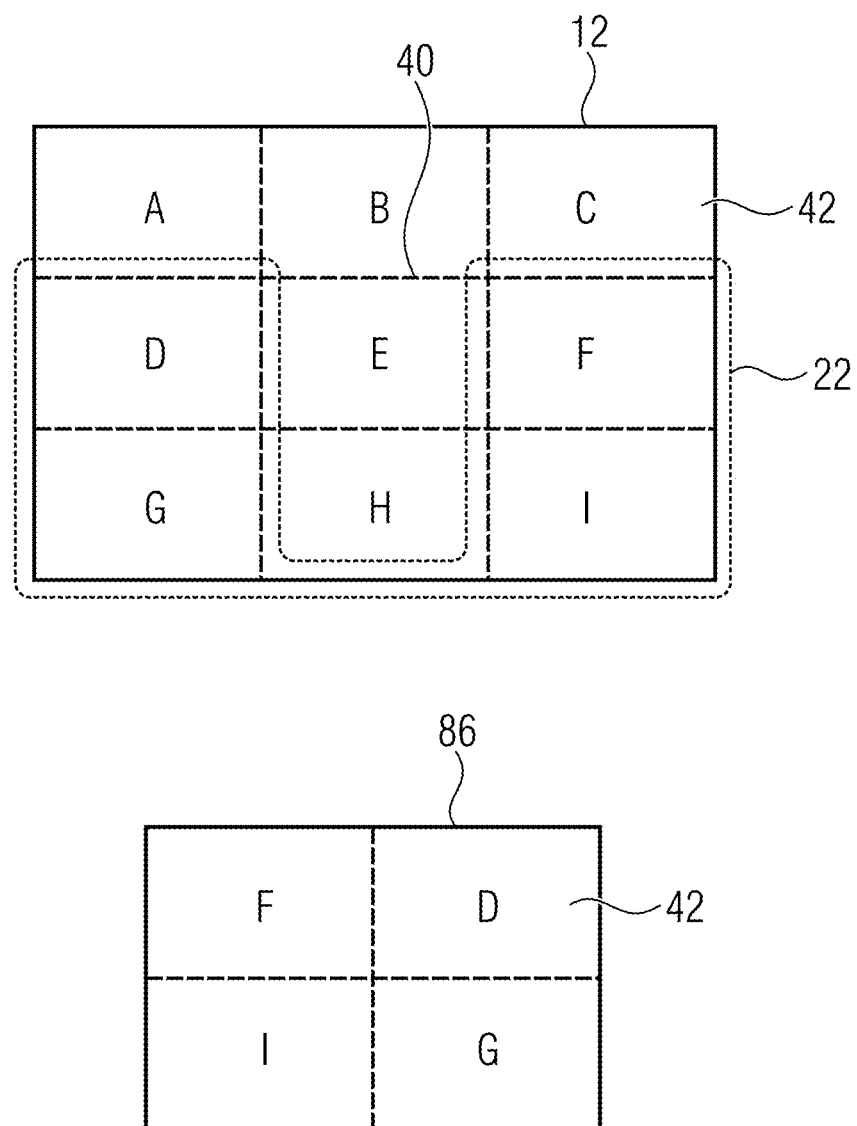
FIG. 13 shows a schematic diagram illustrating a relationship between tiles within a subregion of the pictures within the reducible video data stream on the one hand and the corresponding tile within the pictures of the reduced video data stream on the other hand in accordance with an embodiment to illustrate the possibility of spatial rearrangement of these tiles.

FIG. 13 illustrates pictures 12 to be subdivided into an array of tiles 42 enumerated using capital letters A to I along the decoding order. For the sake of illustration only, FIG. 13 exemplarily shows merely one picture and a subdivision into 3×3 tiles 42. Imagine that pictures 12 are coded into video data stream 10 in a manner such that coding dependencies do not cross tile boundaries 40, the coding dependencies thus restricted not only including intra-picture spatial interdependencies, but also temporal independencies, for example. Accordingly, a tile 42 within a current picture merely depends on itself or the co-located tile within any previously coded/decoded picture, i.e. temporal reference picture.

In this situation, subarea 22 may for example be composed of a set of tiles 42 being non-contiguous, such as the set of tiles {D, F, G, I}. Owing to the mutual independence, pictures 86 of video 84 may show the subarea 22 in a manner so that the participating tiles are spatially arranged within picture 86 in a different manner. This is shown in FIG. 13: pictures 86 are also encoded into the reduced video data stream 62 in units of tiles 42, but the tiles forming subarea 22 in pictures 12 are spatially arranged within pictures 86 at another mutual locational relationship to one another. In the example of FIG. 13, the tiles 42 forming subarea 22 occupied tiles at opposing sides of pictures 12 as if pictures 12 showed a horizontal panoramic view so that tiles at these opposing sides actually show adjacent portions of the panoramic scene. In pictures 86, however, the tiles in each tile row switch the positions relative to their relative positions in pictures 12. That is, tile F, for example, appears at the left hand side relative to tile D when compared to the mutual horizontal positioning of tiles D and F in pictures 12.

Before proceeding to the next aspect of the present application, it should be noted that neither the tiles 42 nor section 22 need to be encoded into pictures 12 in the above-outlined manner where the coding dependencies are restricted so as to not cross the boundary thereof. Naturally, this restriction alleviates the above-outlined concept of video data stream reduction/extraction, but as such coding dependencies tend to affect merely a small edge portion along the boundary of subarea 22/tiles 42, depending on the application the distortions at these edge portions could be accepted depending on the application.

Further, it is noted that so far the embodiments described above presented a possibility to extend an existing video codec in such a manner that same newly comprises the described compliance point, namely the possibility of reducing the video stream to a reduced video stream pertaining to a subarea 22 of the original pictures 12 only while maintaining compliance, and to this end, the information 50 has been exemplarily hidden in an SEI message, a VUI or a parameter set extension, i.e. portions of the original video data stream which may be skipped by decoders according to the likes or dislikes. Alternatively, however, information 50 could be conveyed within the video data stream at portions which are normative portions. That is, a new video codec could be set-up in a manner to, from the scratch, comprise the described compliance point.

Further, for sake of completeness, a further specific implementation example for the above embodiments is described, this example illustrating a possibility to extend the HEVC standard in a manner so as implement the above embodiments. To this end, new SEI messages are provided. In other words, modifications to the HEVC specification are described which enable an extraction of a motion-constrained tile set (MCTS) as an individual HEVC conformant bitstream. Two SEI messages are used and described below.

The first SEI message, i.e. the MCTS extraction information set SEI message, provides syntax for carriage of MCTS specific replacement parameter sets and defines the extraction process in the semantics. The second SEI message, i.e. the MCTS extraction information nesting SEI message, provides syntax for MCTS specific nested SEI messages.

Accordingly, to include these SEI messages into the HEVC frame work, the general SEI message syntax of HEVC is amended to include the new types of SEI messages:

| | Descriptor |
|---|---|
| sei_payload( payloadType, payloadSize ) { | |
|   if( nal_unit_type = = PREFIX_SEI_NUT ) | |
|     if( payloadType = = 0 ) | |
|       buffering_period( payloadSize ) | |
|     ... | |
|     else if( payloadType = = 152 ) | |
|       mcts_extraction_info_set( payloadSize ) | |
|     else if( payloadType = = 153 ) | |
|       mcts_extraction_info_nesting( payloadSize ) | |
|     ... | |
|     else if( payloadType = = 160 ) | |
|       layers_not_present( payloadSize ) /* specified in Annex F */ | |
|   } | |
| } | |

Thus, the list SingleLayerSeiList is set to consist of the payloadType values 3, 6, 9, 15, 16, 17, 19, 22, 23, 45, 47, 56, 128, 129, 131, 132, and 134 to 153, inclusive. Similarly, lists VclAssociatedSeiList and PicUnitRepConSeiList would be extended by type numbers 152 and 153 of the new SEI messages, which number are naturally merely chosen for illustration purposes.

Table D.1 of HEVC, Persistence scope of SEI messages, would additionally include a hint to the new tapes of SEI messages:

| SEI message | Persistence scope |
|---|---|
| MCTS extraction information set | The CLVS containing the SEI message |
| MCTS extraction information nesting | The access unit containing the SEI message |

Their syntax would be as follows. The MCTS extraction information set SEI message syntax could be designed as:

|  | Descriptor |
|---|---|
| mcts_extraction_info_set( ) { | |
|   num_extraction_info_sets_minus1 | ue(v) |
|   for( i = 0; i <= num_extraction_information_sets_minus1; i++ ) { | |
|     num_associated_tile_set_identifiers_minus1[ i ] | ue(v) |
|     for( j = 0; j <= num_associated_tile_set_identifiers_minus1[ i ]; j++ ) | |
|       mcts_identifier[ i ][ j ] | ue(v) |
|     num_vps_in_extraction_info_set_minus1[ i ] | ue(v) |
|     for( j = 0; j <= num_vps_in_extraction_set_minus1[ i ]; j++ ) | |
|       vps_rbsp_data_length[ i ][ j ] | ue(v) |
|     num_sps_in_extraction_info_set_minus1[ i ] | ue(v) |
|     for( j = 0; j <= num_sps_in_extraction_set_minus1[ i ]; j++ ) | |
|       sps_rbsp_data_length[ i ][ j ] | ue(v) |
|     num_pps_in_extraction_info_set_minus1[ i ] | ue(v) |
|     for( j = 0; j <= num_pps_in_extraction_set_minus1[ i ]; j++ ) { | |
|       pps_nuh_temporal_id_plus1[ i ][ j ] | u(3) |
|       pps_rbsp_data_length[ i ][ j ] | ue(v) |
|     } | |
|   while( !byte_aligned( ) ) | |
|     mcts_alignment_bit_equal_to_zero | f(1) |
|   for( j = 0; j <= num_vps_in_extraction_set_minus1[ i ]; j++ ) | |
|     for( k = 0; k <= vps_rbsp_data_length[ i ][ j ]; k++ ) | |
|       vps_rbsp_data_bytes[ i ][ j ][ k ] | u(8) |
|   for( j = 0; j <= num_sps_in_extraction_set_minus[ i ]; j++ ) | |
|     for( k = 0; k <= sps_rbsp_data_length[ i ][ j ]; k++ ) | |
|       sps_rbsp_data_bytes[ i ][ j ][ k ] | u(8) |
|   for( j = 0; j <= num_pps_in_extraction_set_minus1[ i ]; j++ ) | |
|     for( k = 0; k <= pps_rbsp_data_length[ i ][ j ]; k++ ) | |
|       pps_rbsp_data_bytes[ i ][ j ][ k ] | u(8) |
|   } | |
| } | |

As far as semantics are concerned, the MCTS extraction information set SEI message is an example for information 50 using replacement parameters 56.

The MCTS extraction information set SEI message provides supplemental information to carry out sub-bitstream MCTS extraction as specified below to derive a HEVC conformant bitstream from a motion-constrained tile set, i.e. a set of tiles forming a fragment 84 of the overall picture area. The information consists of a number of extraction information sets, each containing identifiers of the motion-constrained tile sets to which the extraction information set applies. Each extraction information set contains RBSP bytes of replacement video parameter sets, sequence parameter sets and picture parameter sets to be used during the sub-bitstream MCTS extraction process.

Let a set of pictures associatedPicSet be the pictures from the access unit containing the MCTS extraction information set SEI message, inclusive, up to but not including the first of any of the following in decoding order:

The next access unit, in decoding order, that contains an MCTS extraction information set SEI message.
The next IRAP picture with NoRaslOutputFlag equal to 1, in decoding order.
The next IRAP access unit, in decoding order, with NoClrasOutputFlag equal to 1.

The scope of the MCTS extraction information set SEI message is the set of pictures associatedPicSet.

When an MCTS extraction information set tile sets SEI message is present for any picture in associatedPicSet, a temporal motion-constrained tile set SEI message shall be present for the first picture of associatedPicSet in decoding order and may also be present for other pictures of associatedPicSet. The temporal motion-constrained tile sets SEI message shall have with mcts_id[ ] equal to mcts_identifer[ ] for all pictures in associatedPicSet.

When an MCTS extraction information set tile sets SEI message is present for any picture in associatedPicSet, an MCTS extraction information set SEI message shall be present for the first picture of associatedPicSet in decoding order and may also be present for other pictures of associatedPicSet.

The MCTS extraction information set SEI message shall not be present for any picture in associatedPicSet when tiles_enabled_flag is equal to 0 for any PPS that is active for any picture in associatedPicSet.

The MCTS extraction information set SEI message shall not be present for any picture in associatedPicSet unless every PPS that is active for any picture in associatedPicSet has the same values of the syntax elements num_tile_columns_minus1, num_tile_rows_minus1, uniform_spacing_flag, column_width_minus1[i], and row_height_minus1[i].

NOTE 1—This constraint is similar to the constraint associated with tiles_fixed_structure_flag equal to 1, and it may be desirable for tiles_fixed_structure_flag to be equal to 1 when the MCTS extraction information set SEI message is present (although this is not required).

When more than one MCTS extraction information set SEI message is present for the pictures of associatedPicSet, they shall contain identical content.

NAL units that contain tiles belonging to tile set tileSetA shall not contain tiles that do not belong to tile set tileSetA.

The number of MCTS extraction information set SEI messages in each access unit shall not exceed 5.

num_extraction_info_sets_minus1 plus 1 indicates the number of extraction information sets contained in the MCTS extraction information set SEI message to be applied in the mcts extraction process. The value of num_extraction_info_sets_minus1 shall be in the range of 0 to $2^{32}-2$, inclusive.

The i-th extraction information set is assigned a MCTS extraction information set identifier value equal to i.

num_associated_tile_set_identifiers_minus1[i] plus 1 indicates the number of values of mcts_id of the tile sets in the i-th extraction information set. The value of num_extraction_info_sets_minus1 [i] shall be in the range of 0 to $2^{32}-2$, inclusive.

mcts_identifier[i][j] identifies the j-th tile set with mcts_id equal to mcts_identifier[i][j] associated to the i-th extraction information set. The value of mcts_identifier[i][j] shall be in the range of 0 to $2^{32}-2$, inclusive.

num_vps_in_extraction_info_set_minus1[i] plus 1 indicates the number of replacement video parameter sets in the i-th extraction information set. The value of num_vps_in_extraction_info_set_minus1 [i] shall be in the range of 0 to 15, inclusive.

vps_rbsp_data_length[i][j] indicates the number of bytes vps_rbsp_data_bytes[i][j][k] of the following j-th replacement video parameter set in the i-th extraction information set.

num_sps_in_extraction_info_set_minus1[i] plus 1 indicates the number of replacement sequence parameter sets in the i-th extraction information set. The value of num_sps_in_extraction_info_set_minus1 [i] shall be in the range of 0 to 15, inclusive.

sps_rbsp_data_length[i][j] indicates the number of bytes sps_rbsp_data_bytes[i][j][k] of the following j-th replacement sequence parameter set in the i-th extraction information set.

num_pps_in_extraction_info_set_minus1 [i] plus 1 indicates the number of replacement picture parameter sets in the i-th extraction information set. The value of num_pps_in_extraction_info_set_minus1 [i] shall be in the range of 0 to 63, inclusive.

pps_nuh_temporal_id_plus1[i][j] specifies a temporal identifier for generating PPS NAL unit associated with PPS data specified in PPS RBSP specified by pps_rbsp_data_bytes[i][j][ ] for the j-th replacement picture parameter set for the i-th extraction information set.

pps_rbsp_data_length[i][j] indicates the number of bytes pps_rbsp_data_bytes[i][j][k] of the following j-th replacement picture parameter set in the i-th extraction information set.

mcts_alignment_bit_equal_to_zero shall be equal to 0.

vps_rbsp_data_bytes[i][j][k] contains the k-th byte of the RBSP of the following j-th replacement video parameter set in the i-th extraction information set.

sps_rbsp_data_bytes[i][j][k] contains the k-th byte of the RBSP of the following j-th replacement sequence parameter set in the i-th extraction information set.

pps_rbsp_data_bytes[i][j][k] contains the k-th byte of the RBSP of the following j-th replacement picture parameter set in the i-th extraction information set.

The sub-bitstream MCTS extraction process is applied as follows:

Let a bitstream inBitstream, a target MCTS identifier mctsIdTarget, target MCTS extraction information set identifier mctsEISIdTarget and a target highest TemporalId value mctsTIdTarget be the inputs to the sub-bitstream MCTS extraction process.

The output of the sub-bitstream MCTS extraction process is a sub-bitstream outBitstream.

It is a requirement of bitstream conformance for the input bitstream that any output sub-bitstream that is the output of the process specified in this clause with the bitstream shall be a conforming bitstream.

The output sub-bitstream is derived as follows:

The bitstream outBitstream is set to be identical to the bitstream inBitstream.

The lists ausWithVPS, ausWithSPS and ausWithPPS are set to consist of all access units within outBitstream containing VCL NAL units with types VPS_NUT, SPS_NUT and PPS_NUT.

Remove all SEI NAL units that have nuh_layer_id equal to 0 and that contain non-nested SEI messages.

NOTE 2—A "smart" bitstream extractor may include appropriate non-nested SEI messages in the extracted sub-bitstream, provided that the SEI messages applicable to the sub-bitstream were present as nested SEI messages in the mcts_extraction_info_nesting ( ) in the original bitstream.

Remove from outBitstream all NAL units with types:

VCL NAL units that contain tiles not belonging to the tile set with mcts_id[i] equal to mctsIdTarget, non-VCL NAL units with types VPS_NUT, SPS_NUT or PPS_NUT.

Insert into all access units within the list ausWithVPS in outBitstream num_vps_in_extraction_info_minus1 [mctsEISIdTarget] plus 1 NAL units with type VPS_NUT generated from the VPS RBSP data in the mctsEISIdTarget-th MCTS extraction information set, i.e. vps_rbsp_data_bytes[mctsEISIdTarget][j][ ] for all values of j in the range of 0 to num_vps_in_extraction_info_minus1 [mctsEISIdTarget], inclusive. For each VPS_NUT that is generated the nuh_layer_id is set equal to 0 and nuh_temporal_id_plus1 is set equal to 1.

Insert into all access units within the list ausWithSPS in outBitstream num_sps_in_extraction_info_minus1 [mctsEISIdTarget] plus 1 NAL units with type SPS_NUT generated from the SPS RBSP data in the mctsEISIdTarget-th MCTS extraction information set, i.e. sps_rbsp_data_bytes[mctsEISIdTarget][j][ ] for all values of j in the range of 0 to num_sps_in_extraction_info_minus1 [mctsEISIdTarget], inclusive. For each SPS_NUT that is generated the nuh_layer_id is set equal to 0 and nuh_temporal_id_plus1 is set equal to 1.

Insert into all access units within the list ausWithPPS in outBitstream NAL units with type PPS_NUT generated from the PPS RBSP data in the mctsEISIdTarget-th MCTS extraction information set, i.e. pps_rbsp_data_bytes[mctsEISIdTarget][j][ ] for all values of j in the range of 0 to num_pps_in_extraction_info_minus1 [mctsEISIdTarget], inclusive for which pps_nuh_temporal_id_plus1 [mctsEISIdTarget][j] is less than or equal to mctsTIdTarget. For each PPS_NUT that is generated the nuh_layer_id is set equal to 0 and nuh_temporal_id_plus1 is set equal to pps_nuh_temporal_id_plus1[mctsEISIdTarget][j] for all values of j in the range of 0 to num_pps_in_extraction_info_minus1 [mctsEISIdTarget], inclusive for which pps_nuh_temporal_id_plus1[mctsEISIdTarget][j] is less than or equal to mctsTIdTarget.

Remove from outBitstream all NAL units with TemporalId greater than mctsTIdTarget.

For each remaining VCL NAL units in outBitstream, adjust the slice segment header as follows:

For the first VCL NAL unit within each access unit, set the value of first_slice_segment_in_pic_flag equal to 1, otherwise 0.

Set the value of slice_segment_address according to the tile setup defined in the PPS with pps_pic_parameter_set_id equal to slice_pic_parameter_set_id.

The MCTS extraction information nesting SEI message syntax could be designed as:

|  | Descriptor |
|---|---|
| mcts_extraction_info_nesting( ) { | |
|   all_tile_sets_flag | u(1) |
|   if( !all_tile_sets_flag ) { | |
|     num_associated_mcts_identifiers_minus1 | ue(v) |
|     for( i = 0; i <= num_associated_mcts_identifiers_minus1; i++ ) | |
|       mcts_identifier[ i ] | ue(v) |
|   } | |
|   num_seis_in_mcts_extraction_seis_minus1 | ue(v) |
|   while( !byte_aligned( ) ) | |
|     mcts_nesting_zero_bit /* equal to 0 */ | u(1) |
|   for( i = 0; i <= num_seis_in_mcts_extraction_seis_minus1; i++ ) | |
|     sei_message( ) | |
| } | |

As to semantics, it is noted that the MCTS extraction information nesting SEI message may be present in addition to, or alternative to, the MCTS extraction information set SEI message to form information 50.

The MCTS extraction information nesting SEI message provides a mechanism to carry nested SEI messages and associate the nested SEI messages with bitstream subsets corresponding to one or more motion-constrained tile set.

In the sub-bitstream MCTS extraction process as specified in the semantics of the MCTS extraction information set SEI message, the nested SEI messages contained in the MCTS extraction information nesting SEI message can be used to replace the non-nested SEI messages in the access unit that contains the MCTS extraction information nesting SEI message.

all_tile_sets_flag equal to 0 specifies that the mcts_identifier list is set to consist of mcts_identifier[i]. all_tile_sets_flag equal to 1 specifies that the list mcts_identifier[i] consists of all values of mcts_id[ ] of the temporal_motion_constrained_tile_sets SEI messages present in the current access unit.

num_associated_mcts_identifiers_minus1 plus 1 specifies the number of following mcts_identifier. The value of num_associated_mcts_identifiers_minus1 [i] shall be in the range of 0 to $2^{32}-2$, inclusive.

mcts_identifier[i] identifies the tile set with mcts_id equal to mcts_identifier[i] associated to the following nested SEI messages. The value of mcts_identifier[i] shall be in the range of 0 to $2^{32}-2$, inclusive.

num_seis_in_mcts_extraction_seis_minus1 plus 1 indicates the number of the following nested SEI messages.

mcts_nesting_zero_bit shall be equal to 0.

It has already been indicated above that the assessment or generation of information 50, i.e. the information guiding the parameter and/or SEI adaptation, may alternatively be done outside encoder 80, i.e. outside the site of where the actual encoding of pictures 12 into stream 10 is performed. Data stream 10 may, according to such alternative, be transmitted in a manner accompanied by the original parameters 20a and/or original SEI message(s) relating to the unreduced stream 10 only. Optionally, the information concerning the one more supported sub areas 22 of pictures 12 may be present in video stream 10, but even this is not mandatory, as the assessment of information 50 may be based on an evaluation of the tile structure of stream 12 on its own in order to determine the one or more sub areas. In doing so, although the cumbersome task of assessment of information 50 is displaced from the encoder site to some site nearer to the client, or even to the user site, such as immediately upstream the final decoder 82, the obligation of having to transmit the complete, i.e. unreduced, data stream 10, may be avoided by leaving off the transmission of portions 70 of the payload portion 18 referring to an area of the pictures 12 outside an desired subarea 22. The original coding parameter set 20a and/or SEI message(s) relating to the unreduced data stream 12 would naturally be transmitted, too. The network entity 60 which performs the actual reduction or removal 68 of portion 70, could reside, in turn, immediately upstream the entity which performs the assessment of information 50. For example, a streaming device specifically downloads merely the portions of the payload portion 18 of data stream 10, not belonging to portions 70. To this end, some download prescription may be used such as a manifest file. DASH protocol may be used to this end. The assessment of information 50 may, in fact, be done internally in such network device residing in front of decoder, merely as a preparation of the actual parameter adjustment of parameters according to FIG. 3 or 5, respectively, and/or SEI replacement. Altogether, a network device may comprise, in accordance with the just-discussed alternative, an interface for receiving a reduced data stream 10 merely comprising payload portion 18 less portion 70, but still having parameters 20a parameterising the complete coding of pictures 12 into payload portion 18, including portion 70. The location indications 32 may still be the original ones. That is, the data stream received is actually wrongly coded. The received data stream corresponds to data stream 62 shown in FIG. 5 with the parameters 20b, however, still being the original parameters 20a, and the location indications 32 still being wrong. The indices 54 in that stream refer to the parameters 20a in that stream and may not have been modified relative to the original coding of the unreduced data stream. In fact, the unreduced original data stream may merely differ from the received one by omission of portions 70. Optionally, one or more SEI messages are included which, however, refer to the original coding, e.g. the original pictures' 12 size or other characteristics of the complete coding. At the output of such network device, a data stream 62 for being decoded by decoder 82 is output. Inbetween this input and output, a module is connected which adapts SEI message(s) and/or parameters to fit to the subarea 12 with respect to which the inbound data stream 10 has already been subject to reduction. That is, such module would have to perform task 74, namely the adjustment of parameters 20a so as to become parameters 20b, and task 78, i.e. the adjustment of the location indications 32 so as to correctly refer to the circumference of the subarea 22. The knowledge about the subarea 22 with respect to which the reduction has been performed may be internal for such network device in case of the latter specifically restricting a download of stream 10 to portions of payload portion 18 referring to subarea 22, or may be provided from outside in case of another network device which may reside upstream the network device, assuming the task of reduction 68. For the network device comprising the module inbetween input and output, the same statements as made above with respect to network device of FIG. 4, for instance, in terms of implementation in software, firmware or hardware are true. Summarizing the just-outlined embodiment, same relates to a network device configured to receive a data stream which comprises a fraction of a payload portion into which pictures of the video are coded. The fraction corresponds to results when excluding portions 70 from the payload portion 18 which refer to an area of the pictures outside a predetermined subarea 22 of the pictures. The pictures 12 of the video are coded into the payload portion 18 in a manner parameterized, without exclusion, using coding parameter settings in a parameter set portion of the data stream. That is, the parameter set portion of the data stream received correctly parameterizes the coding of pictures 12 into payload portion 18 if portions 70 were not left off. Additionally or alternatively, the pictures 12 of the video are coded into the payload portion 18 in a manner matching, without exclusion, supplemental enhancement information indicated by a supplemental enhancement message of the data stream. That is, the SEI message optionally comprised by the received data stream, actually matches the unreduced payload portion 18. The network device modifies the received data stream by changing 78 the location indications 32 in the payload portion so to indicate a location measured from a circumference of the predetermined subarea 22 instead of the pictures 12, and adjusts the coding parameter settings in the parameter set portion and/or adjust the supplemental enhancement information message so that the modified data stream has the fraction of the payload portion 18, i.e. all but 70 or, differently speaking, subarea-specific pictures 84 showing the predetermined subarea of the pictures, encoded thereinto in a manner correctly parameterized using the coding parameter settings thus adjusted, and/or in a manner matching the supplemental enhancement information supplemental enhancement information indicated by the adjusted supplemental enhancement information message after adjustment. The generation of parameters 20b in addition to parameters 20a has been done by encoder 80 in accordance with the previous embodiments so as to result in a data stream carrying both parameter settings 20a and 20b. Here, in the just-described alternative, the parameters 20a are turned in parameters 20b quasi on the fly. The adjustment of parameters 20a into parameters 20b may use modifying the parameters 20a using the knowledge about subarea 22. For instance, while picture size 26 within setting 20a corresponds to the size of the complete pictures 12, the picture size has to indicate the size of subarea 22 or pictures 86, respectively, after adjustment in setting 20b. Similarly, while tile structure 38 within setting 20a corresponds to the tile structure of the complete pictures 12, the tile structure 38 has to indicate the tile structure of subarea 22 or pictures 86, respectively, after adjustment in setting 20b. Similar statements are true with respect, for instance, but not exclusively, buffer size and timing 46. If no SEI message is resent in the inbound received data stream is present, no adjustment would be needed. Alternatively, an SEI message could simply be left off instead of adjusting it.

With respect to the above embodiments, it is noted that the supplemental enhancement information adaptation may pertain buffer size and/or buffer timing data. In other words, the type of information within the optionally present SEI which is adapted, or differs between original SEI and replacement SEI, to conform to the stripped or reduced video stream, may pertain, at least partially, buffer size and/or buffer timing data. That is, SEI data in stream 10 may have buffer size and/or buffer timing data relating to the complete coding while the replacement SEI data, conveyed in addition to the former one as described with respect to FIG. 1, or generated on the fly as described in the previous paragraph, has buffer size and/or buffer timing data relating to the reduced stream 62 and/or reduced pictures 86.

The following description concerns the second aspect of the present application, namely a concept for enabling a more efficient conveyance of video data which is not adapted to the usually rectangular picture shapes of video codecs. Just as before, with respect to the first aspect, the following description starts with a kind of introduction, namely the exemplary description of applications where such problems may occur in order to motivate the advantages resulting from the embodiments described thereinafter. Again, it should be noted, however, that this preliminary description should not be understood as restricting the broadness of the subsequently described embodiments. Beyond that, it is noted that the aspect of the present application described next is also combinable in an advantageous way with the embodiment described above. Details in this regard are also set out below.

The problem described next arises from the various projections that are used for panoramic video, especially when processing such as the above described sub-region extraction is applied.

Figure 14:
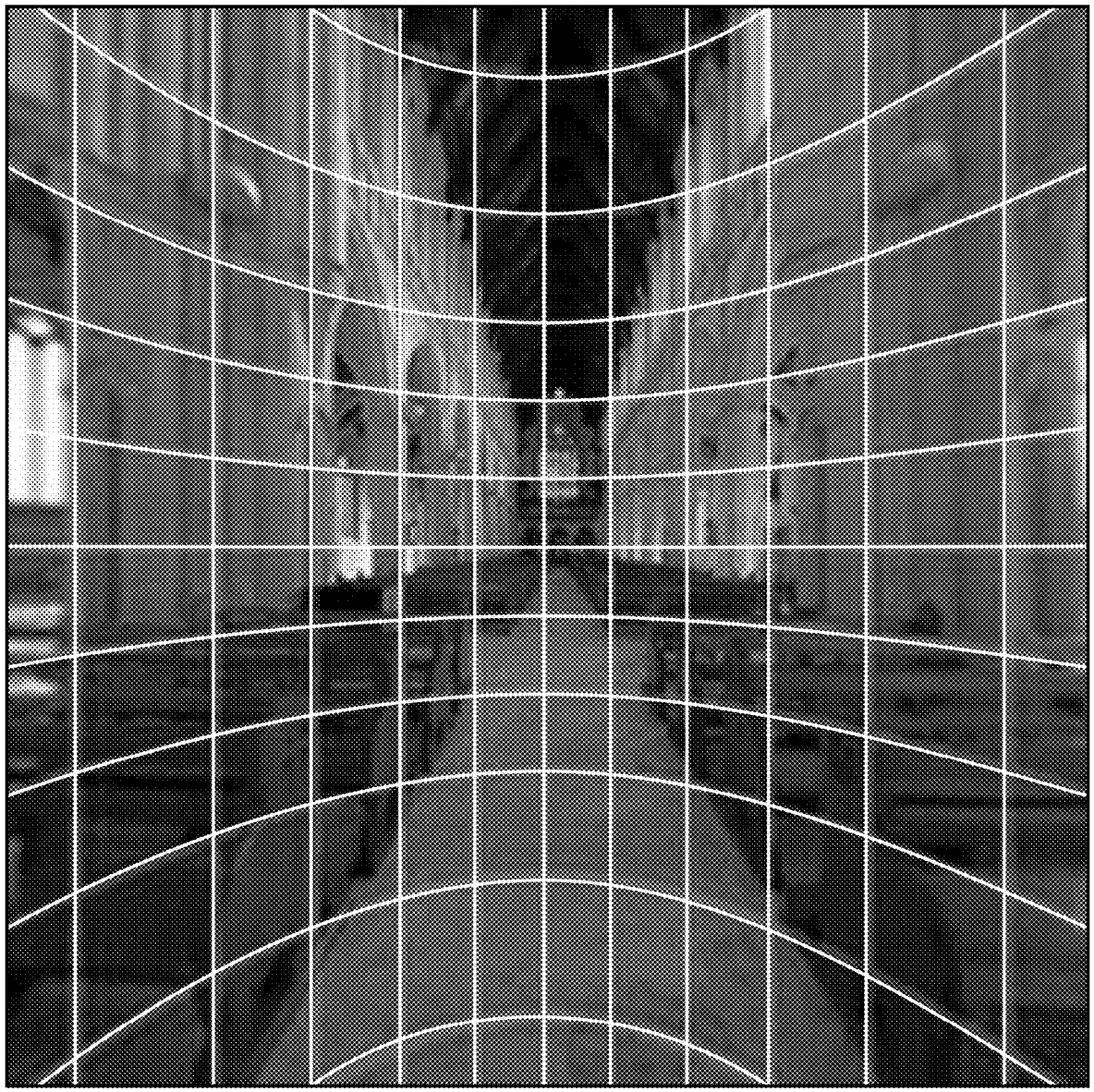
FIG. 14 shows an example of a picture obtained by rectilinear prediction of a panoramic scene.

Exemplarily, a so-called cubic projection is used in the following explanation. The cubic projection is a special case of the rectilinear projection, also referred to as gnomonic projection. This projection describes the transformation approximated for most conventional camera systems/lenses when an image representation of a scene is acquired. Straight lines in the scene are mapped to straight lines in the resulting image as illustrated in FIG. 14.

Figure 15:
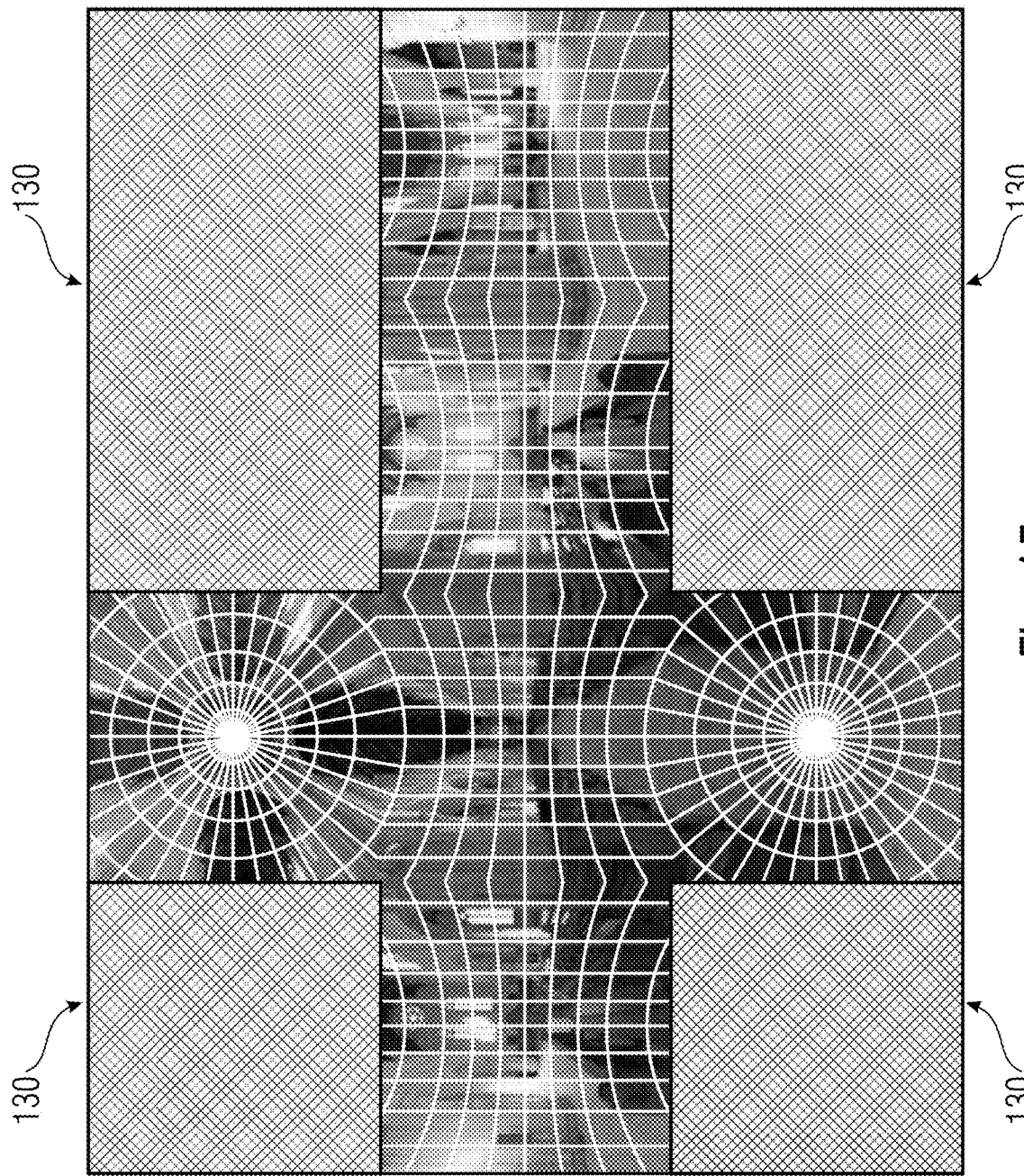
FIG. 15 shows an example of a picture carrying picture content corresponding to a cubic projection of a panoramic scene.

The cubic projection now applies a rectilinear projection to map the surroundings of a cube to its six faces, each with a 90°×90° viewing angle from the center of the cube. The result of such as cubic projection is shown as Picture A in FIG. 15. Other arrangements of the six faces in a common image are possible as well.

Figure 16:
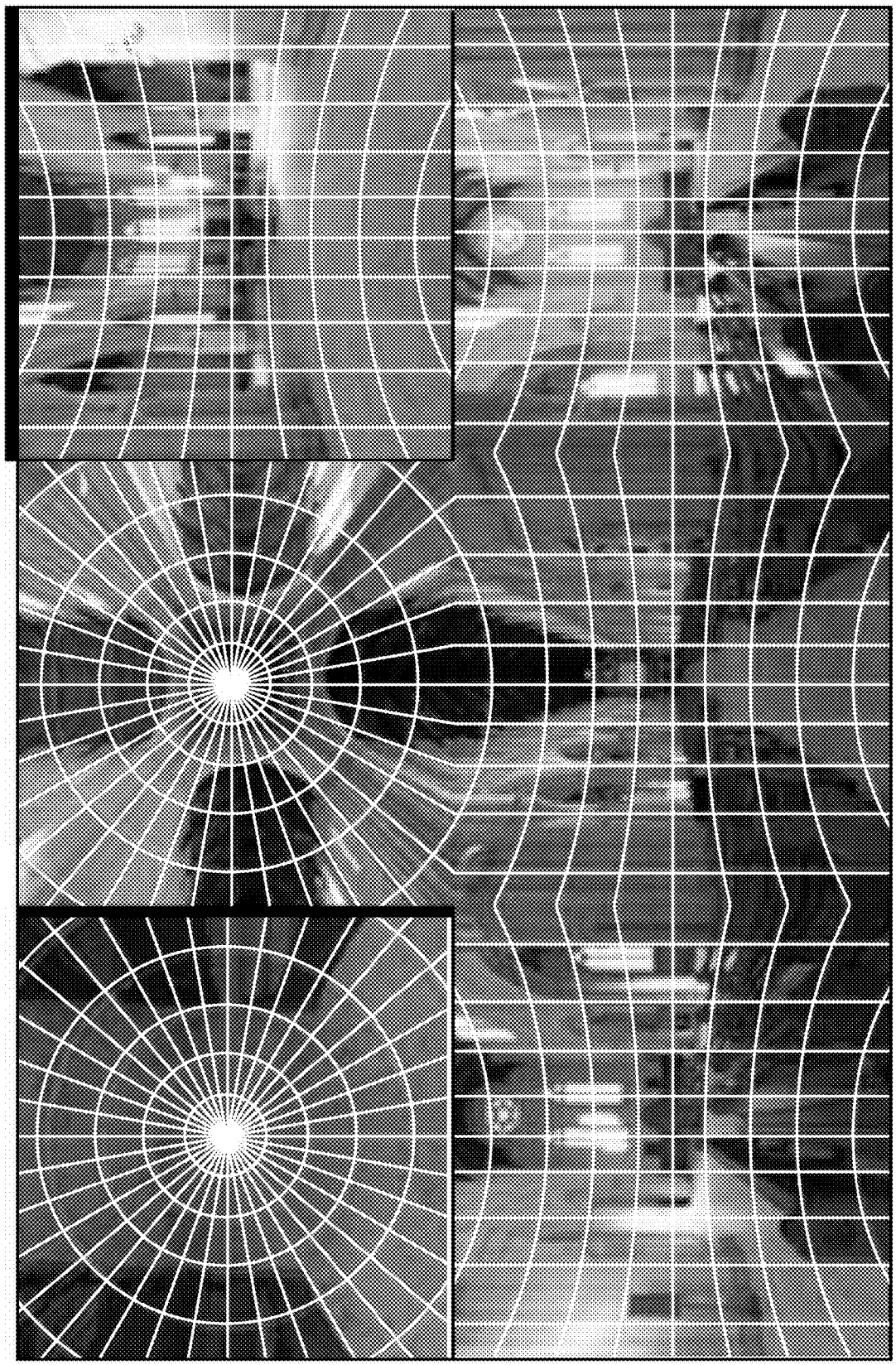
FIG. 16 shows a picture efficiently filled using the cubic projection content of FIG. 15 by rearrangement.

Now to derive a more coding friendly representation of such of resulting Picture A (i.e. less unused image area 130 and a rectangular shape), image patches could be displaced within the picture, e.g. as illustrated in FIG. 16, to derive Picture B.

From a system perspective, it is vital to have an understanding of how the various image patches within the Picture B (FIG. 16) spatially relate to the original (world-view-wise) continuous representation in Picture A, i.e. additional information to derive Picture A (FIG. 15) given representation in the Picture B. Especially under the circumstance that process such as the above described sub-region extraction in the coded domain according to FIGS. 1 to 13 is carried out on server side or network element. In this case, only part of Picture B as indicated through the disjoint ROI 900 in Fig. A is available at the end device. The end device may be able to remap the relevant regions of a given (partial) video to the correct position and areas that the end display/rendering device expects. A server or network device altering the coded video bitstream according to the above extraction process may create and add or adjust respective signaling displacement signaling depending on the altered video bitstream.

Therefore, the subsequently described embodiments provide signaling that indicates within the video bitstream (rectangular) groups of samples of Picture B. Further, the displacement of each group of samples with respect to the samples of Picture B in horizontal and vertical direction. In a further embodiment, the bitstream signaling includes explicit information about the resulting picture size of Picture A. Further, default luma and chroma values of samples not covered by the displaced group of sample or the samples originally covered by the displaced group of samples. Further, part of the samples of Picture A can be assumed to be initialized with the sample values of corresponding samples in Picture B.

Exemplary embodiment is given in the syntax table in FIG. 17.

A further embodiment utilizes the tile structure signaling for indication of the samples belonging to a sample group to be displaced.

Figure 18:
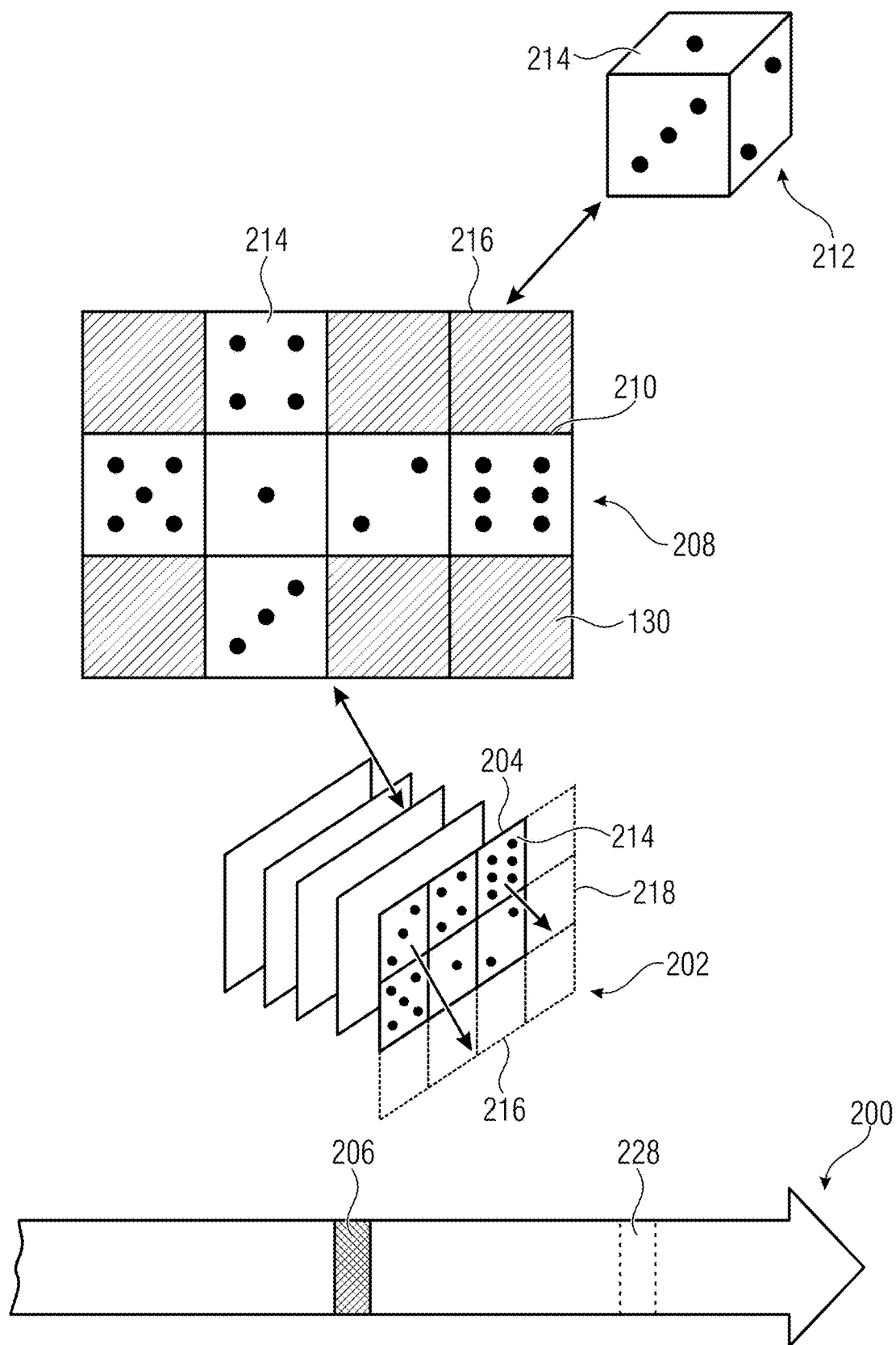
FIG. 18 shows a schematic diagram illustrating a construction of a video data stream in accordance with an embodiment pertaining to the second aspect of the present application.

With respect to FIG. 18, an embodiment of a data stream 200 in accordance with the second aspect is shown. Data stream 200 has a video 202 encoded thereinto. It should be noted that the embodiment of FIG. 18 may be amended to refer to one picture encoded into data stream 200 only, but in order to ease the understanding of those examples where the embodiment in accordance with the second aspect is combined with embodiments of any of the other aspects of the present application, FIG. 18 shows the example where data stream 200 is a video data stream rather than a picture data stream. As just mentioned, data stream 200 has pictures 204 of video 202 encoded thereinto. Additionally, however, the video data stream 200 comprises displacing information 206. The displacing information has the following significance. Actually, data stream 200 would have to convey picture content in pictures 204, which has a non-rectangular outer circumference. FIG. 18 shows an example of such a picture content at reference sign 200. That is, picture content 208 shows the picture content which data stream 200 is to convey for one timestamp, i.e. within one picture 204. The outer circumference 210 of the actual picture content, however, is non-rectangular. In the example of FIG. 18, the actual picture content rather corresponds to a winding-off of the six sides of a cube 212, the sides of which are illustratively distinguished from one another in FIG. 18 using the usual distribution of the numbers 1 to 6 onto the six sides of the cube 212, namely such that the numbers of opposing sides results in a sum equal to 7. Each side thus represents one subregion 214 of the actual picture content 208 and may, for instance, represent a suitable projection of a sixth of a complete three-dimensional panorama scene onto the respective subregion 214, which is, according to this example, of square shape. However, as already mentioned above, the subregions 214 may also of a different shape and may be arranged within the picture content 208 in a manner different from a regular arrangement in rows and columns. In any case, the actual picture content depicted in 208 is of non-rectangular shape, and accordingly the smallest possible rectangular target picture area 216 completely encompassing the winded-off panoramic content 208 has unused portions 130, i.e. portions not occupied by the actual picture content pertaining to the panoramic scene.

Accordingly, in order not to "waste" picture area in the pictures 204 of the video 202 conveyed within data stream 200, pictures 204 carry the complete actual picture content 208 in a manner where the spatial relative arrangement of the subregions 214 is changed relative to their arrangement within the target picture area 216.

As illustrated in FIG. 18, FIG. 18 illustrates an example where four of the subregions, namely subregions 1, 2, 4 and 5, do not have to be displaced upon an undistorted or congruent copying of picture 204 onto target picture area 216, whereas, however, subregions 3 and 6 have to be displaced. Exemplarily, in FIG. 18 the displacements are pure translatory replacements which may be described by two-dimensional vectors 218, but in accordance with an alternative embodiment, more complicated displacements may be chosen, such as, for instance, displacements additionally including a scaling of the respective subregion when transitioning between picture 204 on the one hand and target picture area 216 on the other hand and/or a reflection (mirroring) and/or a rotation. The displacing information 206 may indicate, for each of a set of at least one predetermined subregion of pictures 204, the displacement of the respective subregion within the target picture area 216 relative to the undistorted or undisplaced copying of picture 204 into the target picture area 216. For instance, in the example of FIG. 18, the displacing information 206 may indicate the displacement for the set of subregions 214 encompassing subregions 3 and 6 only. Alternatively, displacing information 206 may indicate the displacement for subregions 214, or the displaced set of subregions 214, relative to some default point of the target area 216 such as the upper left corner thereof. By default, the remaining subregions within picture 204, in the example of FIG. 18 1, 2, 4 and 5, could be treated as remaining as they are upon their undistorted or congruent copying, e.g. relative to the default point, onto target picture 216.

Figure 19:
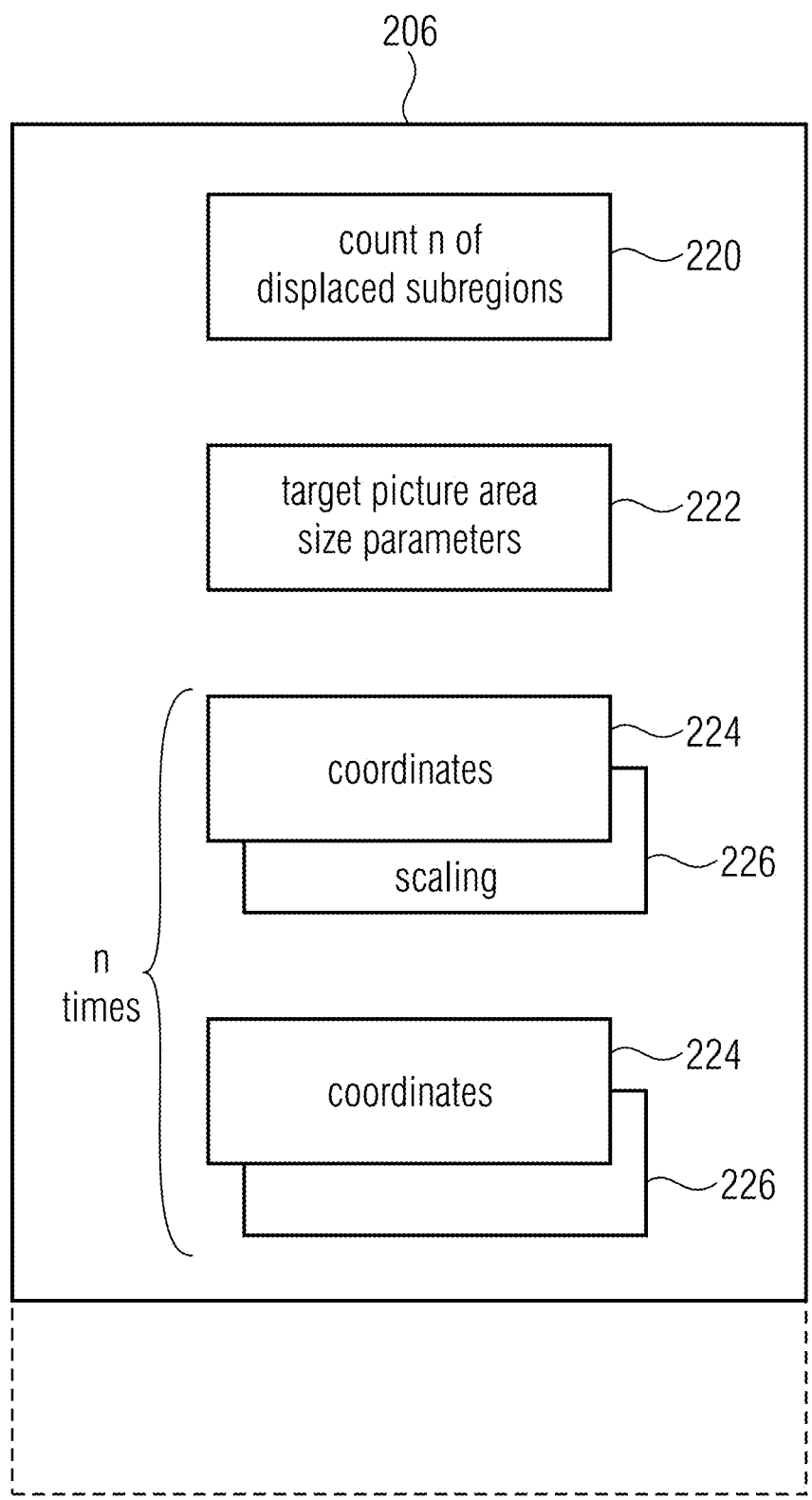
FIG. 19 shows a schematic diagram illustrating a possible content of the displacing information in accordance with an embodiment.

FIG. 19 illustrates that the displacing information may comprise a count 220 of the subregions 214 to be displaced, target picture area size parameters indicating the size of the target picture area 216, 222, and for each of the n displaced subregions, coordinates 224 describing the displacement 218 of the respective subregion 214 to be displaced, measuring, for instance, the displacement relative to the aforementioned default point, or relative its position when mapping subregions 214 in their original constellation within picture 204 onto target area 216. In addition to the coordinates 224, the information 206 could comprise a scaling 226 for each subregion 214 to be displaced, i.e. the indication of how the respective subregion 214 is to be scaled when mapping the respective subregion 214, displaced according to the respective coordinates 224, within the target picture area 216. The scaling 226 may result in a magnification or demagnification relative to the non-displaced subregions 214. Even alternatively, a horizontal and/or vertical reflection and/or rotation could be signaled for each subregion 214. And even further, displacement information 206 could comprise for each subregion to be displaced, or arranged within, target area 216, coordinates for an upper left corner and coordinates for a lower-right corner of the respective region, again both measured against the default point or the respective corners when mapping the respective subregion 214 onto target area 216 without displacement. Thereby, placement, scaling and reflection may be signaled. Subregions 214 of the transmitted pictures 204 may, thus, be displaced relative to their original relative arrangement in pictures 204 freely.

The displacing information 206 could, for instance, have a scope, i.e. validity, for a temporal interval of video 202 greater than one timestamp or one picture 204 such as, for example, for a sequence of pictures 204 or the whole video 202. Moreover, FIG. 18 illustrates that data stream 200 may, optionally, also comprise default filling information 228 which indicates a default filling using which portions 130 of the target picture area are to be filled at the decoding side, i.e. those portions 130 not covered by any of the subregions 214, i.e. any one of the displaced or non-displaced subregions 214 of picture 204. In the example of FIG. 18, for instance, subregions 1, 2, 4 and 5 form a non-displaced portion of pictures 204, which is shown non-hatched in FIG. 18, while the remainder of pictures 204, namely subregions 3 and 6, are shown hatched in FIG. 18, and all of these six subregions do not cover the hatched portion 130 in the target picture area 216 after subregions 3 and 6 being displaced according to information 206 so that portion 130 would be filled according to the default filling information 228.

Figure 20:
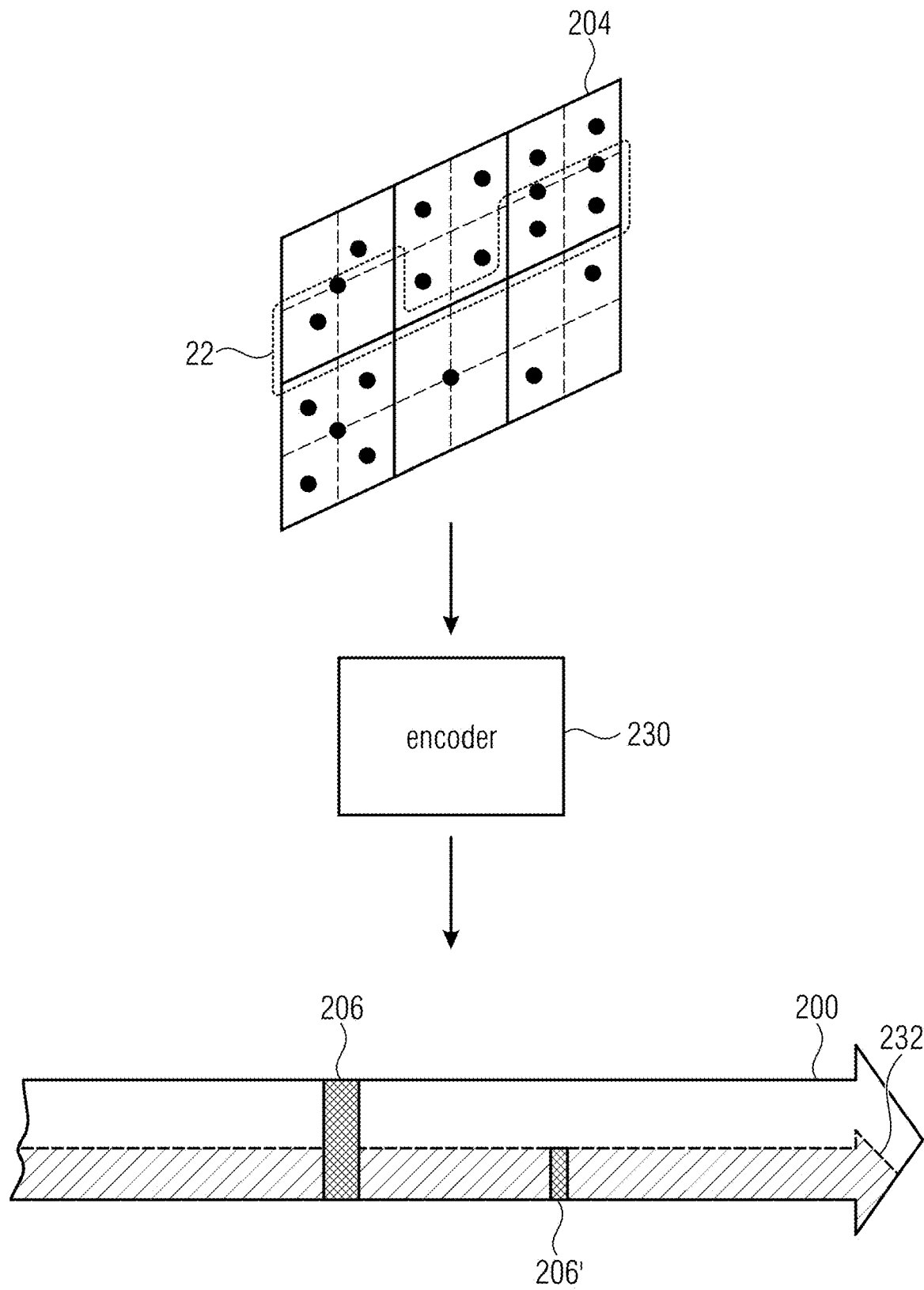
FIG. 20 shows a schematic diagram illustrating an encoder configured to form a data stream comprising displacing information and concurrently being reducible.

An encoder 230 suitable for generating data stream 200 is illustrated in FIG. 20. Encoder 230 simply accompanies, or provides, data stream 200 with information 206 indicating the displacements which may be used in order to fill a target picture area using picture(s) 204 which encoder 230 also encodes into data stream 200. FIG. 20 additionally illustrates that encoder 230 may, for instance, generate data stream 200 so as to be reducible in a compliance maintaining manner such as data stream 10 of the embodiments of FIGS. 1 to 13. In other words, encoder 230 may be embodied in a manner so as to also implement encoder 80 of FIG. 1. For illustration purposes, FIG. 20 illustrates the case where picture 204 is subdivided into an array of subregions 214, namely a 2×3 array of subregions according to the example of FIG. 18. Picture 204 may correspond to picture 12, i.e. to the picture of the non-reduced data stream 200. FIG. 20 exemplarily illustrates a subarea 22 with respect to which encoder 230 renders data stream 200 reducible. As explained with respect to FIG. 1, several such subregions 22 may exist. By this measure a network device is able to reduce data stream 200 so as to merely extract a fraction of data stream 200 so as to obtain a reduced video data stream, the pictures 86 of which merely show subarea 22. The reduced video data stream to which data stream 200 is reducible and which pertains to subarea 22, is illustrated in FIG. 20 using reference sign 232. While pictures 204 of the unreduced video data stream 200 show pictures 204, the pictures of the reduced video data stream 232 merely show subarea 22. In order to provide a recipient, such as a decoder, receiving the reduced video data stream 232 with the ability to fill the target picture area with the content of the pictures of the reduced video data stream 232, encoder 230 may additionally provide video data stream 200 with a displacing information 206' which is specific for subarea 22. A network device, such as for instance 60 of FIG. 4, may, in case of reducing video data stream 200 to result in reduced video data stream 232, remove displacing information 206 and merely take over displacing information 206' into the reduced video data stream 232. By this measure a recipient, such as a decoder, is able to fill the content of the pictures of the reduced video data stream 232, which pertains to the content of subarea 22, onto the target picture area 216 shown in FIG. 18.

Again, it should be emphasized that FIG. 20 should not be understood as being restricted to reducible video data streams. If video data stream 200 is reducible, a concept may be used which is different from the one presented above with respect to FIGS. 1 to 13.

Figure 21:
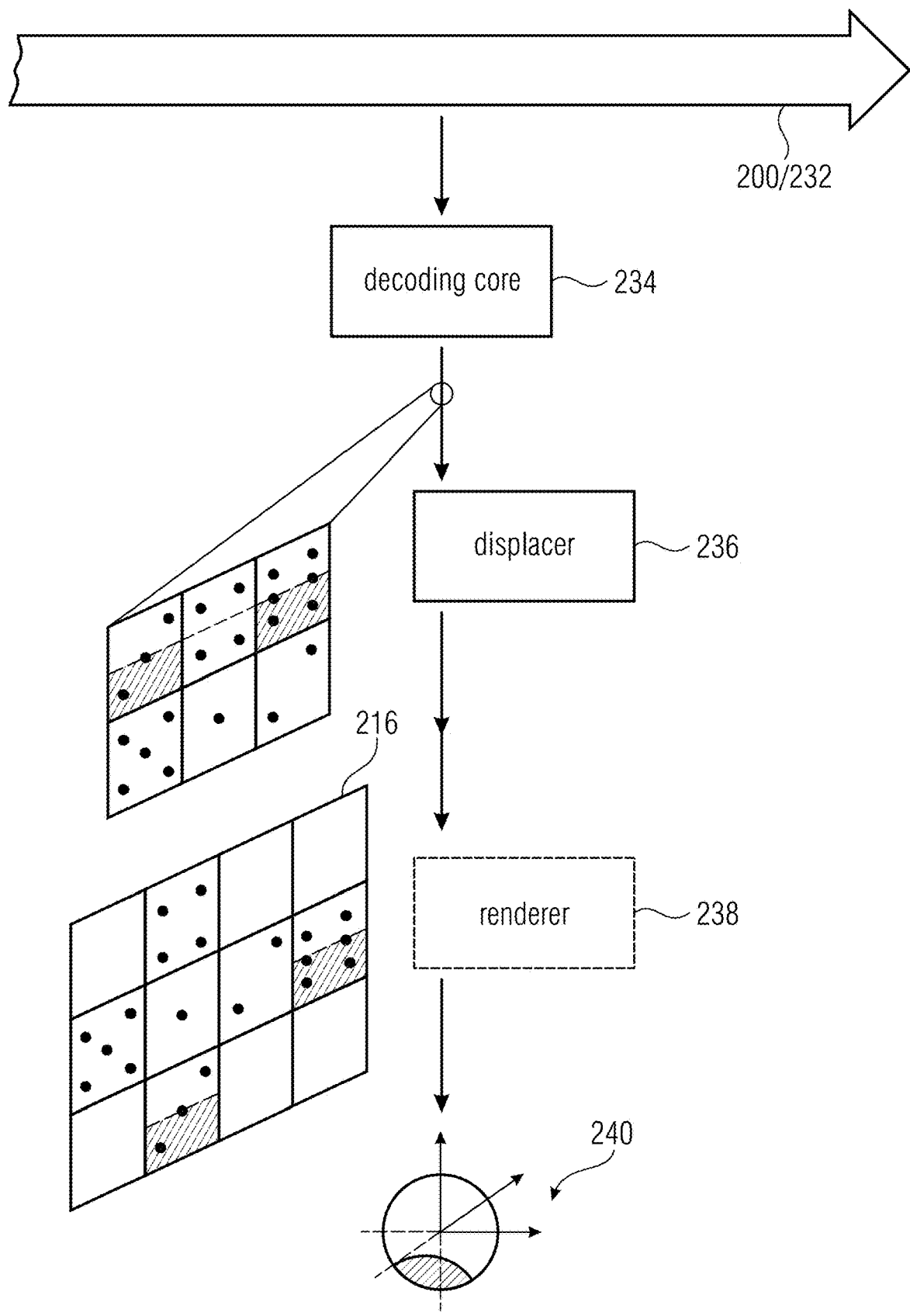
FIG. 21 shows a schematic diagram illustrating a decoder configured to receive a data stream comprising displacing information in order to illustrate a possibility how the displacing information may advantageously be used.

FIG. 21 shows a possible recipient: a decoder 234 receives video data stream 200 or the reduced video data stream 232 and reconstructs therefrom the pictures thereof, i.e. pictures 204 or the pictures merely showing subarea 22 on the basis of the reduced video data stream 232, respectively. The recipient is a decoder and comprises, besides decoding core 234, a displacer 236 which uses the displacing information, namely 206 in the case of video data stream 200 and 206' in the case of the reduced video data stream, in order to fill, based on the picture content, the target picture area 216. The output of displacer 236 is, accordingly, a target picture area 216 filled for each picture of the respective data stream 200 or 232. As explained above, some portions of the target picture area remain unfilled by the picture content. Optionally, a renderer 238 may be connected subsequent to, or to the output of, displacer 236. Render 238 applies an injective projection to the target picture formed by the target picture area 216—or at least a subarea thereof lying within the filled area of the target picture area—so as to form an output picture or output scene 240 corresponding to a scene section currently looked at. The injective projection performed by renderer 238 may be the inverse of a cubic projection.

Thus, above embodiments enable a rectangular regionwise packing of picture data of a panoramic or semi-panoramic scene or the like. A specific syntax example could be provided as follows. Below, there is presented a syntax example in form a pseudo code, called RectRegionPacking (i), which specifies how a source rectangular region of a projected frame, i.e. 216, is packed onto a destination rectangular region of a packed frame, i.e. onto 204. Horizontal mirroring and rotation by 90, 180, or 270 degrees can be indicated, and vertical and horizontal resampling are inferred from the width and height of regions.

```
aligned(8) class RectRegionPacking(i) {unsigned int(32) proj_reg_width[i];
    unsigned int(32) proj_reg_height[i];
    unsigned int(32) proj_reg_top[i];
    unsigned int(32) proj_reg_left[i];
    unsigned int(8) transform_type[i];
    unsigned int(32) packed_reg_width[i];
    unsigned int(32) packed_reg_height[i];
    unsigned int(32) packed_reg_top[i];
    unsigned int(32) packed_reg_left[i];
}
```

The semantics are as follows.

proj_reg_width[i], proj_reg_height[i], proj_reg_top[i] and proj_reg_left[i] are indicated in units of pixels in a projected frame, i.e. 216, with width and height equal to proj_frame_width and proj_frame_height, respectively. i is the index if the respective region, i.e. of the tile 214 when comparing with FIG. 18. proj_reg_width[i] specifies the width of the i-th region of the projected frame. proj_reg_width[i] shall be greater than 0. proj_reg_height[i] specifies the height of the i-th region of the projected frame. proj_reg_height[i] shall be greater than 0. proj_reg_top[i] and proj_reg_left[i] specify the top sample row and the left-most sample column in the projected frame. The values shall be in the range from 0, inclusive, indicating the top-left corner of the projected frame, to proj_frame_height and proj_frame_width, exclusive, respectively. proj_reg_width[i] and proj_reg_left[i] shall be constrained such that proj_reg_width[i]+proj_reg_left[i] is less than proj_frame_width. proj_reg_height[i] and proj_reg_top[i] shall be constrained such that proj_reg_height[i]+proj_reg_top[i] is less than proj_frame_height. When the projected frame 216 is stereoscopic, proj_reg_width[i], proj_reg_height[i], proj_reg_top[i] and proj_reg_left[i] shall be such that the region identified by these fields on the projected frame is within a single constituent frame of the projected frame. transform_type[i] specifies the rotation and mirroring that has been applied to the i-th region of a projected frame to map it to the packed frame and, thus, the mapping that has to be reversed in order to be map a respective region 214 back into area 216. Naturally, the mapping from picture 204 to target area 216 could be indicated. When transform_type[i] specifies both rotation and mirroring, rotation is applied after mirroring. The opposite would, naturally, be possible as well. The following values are specified in accordance with an embodiment, while other values might be reserved:

1: no transform, 2: mirroring horizontally, 3: rotation by 180 degrees (counter-clockwise), 4: rotation by 180 degrees (counter-clockwise) after mirroring horizontally, 5: rotation by 90 degrees (counter-clockwise) after mirroring horizontally, 6: rotation by 90 degrees (counter-clockwise), 7: rotation by 270 degrees (counter-clockwise) after mirroring horizontally, 8: rotation by 270 degrees (counter-clockwise). Please note that the values correspond to the EXIF orientation tag.

packed_reg_width[i], packed_reg_height[i], packed_reg_top[i], and packed_reg_left[i] specify the width, height, the top sample row, and the left-most sample column, respectively, of the region in the packed frame, i.e. the area covered by a tile 214 in picture 204. The rectangle specified by packed_reg_width[i], packed_reg_height[i], packed_reg_top[i], and packed_reg_left[i] shall be non-overlapping with the rectangle specified by packed_reg_width[j], packed_reg_height[j], packed_reg_top[j], and packed_reg_left[ ] for any value of j in the range of 0 to i−1, inclusive.

Summarizing and generalizing the just-outlined example, the embodiments described further above may be varied in that, for each of regions or tiles 214 of picture 214, two rectangular areas are indicated, namely the area the respective region or tile 214 covers within the target area 216 and the rectangular area the respective region or tile 214 covers within picture area 204, as well as mapping rules for mapping the picture content of the respective region or tile 214 between those two areas, namely reflection and/or rotation. A scaling is may be signalled by signalling a pair of areas of different size.

In the following, the third aspect of the present application is described. The third aspect is concerned with an advantageous concept of distributing access points in a video data stream. In particular, access points pertaining to one of more subareas of the pictures encoded into the video data stream are introduced. The advantages resulting therefrom are described in the following. As with the other aspects of the present application, the description of the third aspect will being with an introduction which describes the problems occurring. Like the description of the first aspect, this introduction exemplarily refers to HEVC, but this circumstance shall, again, not be interpreted as restricting the subsequently explained embodiments so as to refer to HEVC and an extension thereof only.

In context of the TMCTS systems presented above, tile specific random access points may provide a clear benefit. Random access in tiles at different time instances would enable a more equal distribution of bit rate peaks across the pictures within a video sequence. All or a subset of the mechanisms for picture specific random access in HEVC can be transferred to tiles.

One of the picture specific random access mechanisms is the indication of a intra coded picture or access units from which on no picture following in a) presentation order or b) coding and presentation order inherits prediction dependencies to picture samples before the intra coded picture. In other words, a reference picture buffer reset is indicated, either in case b) instantaneously or a) from the first following trailing picture on. In HEVC, such access units are signaled on the network abstraction layer (NAL) through specific NAL unit types, i.e. so-called intra random access point (IRAP) access units, such as BLA, CRA (both above category a) or IDR (above category b). Embodiments described further below, may use a NAL unit header level indication, e.g. through a new NAL unit type, or for the sake of backward compatibility, an SEI message, that indicates to a decoder or a network middle box/device that a given access unit contains at least one intra coded slice/tile for which conditions a) or b), i.e. some form of a reference picture buffer reset, apply on a per slice/tile basis. Further, the slice/tile can be identified through an indication on slice header level with respect to the picture on the encoder side, in addition to, or alternatively to, the NAL unit type signalization. An advance decoding operation allows thus to reduce DPB size needed for decoding after extraction.

For this purpose, the constraints expressed with fixed_tile_structure enabled may be fulfilled and samples of the tile before the indicated access unit should not be referenced by the same tile (and any other tile) of the current picture.

In accordance with some embodiments, an encoder could constrain coding dependency through temporal prediction between subregions in a fashion so that for each subregion experiencing RA, the picture regions used as reference for temporal prediction in reference pictures is extended by the picture area covered by further subregions once these further subregions undergo RA as well. These slices/tiles/subregions are indicated within the bitstream, e.g. on NAL unit or slice level or SEI message. Such a structure hinders an extraction of a subregion, but lessens the penalty of constrained temporal prediction. The type of subregion random access (allowing extraction or not) may be distinguishable from the bitstream indication Another embodiment takes advantage of the above signaling opportunity by employing a certain structure of coding dependencies. In this structure, picture wise random access points exist on a coarse temporal granularity that enables instantaneous random access without drift at certain time instants and the existing state-of-the-art signaling.

However, on a finer temporal granularity, the coding structure allows for tile wise random access, which distributes the bitrate burden of intra coded pictures samples over time towards a less varying bitrate behavior. For backward compatibility this tile-wise random access may be signaled through an SEI message, keeping respective slices as non-RAP pictures.

In a sub picture bitstream extraction process, the type of NAL units indicated through above SEI messages indicating tile based random access within such a stream structure would be changed to picture wise random access as appropriate to signal the opportunity for instantaneous random access at respective pictures of the extracted sub bitstream.

Figure 22:
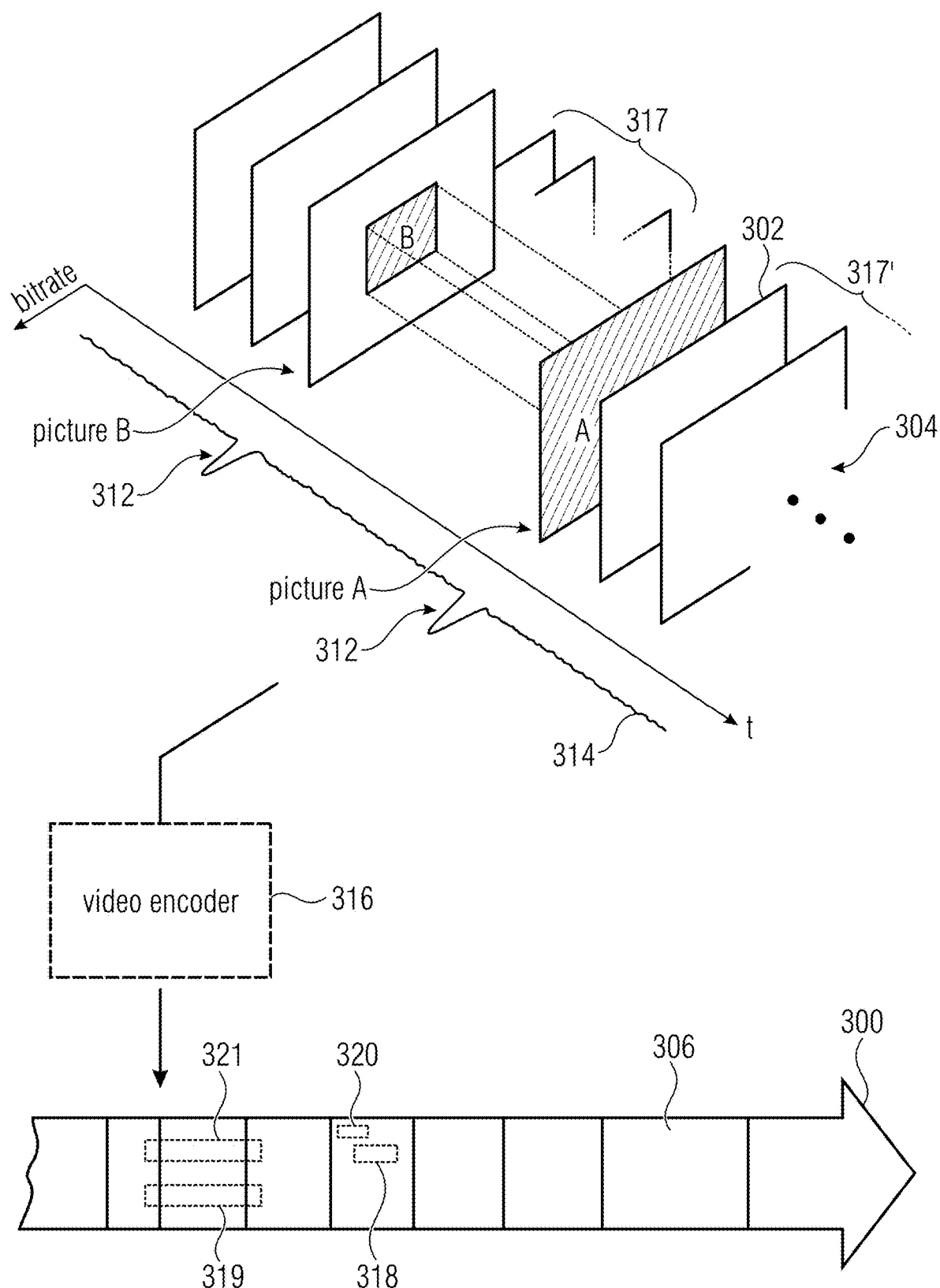
FIG. 22 shows a schematic diagram illustrating a video data stream comprising subarea-specific random access pictures in accordance with an embodiment pertaining to a further aspect to the present application.

A video data stream 300 in accordance with an embodiment of the third aspect of the present application is described with respect to FIG. 22. The video data stream 300 has encoded thereinto a sequence of pictures 302, i.e. a video 304. As with the other embodiments described before, the temporal order at which the pictures 302 are depicted may correspond to the presentation time order which may or may not coincide with the decoding order at which pictures 302 are encoded into data stream 300. That is, although not described with respect to other figures before, video data stream 300 may be subdivided into a sequence of access units 306, each being associated with a respective one of pictures 302, the order of which pictures 302 are associated with the sequence of access units 306 corresponding to the decoding order.

Pictures 302 are encoded into video data stream 300 using temporal prediction. That is, predictively coded pictures among pictures 302 are coded using temporal prediction based on one or more temporal reference pictures preceding the respective picture in decoding order.

Instead of merely having one type of random access picture, video data stream 300 comprises at least two different types thereof, as described later. In particular, usual random access pictures are pictures where temporal prediction is not used. That is, the respective picture is coded in a manner independent from any previous picture in decoding order. For these usual random access pictures, the suspension of temporal prediction relates to the complete picture area. In accordance with the embodiments described hereinafter, video data stream 300 may or may not comprise such usual picture-wise random access pictures.

As just described, random access pictures do not depend on previous pictures in decoding order. Thus, they allow for a random access into decoding video data stream 300. Coding a picture without temporal prediction, however, means coding penalties in terms of compression efficiency. Accordingly, usual video data streams suffer from bitrate peaks, i.e. bitrate maxima, at the random access pictures. These problems may be solved by way of the embodiments described above.

In accordance with the embodiment of FIG. 22, video data stream 300 comprises a first set of one or more pictures of type A, which are encoded into the video data stream 300 while suspending temporal prediction at least within a first picture subarea A to form a set of one or more first random access points, and a second set of one or more pictures of type B encoded into the video data stream 300 while suspending temporal prediction within a second picture subarea B, different from the first picture subarea A, to form a set of one or more second random access points of video data stream 300.

Figure 23A:
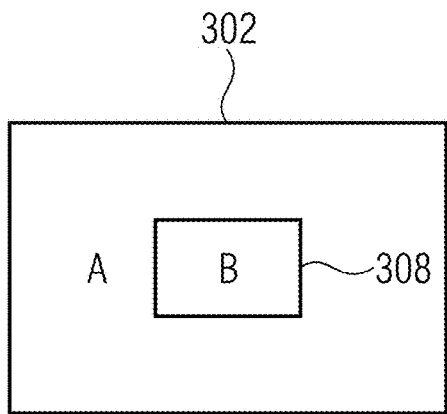
FIG. 23a-23e show schematic diagrams illustrating possible arrangements of the subareas used in accordance with different alternatives.
Figure 23B:
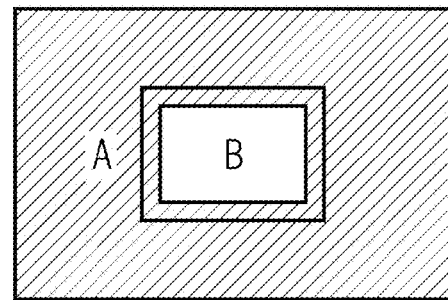
Figure 23C:
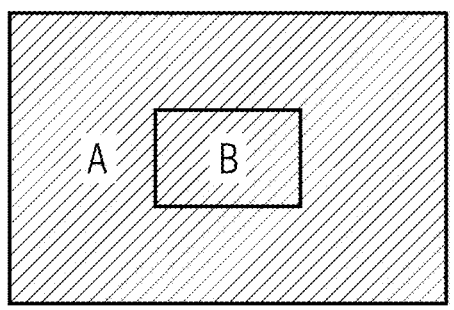
Figure 23D:
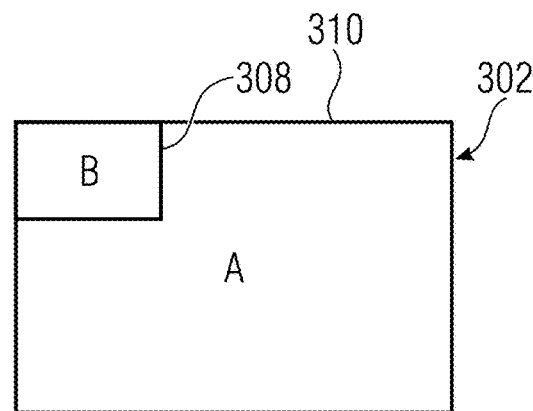
Figure 23E:
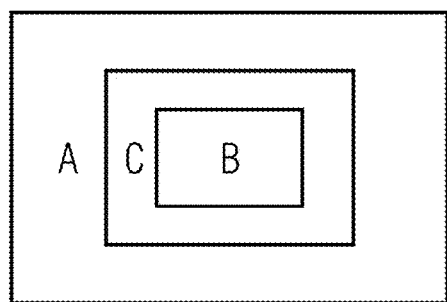

In the case of FIG. 22, the first and second picture subareas A and B are illustrated using hatching, and are, as illustrated in FIG. 23a, non-overlapping each other, wherein subareas A and B abut each other along a common border 308 so that subareas A and B cover the whole picture area of pictures 302. However, this may not be the case. As shown in FIG. 23b, subareas A and B may partially overlap or, as shown in FIG. 23c, the first picture area A may in fact cover the whole picture area of pictures 302. In case of FIG. 23c, pictures of type A would be picture-wise random access points where temporal prediction is completely switched off, i.e. are encoded into data stream 300 without any temporal prediction throughout the respective picture. For the sake of completeness, FIG. 23d shows that subarea B does not need to be positioned in the inside of picture area 302, but could also border two pictures' 302 outer picture border 310. FIG. 23e illustrates that there may, in addition to pictures of type A and B, be pictures of type C with an associated subarea C, which together completely cover pictures' 302 picture area.

The result of restricting the area within pictures B and A of FIG. 22, within which temporal prediction is suspended, to subareas A and B is the following: usually the bitrate for encoding a picture 302 into video data stream 300 is large for pictures forming a random access point because temporal prediction is refrained from being used throughout the respective picture area and prediction from previous pictures (in decoding order) is broken for successive pictures (at least in presentation order). In case of pictures of types A and B in FIG. 22, the avoidance of the use of temporal prediction is used in subarea A and B, respectively, only so that the bitrate peak 312 at these pictures A and B is comparatively low compared to picture-wise random access point pictures. As described in the following, however, the reduction in bitrate peak 312 comes at relatively low cost apart from the coding dependency constraints at subarea boundaries, at least with respect to complete-picture random access rate. This is illustrated in FIG. 22: Here, curve 314 shall represent the function which shows the temporal variation of the bitrate dependent on time t. As explained, the peaks 312 at the time instants of pictures A and B are lower than a peak which would result from a picture-wise random access picture. Compared to the case of merely using picture-wise random access pictures, the picture-related random access rate of video data stream 300 corresponds to the rate at which subarea related random access pictures are traversed which together cover the whole picture area, in the case of FIG. 22 the rate at which at least one picture of type B and at least one picture of type A are encountered. Even in case of the presence of usual picture-wise random access pictures within video data stream 300 as it is the case in the example of FIG. 23c, namely pictures A, there are advantages over the usual video data streams where merely such pictures are temporally distributed over the video data stream. In particular, in such a case the existence of the subarea-related random access pictures, namely pictures B in the case of FIG. 23c, may be exploited as explained in more detail below so as to reduce the picture rate of pictures A which come along with a high bitrate peak, but with compensating the increased random access latency by interspersing pictures of type B into the video data stream 300 between pictures of type A, thereby allowing for a subarea-restricted random access into the video data stream to bridge the time until the next picture-wise random access point is encountered, i.e. next picture A.

Before proceeding with the description of a decoder which takes advantage of the special type of random access pictures within video data stream 300, some notes shall be made on subarea B and/or subarea A and the way pictures 302 are encoded into video data stream 300 by taking the subareas into account beyond the suspension of temporal prediction within subareas A and B while applying temporal prediction within the same pictures external to the subareas A and B.

FIG. 22 illustrates, using a dashed box 316, a video encoder configured to encode pictures 302 into video data stream 300 so as to comprise the just outlined pictures A and B, respectively. As already outlined above, video encoder 316 may be a hybrid video encoder using motion-compensated prediction for encoding pictures 302 into video data stream 300. Video encoder 316 may use any GOP (group of picture) structure in order to encode picture 302 into video data stream 300, such as an open GOP structure or closed GOP structure. With respect to the subarea-related random access pictures A and B, this means that video encoder 316 intersperses between pictures 302 pictures, a subarea of which, namely A or B, does not depend on any previous picture in decoding order. It will be described later on that such a subarea B and/or A may correspond to a subarea 22 in accordance with the embodiment of FIGS. 1 to 13, i.e. a subarea with respect to which video data stream 300 is reducible. However, although this is merely an example and reducibility is not a characteristic of video data stream 300, it is noted that it is advantageous if pictures 312 are encoded into video data stream 300 in a manner obeying the boundary of subarea B and/or A in a manner similar to the description brought forward above with respect to the boundary of the subarea 22 with respect to FIGS. 1 to 13.

In particular, although the reach of spatial coding dependency mechanisms in encoding pictures 302 in video data stream 300 is usually short, it is advantageous if the subarea-related random access pictures, i.e. pictures A and B in case of FIG. 22, are encoded into video data stream 300 in a manner so that coding dependencies for coding the respective subarea B/A do not cross the boundary of the respective subarea so as to not introduce coding dependency on the outside, or a spatial neighborhood, of the respective subarea. That is, within the respective subarea B/A, the subarea-related random access pictures A and B are coded without temporal prediction and without spatial coding dependency on portions of the respective picture outside the respective subarea A/B. Beyond this, it is then advantageous if pictures between random access pictures A and B are also encoded into video data stream 300 in a manner which takes the section boundary of the section into account with respect to which the immediately leading section-specific random access picture forms a subarea-specific random access point.

For example, in FIG. 22, picture B forms a subarea-specific random access point with respect to subarea B and accordingly, it may be advantageous if pictures 302 succeeding this picture B and preceding the first occurrence of the next sub-area random access picture, namely picture A, —this sequence is exemplarily indicated using a curly bracket 317—are coded in a manner which takes the boundary of section B into account. In particular, it is advantageous if spatial and temporal prediction and coding dependency for coding these pictures into video data stream 300 is restricted in such a manner that these pictures are coded into video data stream 300 in a manner such that section B thereof does not depend on any portion of these pictures or picture B itself which are external to section B. With respect to motion vectors, for example, the video encoder 316 restricts the available motion vectors for coding section B of pictures between pictures B and A so as to not point to portions of a reference picture among picture B and the pictures between picture B and picture A which would extend beyond the subarea of B of the reference picture. Beyond that, as picture B forms a random access point with respect to subarea B, temporal reference pictures for temporally predicting subarea B of pictures 317 should not lie upstream relative to picture B. Spatial dependency for coding subarea B of the intermediary pictures between pictures B and A would be restricted in a similar manner, namely so as to not introduce a dependency on neighboring portions external to subarea B. Again, this restriction might be alleviated depending on the application, and moreover, beyond this, reference is made to the description of FIGS. 1 to 13 with respect to possible countermeasures against drift errors. Likewise, the restriction just discussed with respect to pictures between random access pictures, among which the leading one is a subarea-specific random access picture such as picture B, may be applied merely with respect to temporal prediction while spatial dependency has less severe effects with respect to drift errors.

The discussion brought forward in the immediately preceding paragraph pertained to the restriction of coding dependency for coding the immediate successor pictures 317 (in terms of decoding order) of subarea-wise random access picture B merely with respect to the coding of the pictures 317 within subarea B, i.e. the subarea with respect to which the immediate predecessor random access picture, namely picture B, forms a sub-area specific random access point. A question, which should be treated separately therefrom, is the question whether the coding dependencies for coding pictures 317 within the outside of section B, i.e. subarea A in case of FIG. 22, should or should not be restricted so as to render the coding of the outside portions of pictures 317 dependent on subarea B. That is, the question is whether subarea A of pictures 317 should be coded in a manner such that, for example, spatial coding dependency is restricted so as to not reach-out into section B of the same picture, and whether temporal coding dependency for coding subarea A of pictures 317 should be restricted in a manner so as to not reach out into subarea B of a reference picture which is one of picture B or any of pictures 317 preceding in code/decoding order. To be even more precise, it should be noted that reference pictures used for coding subarea A of pictures 317 may either belong to one of the previously coded/decoded pictures of pictures 317 on the one hand and the leading random access picture B on the other hand, or may lie upstream (in decoding order) relative to picture B. For reference pictures lying upstream relative to picture B, temporal coding dependency for coding subarea A of any picture 317 is still restricted so as to not reach out into subarea B. Rather, the question discussed here is whether any coding dependency for coding subarea A of pictures 317 is to be, or is not to be, restricted so as to not reach-out into section B as far as intra or spatial coding dependency is concerned or temporal coding dependency with respect to a reference picture being one of picture B and any previously coded/decoded picture among pictures 317. Both alternatives have their merits. If the subarea boundary of subarea B of picture B and pictures 317 is also obeyed when coding subarea A of pictures 317, i.e. coding dependency for coding subarea A is restricted so as to not reach-out into subarea B, then subarea A continues to be coded in a manner independent from section B and accordingly forms a subarea with respect to which data stream 300 may be extractable or reducible as discussed above. The same applies to subarea B when considering the same situation with respect to the coding of subarea B of the pictures immediately succeeding subarea-specific random access picture A. If the reducibility for a certain subarea such as subarea A and/or subarea B is not as important, than it may be beneficial in terms of coding efficiency if the just discussed coding dependency reach-out into the subarea with respect to which the immediately preceding section-wise random access picture forms a sub-area-specific random access point is allowed. In that case, the other subareas, such as subarea A in the discussion just brought forward, would no longer be reducible, but the coding efficiency is increased as the video encoder 316 has less restriction with respect to the exploitation of redundancies by means of, for example, selecting motion vectors so as to cross the boundary of subarea B so as to temporally predict a portion of subarea A of pictures 317 on the basis of subarea B of any of these pictures or picture B. For example, data stream 300 would no longer be reducible with respect to area A if the following is done. Pictures 317 would be encoded into the video data stream 300 within the picture area A outside the second picture subarea B in a manner using temporal prediction which, at least partially, refers to the second picture subarea B of reference pictures among pictures 317 and picture B. That is, in case of FIG. 22, the complete picture area would be available for being referenced by temporal predictively coding area A of pictures 317, i.e. not only A, but also B. Pictures 317' following, in terms of a decoding order, picture A—namely the pictures 317' between A and the subsequent picture of type B not shown in FIG. 22—would be encoded into the video data stream 300 with restricting temporal prediction within the picture area A outside the second picture subarea B so as to not refer to the second picture subarea B of, in terms of a decoding order, preceding reference pictures among picture A and pictures 317'. That is, in case of FIG. 22, the merely area A would be available for being referenced by temporal predictively coding area A of pictures 317'. Similar is true for subarea B: pictures B adhere to subarea B within subarea B, while coding of B in pictures B has also A available in addition to subarea A. In that case, stream, 300 would no longer be reducible with respect to subarea B.

Before proceeding with the description of a decoder configured to decode the video data stream 300 of FIG. 22, it should be noted that video encoder 316 may be configured to provide the video data stream 300 with a signalization 319 which, at a scope pertaining to the whole video 304 or encompassing a sequence of pictures 302, indicates the spatial subdivision of the corresponding pictures into subareas A and B or in accordance with any of the alternatives such as those exemplified in FIGS. 23a to 23e. The encoder 316 also provides the data stream 300 with a signalization 318 indicating pictures A and B, i.e. a signalization 318 which marks certain pictures as being a subarea-specific random access point with respect to any of the subareas indicated by signalization 319. That is, signalization 319 signalizes the spatial subdivision which is constant among the pictures for which signalization 319 is valid, and signalization 318 distinguishes the subarea-specific random access pictures from the other pictures and associates these subarea random access pictures to one of the subareas A and B.

It would be possible to not specifically distinguish within video data stream 300 between pictures B and A on the one hand and the other pictures on the other hand as far as the picture type is concerned. In the example of FIG. 22, pictures B and A are "merely" subarea-specific random access pictures and are accordingly not real picture-wise random access pictures, such as an DR or the like. Accordingly, as far as the picture type signalization 320 within video data stream 300 is concerned, video data stream 300 may not distinguish between pictures B and A on the one hand and the other temporally predicted pictures on the other hand. Signalization 318 could be, for instance, be contained in slices, or slice headers of these slices, in units of which pictures 302 are coded into stream 300, thereby indicating that the picture area corresponding to the respective slice forms section B. Alternatively, a combination of signalizations 320 and 318 may be used in order to indicate to the decoder that a certain picture is a subarea-specific random access picture and that same belongs to a certain subarea. For example, signalization 320 could be used in order to indicate that a certain pictures is a subarea-specific random access picture, however, while not revealing the subarea for which the respective picture represents a subarea-specific random access point. The latter indication would be performed by signalization 318 which associates a certain picture signal to be a subarea-specific random access picture by signalization 320, with any of the subareas of the picture subdivision signaled by signalization 319. However, it could alternatively be that signalization 320 which may be the NAL unit type syntax element, mot only distinguishes or discriminates between temporally predicted pictures such as B and P pictures, picture-wise random access pictures such as DR pictures, and subarea-wise random access points such as pictures A and B, but also between subarea-wise random access points relating to different subareas, i.e. between pictures A and B by spending different values for each of pictures A and B.

A further signalization 321 could be inserted by video encoder 316 to signal for a certain subarea that data stream 300 shall be reducible with respect to the respective subarea or not. Signalization 321 may be signaled within data stream 300 in a manner allowing one of the subareas to be signaled as being a subarea with respect to which data stream 300 is reducible, while another subarea does not form such a subarea with respect to which data stream 300 is reducible. Alternatively, signalization 321 may merely allow for a binary signalization of reducibility with respect to all subareas, i.e. signalization 321 could either signal that all subareas are subareas with respect to which data stream 300 is reducible, or that data stream 300 is not reducible to any of these subareas. Signalization 321 could, however, also be left off with the effect that subareas such as subareas A and B in the example of FIG. 22 are either treated as completely independently coded subareas with respect to which data stream 300 is reducible, respectively, or not, in which case the above-outlined asymmetric coding dependency across subarea boundaries is used as explained previously.

Although up to now subareas B and A were illustrated to be contiguous areas, it should be noted that subareas B and A may alternatively be non-contiguous areas such as sets of tiles of pictures 302, wherein reference is made to the description of FIGS. 1 to 13 with respect to the specific processing concerning tiles into which pictures 302 may, in accordance with this example, be coded into data stream 300.

With respect to FIG. 23c, it is noted that as picture A would be a picture-wise random access picture, the picture type of picture A would differ from those of other temporally predicted pictures, and accordingly picture A would be signaled within the picture type signalization 320.

Figure 24:
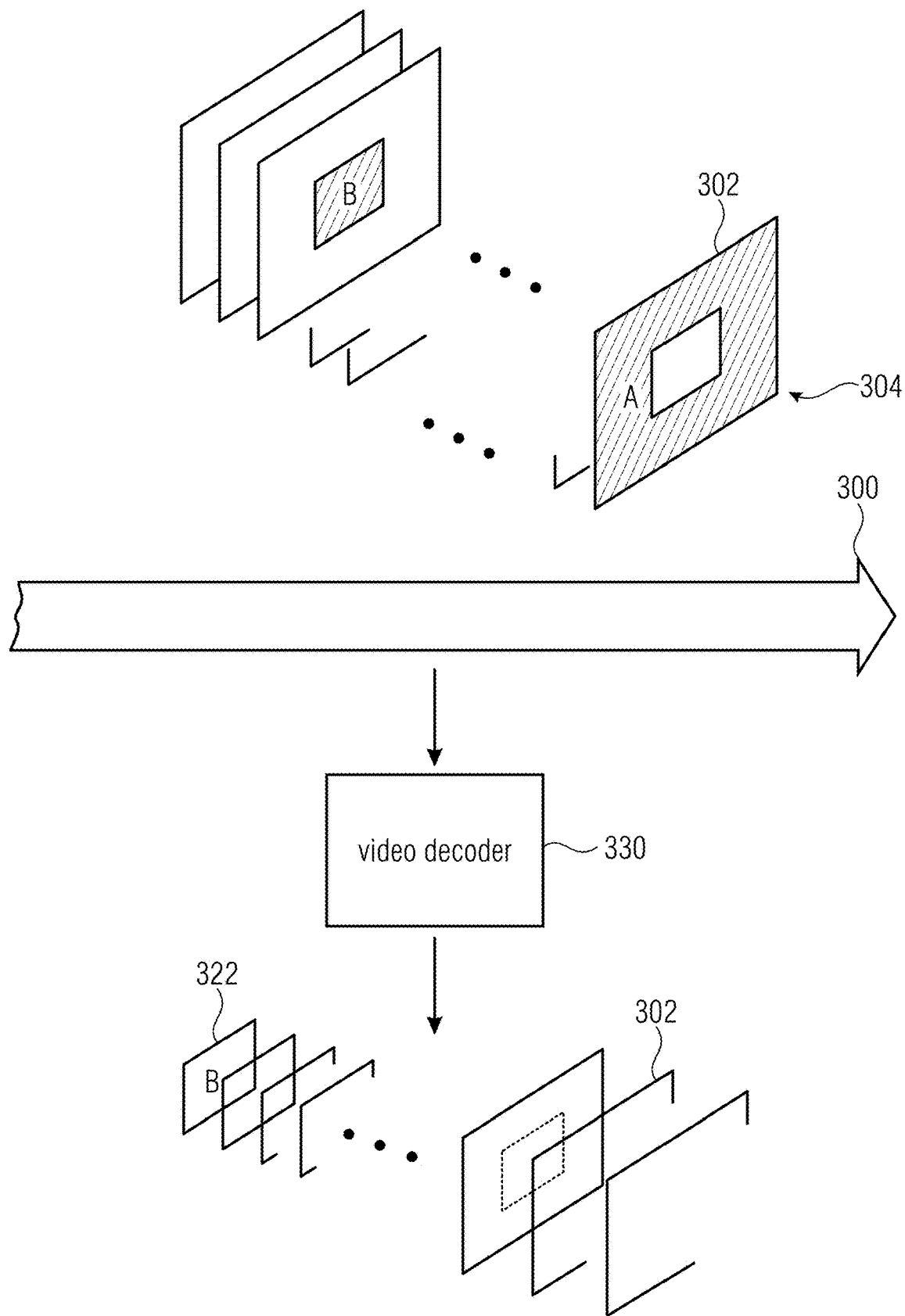
FIG. 24 shows a schematic diagram illustrating a video decoder configured to receive a video data stream having interspersed therein subarea-specific random access pictures in accordance with an embodiment.

FIG. 24 shows a video decoder 330 configured to decode video data stream 300 in a manner taking advantage of pictures B and A. Video data stream 300 of FIG. 24 is exemplarily shown in a manner corresponding to the description of FIG. 22, i.e. subarea-related random access pictures B and A are interspersed between pictures 302 of the video 304 encoded into video data stream 300. Video decoder 330 is configured to, in randomly accessing video data stream 300, wait for the next random access picture to occur, i.e. any subarea-related or picture-wise random access picture. In the case of video data stream 300 not comprising picture-wise random access pictures, video decoder 330 may even not be responsive to such pictures. In any case, video decoder 330 resumes decoding video data stream 300 as soon as video decoder 330 encounters the first subarea-related random access picture which is picture B in the example of FIG. 24. Starting with this picture B, video decoder 330 starts reconstructing, decoding and outputting pictures 322 showing subarea B only. An alternative would be that video decoder 330 also decodes, reconstructs and outputs the portions of these pictures 322 outside subarea B with or without signaling accompanying these pictures which indicates to the presentation device, such as the display device or the like, that the portions outside subarea B of these pictures suffer from drift error as the reference pictures for this outer subarea was missing.

The video decoder 330 keeps on decoding video data stream 300 in this manner until encountering the next random access picture, which is picture A in the example of FIG. 24. As subarea A represents a random access point for the remaining picture area, i.e. the area of pictures 302 outside subarea B, video decoder 330 decoders, reconstructs and outputs from picture A onwards pictures 302 completely. That is, by way of the functionality described with respect to FIG. 24, a user is provided with the opportunity to gain advantage of seeing video 304 earlier, at least with respect to subarea B, i.e. the subarea of the first encountered subarea-related random access picture B. Then, after having encountered the next subarea-related random access picture concerning the subarea covering the remainder of pictures 302, video decoder 330 is able to provide the complete pictures 302 without drift errors. In the example of FIG. 23e, this would be the case after having encountered the first one of each of subarea-specific random access pictures concerning subareas A, B and C, respectively.

Figure 25:
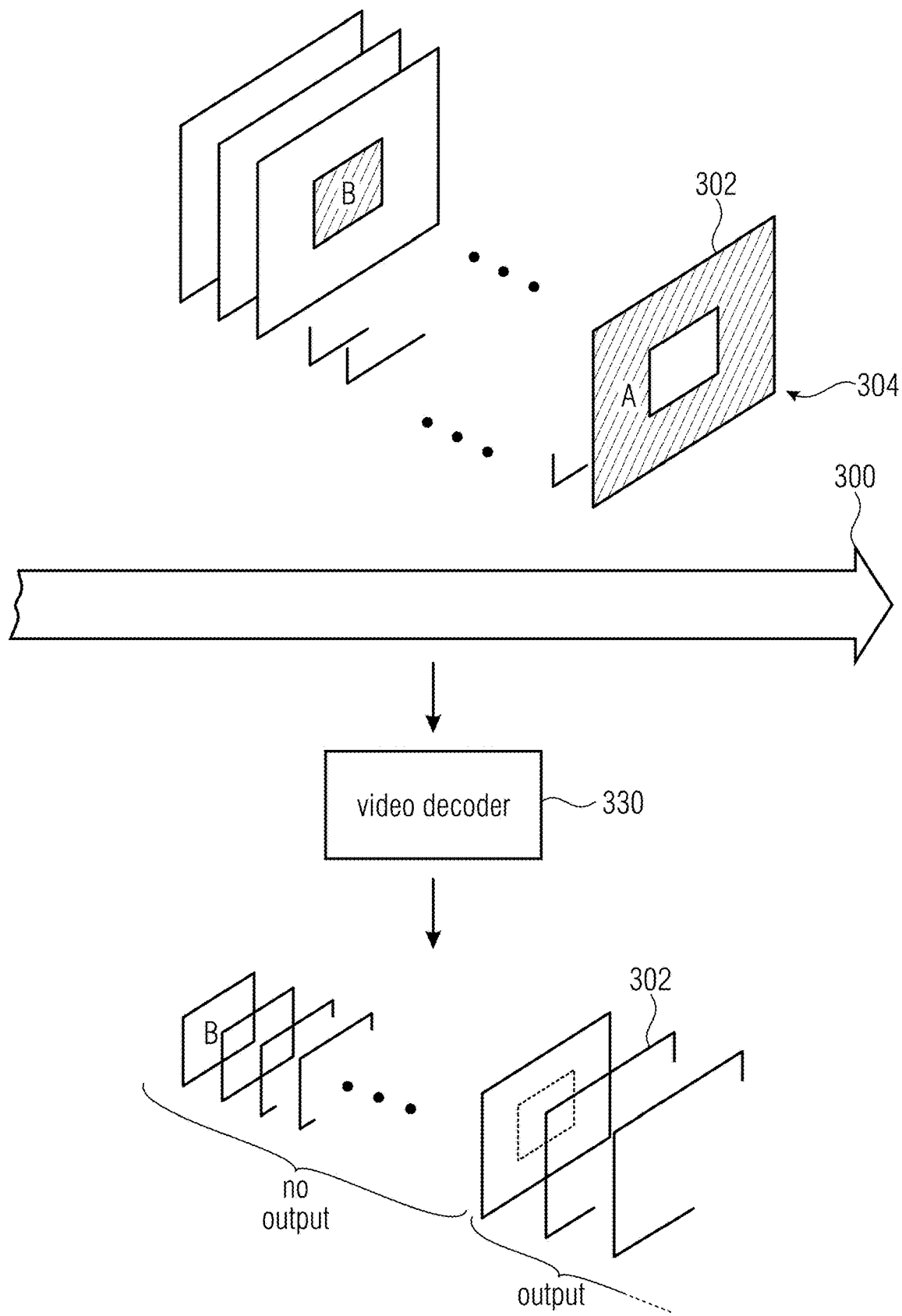
FIG. 25 shows a schematic illustrating the situation of FIG. 24, but illustrating an alternative mode of operation of the video decoder in that the video decoder waits until a complete coverage of the picture area of the inbound video data stream by the subareas of the subarea-specific random access pictures until outputting or presenting the video in randomly accessing the video data stream.

FIG. 25 illustrates an alternative mode of operation of video decoder 330. Here, video decoder 330 starts decoding and reconstructing subarea B from encountering the first subarea-specific random access picture, here picture B, onwards, but video decoder 330 waits until having encountered enough random access pictures so that the subareas thereof cover the whole picture area of pictures 302 until video decoder 330 actually outputs pictures 302 completely. In case of the present example, this is the case upon having encountered picture A behind picture B. That is, from picture A onwards video decoder 330 outputs pictures 302 although subarea B would have been available from picture B onwards.

Figure 26:
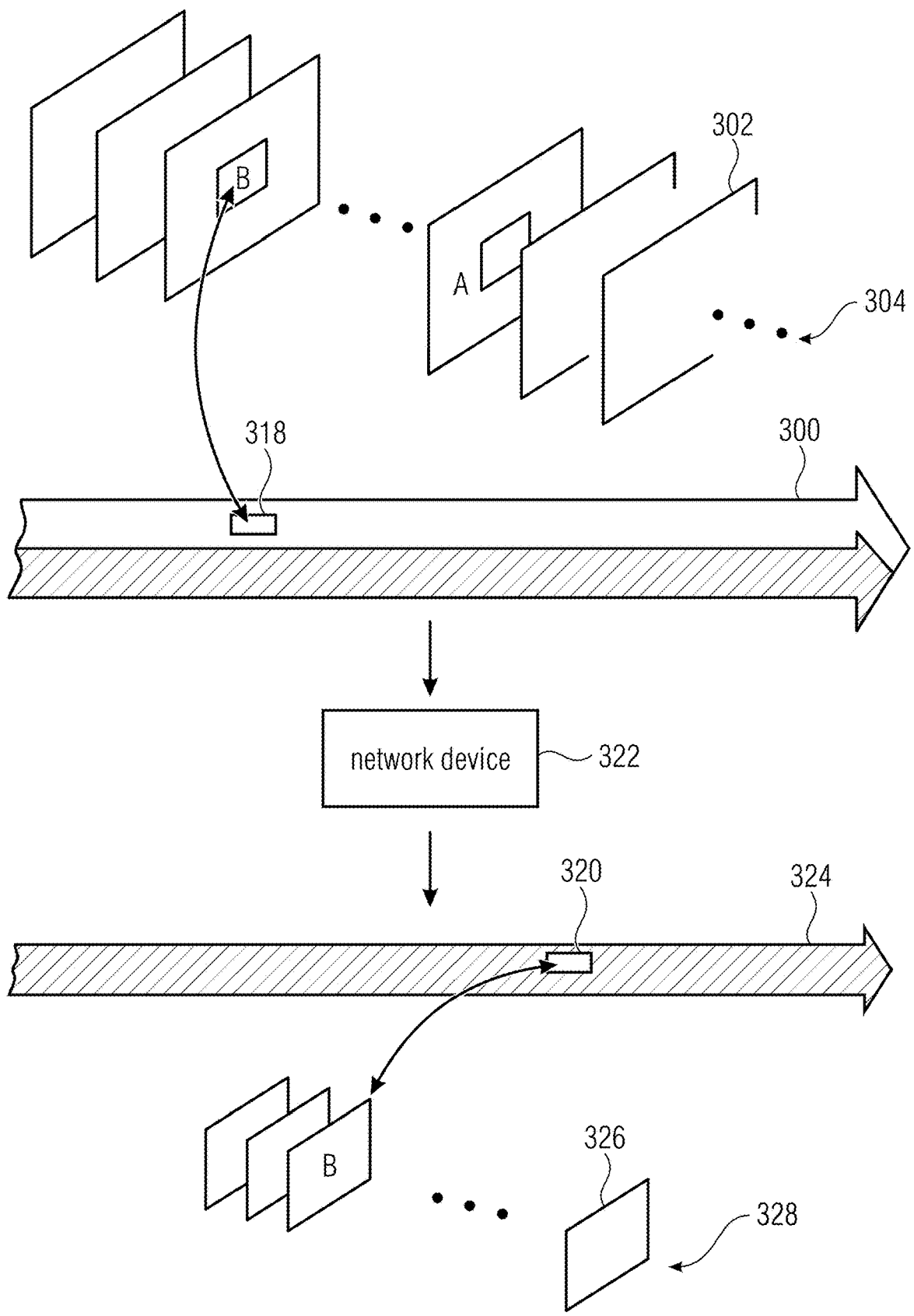
FIG. 26 shows a schematic diagram illustrating a network device receiving a video data stream comprising subarea-specific random access pictures, the subareas of which concurrently form a subregion with respect to which the video data stream is reducible.

FIG. 26 shows a network device 322 which receives a video data stream 300 including subarea-specific random access pictures. This time, however, video data stream 300 is reducible with respect to one or more of the subareas of the subarea-specific random access pictures. For instance, FIG. 26 illustrates the case where video data stream 300 is reducible with respect to subarea B. With respect to reducibility, and the corresponding functionality of network device 322, it is noted that it may be or may not be that this functionality is configured in a manner corresponding to the description of FIGS. 1 to 13. In any case, pictures B are indicated within video data stream 300 using the aforementioned signalization 318. Network device 322, in case of reducing video data stream 300 so as to relate to pictures B only, extract from video data stream 300, or reduces video data stream 300 to, a reduced video data stream 324, the pictures 326 of which form a video 328 which merely shows the content of subarea B of video 304, i.e. of the non-reduced video data stream 300. However, as by this measure subarea B no longer represents a subarea with respect to pictures 326, the reduced video data stream 324 no longer comprises signalization 318. Rather, the picture of video 328 corresponding to subarea B of subarea-specific random access picture B of video data stream is signaled within the reduced video data stream 324 by way of the picture type signalization 320 to be a picture-wise random access picture, such as an IDR picture or the like. The ways this may be done are manifold. For instance network device 322 may change the picture type signalization 320 in the NAL unit header of the corresponding NAL unit in reducing video data stream 300 towards reduced video data stream 324 on its own in addition to the redirection and/or parameter set revision described above with respect to FIGS. 5 and 7 in case of network device 322 being configured in a manner to correspond to network device 60.

Figure 27:
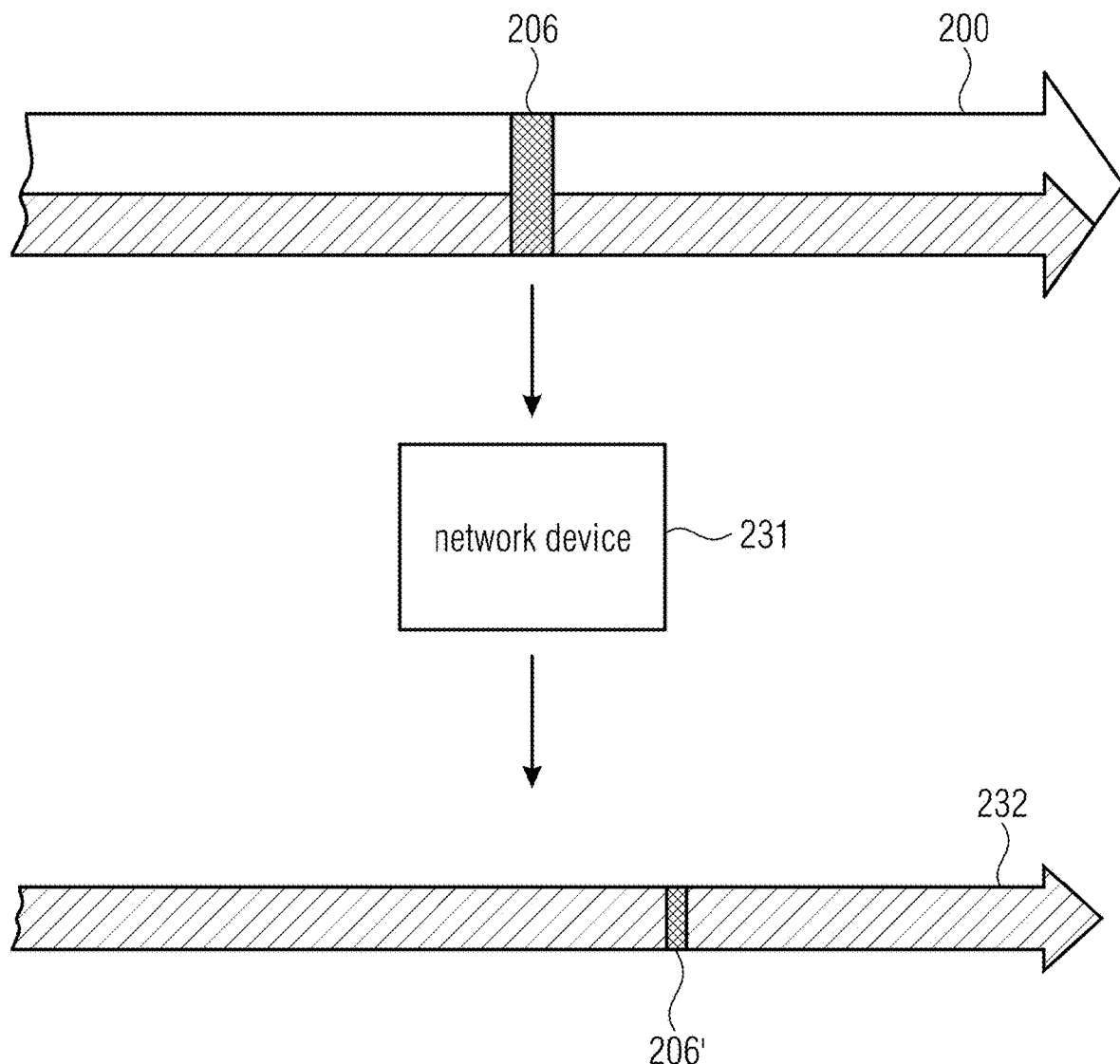
FIG. 27 shows a schematic diagram illustrating a network device receiving a data stream provided with displacing information and being reducible to illustrate possibilities how network device 231 could provide the reduced video data stream with subregion-specific displacing information.
Figure 28:
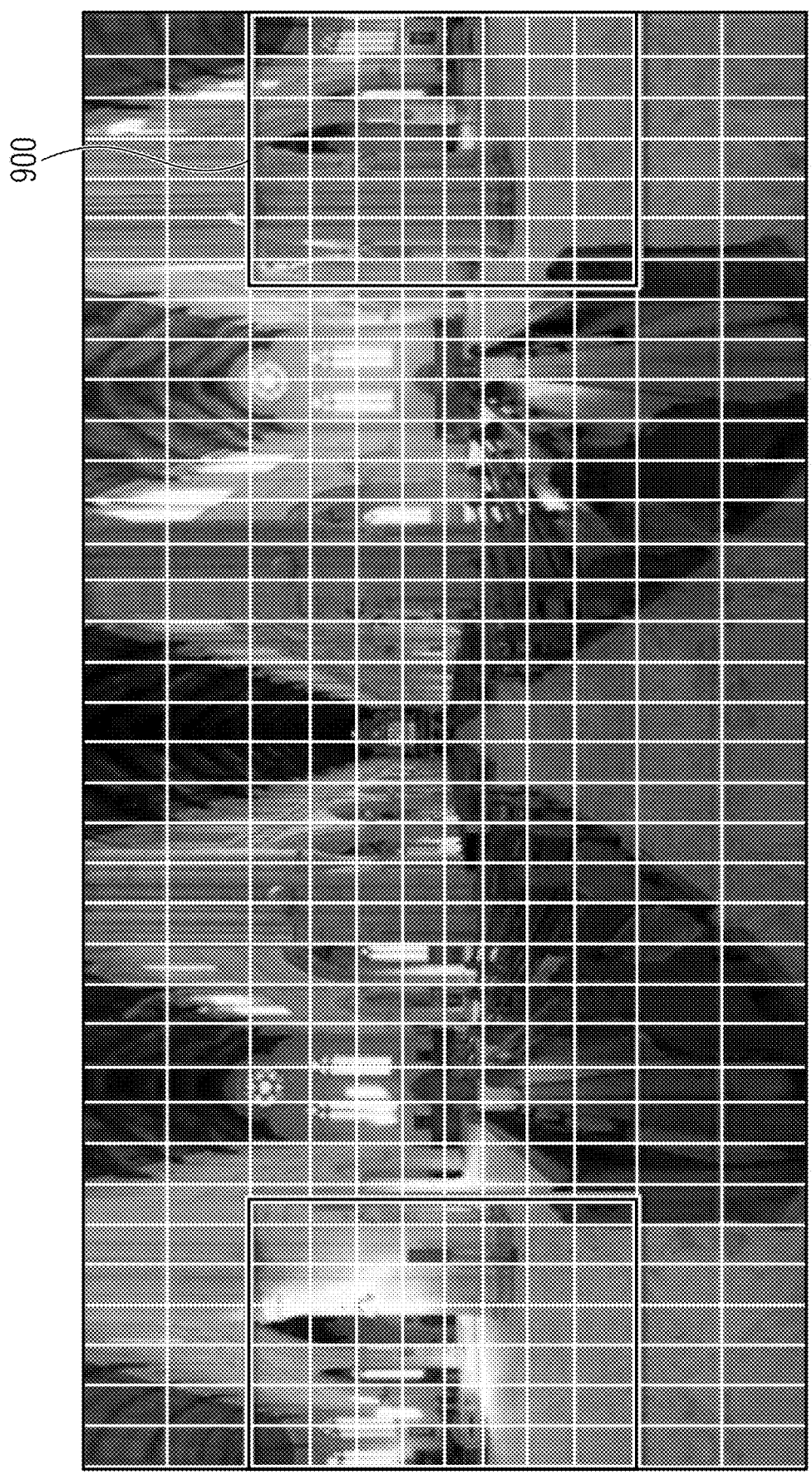
FIG. 28 shows an example for a disjoint region of interest subregion of a picture which is, exemplarily, a cylindrical panorama.

For the sake of completeness, FIG. 27 shows a network device 231 configured to process the data stream 20 of FIG. 20. However, FIG. 20 shows that information 206' may or may not be already present in the reducible video data stream 200 such as within information 50. Through this network device 231 may, as already described above, either be configured to throw away the displacing information 206 in reducing video data stream 200 to reduced video data stream 232 with merely taking over subarea specific displacing information 206' from video data stream 200 to reduced video data stream 232, or network device 231 may form the readjustment of displacing information 206 so as to become subarea specific displacing information 206 on its own on the basis of the knowledge of the location of subarea 22 with respect to the pictures of reducible video data stream 200.

Thus, the above description revealed processes and signaling for extraction of temporal motion and interlayer prediction constrained tile sets, for example. Extraction or spatial subsets of coded video bitstreams using single or multilayer video coding was also described.

With respect to the above description, it is noted that any encoder, decoder or network device shown may be embodied or implemented in hardware, firmware or software. When implemented in hardware, the respective encoder, decoder or network device may, for instance, be implemented in the form of an application specific integrated circuit. If implemented in firmware, the respective device may be implemented as a field programmable array, and if implemented in software, the respective device may be a processor or computer programmed to perform the described functionality.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded data stream or signal can be stored on a digital storage medium or can be transmitted on a transmission medium such as a wireless transmission medium or a wired transmission medium such as the Internet. Where ever the insertion or encoding of some information into a data stream has been described, this description is concurrently to be understood as a disclosure that the resulting data stream comprises the respective information, syntax element of flag or so forth.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

Some example solutions are listed below.

1. Video data stream representing a video (14) comprising
    a parameter set portion (16) indicating coding parameter settings (20);
    a payload portion (18) into which pictures (12) of the video are coded in a manner parameterized using a first set (20a) of the coding parameter settings (20), the first set (20a) being indexed by indices (48) comprised by the payload portion,
    wherein the video data stream comprises an information (50) comprising
    an indication (52) of a predetermined subarea (22) of the pictures (12), and replacement indices (54) for redirecting (72) the indices (48) comprised by the payload portion so as to refer to, and/or replacement parameters (56) for adjusting (88) the first set (20a) of coding parameter settings so as to result in, a second set (20b) of coding parameter settings,
    wherein the second set (20b) of coding parameters are selected so that a reduced video data stream (62) modified compared to the video data stream by
    removing (68) portions (70) of the payload portion (18) referring to an area of the pictures (12) outside the predetermined subarea (22), and
    changing (78) location indications (32) in the payload portion (18) so to indicate a location in a manner measured from a circumference of the predetermined subarea (22) instead of the pictures (12),
    has a reduced payload portion having encoded thereinto subarea-specific pictures (86) showing the predetermined subarea (22) of the pictures in a manner parameterized using the second set (20b) of coding parameter settings.

2. Video data stream according to solution 1 wherein the video data stream and the reduced video data stream (62) are conforming to HEVC.

3. Video data stream according to solution 1 or 2 wherein the parameter set portion is comprised by SPS NAL units and/or VPS NAL units and/or PPS NAL units.

4. Video data stream according to any of solutions 1 to 3 wherein the coding parameter settings define one or more of
    picture size (26),
    tile structure (38),
    buffer size and timing (46).

5. Video data stream according to any of solutions 1 to 4 wherein the indices (48) are contained in slice headers of slices (34) of the payload portion (18), each slice having encoded thereinto a corresponding area (36) of a picture (12) which does not cross a boundary of the predetermined subarea (22).

6. Video data stream according to any of solutions 1 to 5 wherein the information is contained in a SEI message, a VUI or an parameter set extension.

7. Video data stream according to any of solutions 1 to 6 wherein the payload portion has the pictures of the video coded thereinto in units of tiles (42) into which the pictures are subdivided and which are arranged in a tile array of columns and rows, wherein the indication (52) indicates the predetermined subarea as a set of the tiles.

8. Video data stream according to solution 7 wherein the payload portion has the pictures of the video coded thereinto in units of tiles (42) such that the payload portion is subdivided in units of slices (34), each slice having encoded thereinto a corresponding area of a picture which does not cross a tile border (40) between the tiles.

9. Video data stream according to any of solutions 1 to 8 wherein
    a portion of the first set (20a) of coding parameter settings indexed by the indices (48) from which the redirection (72) by the replacement indices is to be performed, and/or which is replaced by the replacement parameters, pertains one or more of
    picture size (26),
    tile structure (38),
    buffer size and timing (46).

10. Video data stream according to any of solutions 1 to 9 wherein the payload portion (18) has the pictures (12) of the video coded thereinto so that within the predetermined subarea (22) the pictures are coded with interruption of temporal prediction across boundaries of the predetermined subarea (22).

11. Encoder for encoding a video into a video data stream, comprising
   a parameter setter (80*a*) configured to determine coding parameter settings (20) and generate a parameter set portion (16) of the video data stream indicating the coding parameter settings;
   a coding core (80*b*) configured to encode pictures of the video into a payload portion of the video data stream in a manner parameterized using a first set (20*a*) of the coding parameter settings, the first set being indexed by indices (48) comprised by the payload portion,
   wherein the encoder is configured to provide the video data stream with an information (50) comprising
   an indication of a predetermined subarea (22) of the pictures (12), and replacement indices (54) for redirecting the indices comprised by the payload portion so as to refer to, and/or replacement parameters (56) for adjusting the first set of coding parameter settings so as to result in, a second set of coding parameter settings,
   wherein the second set of coding parameters are selected so that a reduced video data stream modified compared to the video data stream by
   removing (68) portions of the payload portion referring to an area of the pictures outside the predetermined subarea, and
   changing (78) location indications in the payload portion so to indicate a location in a manner measured from a circumference of the predetermined subarea instead of the pictures,
   has a reduced payload portion having encoded thereinto subarea-specific pictures showing the subarea of the pictures in a manner parameterized using the second set of coding parameter settings.

12. Encoder according to solution 11 wherein the video data stream and the reduced video data stream are conforming to HEVC.

13. Encoder according to solution 11 or 12 wherein the parameter set portion is comprised by SPS NAL units and/or VPS NAL units and/or PPS NAL units.

14. Encoder according to any of solutions 11 to 13 wherein the coding parameter settings define one or more of
   picture size,
   tile structure,
   buffer size and timing.

15. Encoder according to any of solutions 11 to 14 wherein the encoder is configured to insert the indices into slice headers of slices of the payload portion, and to encode into each slice a corresponding area of a picture which does not cross a boundary of the predetermined subarea.

16. Encoder according to any of solutions 11 to 15 wherein the encoder is configured to insert the information into a SEI message, a VUI or an parameter set extension.

17. Encoder according to any of solutions 11 to 16 wherein the encoder is configured to encode into the payload portion the pictures of the video coded in units of tiles into which the pictures are subdivided and which are arranged in a tile array of columns and rows, wherein the indication indicates the predetermined subarea as a set of the tiles.

18. Encoder according to solution 17 wherein the encoder is configured to encode into the payload portion the pictures of the video coded in units of tiles such that the payload portion is subdivided in units of slices, each slice having encoded thereinto a corresponding area of a picture which does not cross a tile border between the tiles.

19. Encoder according to any of solutions 11 to 18 wherein
   a portion of the first set of coding parameter settings indexed by the indices from which the redirection by the replacement indices is to be performed, and/or which is replaced by the replacement parameters, pertains one or more of
   picture size,
   tile structure,
   buffer timing.

20. Encoder according to any of solutions 11 to 19 wherein the encoder is configured to encode into the payload portion the pictures of the video so that within the predetermined subarea (22) the pictures are coded with interruption of temporal prediction across boundaries of the predetermined subarea (22).

21. Network device for processing a video data stream, the video data stream comprising
   a parameter set portion indicating coding parameter settings;
   a payload portion into which pictures of the video are coded in a manner parameterized using a first set of the coding parameter settings, the first set being indexed by indices comprised by the payload portion,
   wherein the network device is configured to
   read (64) from the video data stream an information comprising
   an indication of a predetermined subarea of the pictures, and
   replacement indices for redirecting the indices comprised by the payload portion so as to refer to, and/or replacement parameters for adjusting the first set of coding parameter settings so as to result in, a second set of coding parameter settings,
   reduce (66) the video data stream to a reduced video data stream modified by performing the redirection (72) and/or adjustment (88) so that the second set of coding parameter settings is indexed by the payload portion's indices: removing (68) portions of the payload portion referring to an area of the pictures outside the predetermined subarea, and
   changing (78) location indications (32) in the payload portion so to indicate a location measured from a circumference of the predetermined subarea instead of the pictures,
   so that the reduced video data stream has a reduced payload portion which has encoded thereinto subarea-specific pictures showing the predetermined subarea of the pictures in a manner parameterized using the second set of coding parameter settings.

22. Network device according to solution 21 wherein the video data stream and the reduced video data stream are conforming to HEVC.

23. Network device according to solution 21 or 22 wherein the parameter set portion is comprised by SPS NAL units and/or VPS NAL units and/or PPS NAL units.

24. Network device according to any of solutions 21 to 23 wherein the coding parameter settings define one or more of
   picture size,
   tile structure,
   buffer size and timing.

25. Network device according to any of solutions 21 to 24 wherein the network device is configured to locate the indices in slice headers of slices of the payload portion, each slice having encoded thereinto a corresponding area of a picture which does not cross a boundary of the predetermined subarea.

26. Network device according to any of solutions 21 to 25 wherein the network device is configured to read the information from a SEI message, a VUI or an parameter set extension of the video data stream.

27. Network device according to any of solutions 21 to 26 wherein the payload portion has the pictures of the video coded thereinto in units of tiles into which the pictures are subdivided and which are arranged in a tile array of columns and rows, wherein the indication indicates the predetermined subarea as a set of the tiles.

28. Network device according to solutions 27 wherein the payload portion has the pictures of the video coded thereinto in units of tiles such that the payload portion is subdivided in units of slices, each slice having encoded thereinto a corresponding area of a picture which does not cross a tile border between the tiles.

29. Network device according to any of solutions 21 to 28 wherein
a portion of the first set of coding parameter settings indexed by the indices from which the redirection by the replacement indices is to be performed, and/or which is replaced by the replacement parameters, pertains one or more of
picture size,
tile structure,
buffer size and timing.

30. Network device according to any of solutions 21 to 29 wherein the payload portion (18) has the pictures (12) of the video coded thereinto so that within the predetermined subarea (22) the pictures are coded with interruption of temporal prediction across boundaries of the predetermined subarea (22).

31. Network device according to any of solutions 21 to 30 wherein the network device is one of
is a video decoder capable of decoding the video data stream and the reduced video data stream,
a video decoder a profile level of which suffices for the video decoder to be capable of decoding the reduced video data stream, but the profile level of which is insufficient so that the video decoder is unable to decode the video data stream, and
network device configured to forward, depending on a control signal, one of the video data stream and the reduced video data stream to a video decoder.

32. Network device according to any of solutions 21 to 31, wherein the video data stream comprises a displacing information (206) which indicates for a set of at least one predetermined subregions (214) of the pictures (12) a displacement of the set of at least one predetermined subregions within a target picture area (216) relative to an undisplaced copying of the set of at least one predetermined subregions into the target picture area, and
the network device is configured to modify the displacing information into modified displacing information (206') so that the subarea-specific pictures, copied into the target picture area with having predetermined subregions of the subarea-specific pictures displaced according to the modified displacing information, coincides within the target picture area (216) with the predetermined subarea (22) of the pictures (12) copied into the target picture area with the set of at least one predetermined subregion (214) of the pictures (12) displaced according to the displacing information, and,
in reducing the video data stream, replace the displacing information (206) with the modified displacing information (206'), or
the modified displacing information (206') is comprised by the video data stream associated with the predetermined subarea (22) of the pictures (12) and the displacing information (206) is comprised by the video data stream associated with the pictures and the network device is configured to, in reducing the video data stream, remove the displacing information (206) and carry over the modified displacing information (206') into the reduced video data stream so as to be associated with the subarea-specific pictures (86).

33. Video data stream representing a video (14) comprising
a payload portion (18) into which pictures (12) of the video are coded,
a supplemental enhancement information message indicating supplemental enhancement information matching the manner at which the pictures of the video are coded into the payload portion (18),
wherein the video data stream comprises an information (50) comprising
an indication (52) of a predetermined subarea (22) of the pictures (12), and a replacement supplemental enhancement information message for replacing the supplemental enhancement information message,
wherein the replacement supplemental enhancement information message is selected so that a reduced video data stream (62) modified compared to the video data stream by removing (68) portions (70) of the payload portion (18) referring to an area of the pictures (12) outside the predetermined subarea (22), and
changing (78) location indications (32) in the payload portion (18) so to indicate a location in a manner measured from a circumference of the predetermined subarea (22) instead of the pictures (12),
has a reduced payload portion having encoded thereinto subarea-specific pictures (86) showing the predetermined subarea (22) of the pictures in a manner so that the replacement supplemental enhancement information message indicates replacement supplemental enhancement information matching the manner at which the subarea-specific pictures (86) are coded into the reduced payload portion (18).

34. Encoder for encoding a video into a video data stream, comprising
a coding core (80b) configured to encode pictures of the video into a payload portion of the video data stream,
a parameter setter (80a) configured to generate a supplemental enhancement information message indicating supplemental enhancement information matching the manner at which the pictures of the video are coded into the payload portion (18);
wherein the encoder is configured to provide the video data stream with an information (50) comprising
an indication of a predetermined subarea (22) of the pictures (12), and
a replacement supplemental enhancement information message for to be replace the supplemental enhancement information message,
wherein the replacement supplemental enhancement information message is selected so that a reduced video data stream modified compared to the video data stream by removing (68) portions of the payload portion referring to an area of the pictures outside the predetermined subarea, and changing (78) location indications in the payload portion so to indicate a location in a manner measured from a circumference of the predetermined subarea instead of the pictures, has a reduced payload portion having encoded thereinto subarea-specific pictures showing the subarea of the pictures in a manner so that the replacement supplemental enhancement information message indicates replacement supplemental enhancement information matching the manner at which the subarea-specific pictures (86) are coded into the reduced payload portion (18).

35. Network device for processing a video data stream, the video data stream comprising a payload portion into which pictures of the video are coded, a supplemental enhancement information message indicating supplemental enhancement information matching the manner at which the pictures of the video are coded into the payload portion (18), wherein the network device is configured to read (64) from the video data stream an information comprising an indication of a predetermined subarea of the pictures, and a replacement supplemental enhancement information message for to be replace the supplemental enhancement information message, reduce (66) the video data stream to a reduced video data stream modified by replacing the supplemental enhancement information message by the replacement supplemental enhancement information message;

removing (68) portions of the payload portion referring to an area of the pictures outside the predetermined subarea, and changing (78) location indications (32) in the payload portion so to indicate a location measured from a circumference of the predetermined subarea instead of the pictures, so that the reduced video data stream has a reduced payload portion which has encoded thereinto subarea-specific pictures showing the predetermined subarea of the pictures in a manner so that the replacement supplemental enhancement information message indicates replacement supplemental enhancement information matching the manner at which the subarea-specific pictures (86) are coded into the reduced payload portion (18).

36. Network device for processing a video data stream, configured to receive a video data stream which comprises a fraction of
a payload portion into which pictures of the video are coded, wherein the fraction corresponds to an exclusion of portions of the payload portion referring to an area of the pictures outside a predetermined subarea of the pictures, wherein the pictures of the video are coded into the payload portion, in a manner parameterized, without exclusion, using coding parameter settings in a parameter set portion of the video data stream, and/or in a manner matching, without exclusion, supplemental enhancement information indicated by a supplemental enhancement message of the video data stream, modify the video data stream by changing (78) location indications (32) in the payload portion so to indicate a location measured from a circumference of the predetermined subarea instead of the pictures, and adjust the coding parameter settings in the parameter set portion and/or adjust the supplemental enhancement information message so that the video data stream has the fraction of the payload portion into which subarea-specific pictures showing the predetermined subarea of the pictures are encoded in a manner parameterized using the coding parameter settings and/or matching the supplemental enhancement information supplemental enhancement information indicated by the adjusted supplemental enhancement information supplemental enhancement message as adjusted.

37. Network device according to solution 36 configured to receive information on the predetermined subarea (22) along with the video data stream or use the information on the predetermined subarea (22) to restrict downloading the video data stream such that portions (70) of the payload portion (18) referring to an area of the pictures outside the predetermined subarea (22) are not downloaded.

38. Data stream having a picture (204) encoded thereinto, the data stream comprising a displacing information (206) which indicates for a set of at least one predetermined subregion (214) of the picture (204) a displacement (218) of the set of at least one predetermined subregion within a target picture area (216) relative to an undisplaced copying of the set of at least one predetermined subregion into the target picture area (216).

39. Data stream having according to solution 38, wherein the displacing information (206) indicates the displacement (218) in units of one of picture samples, tiles into which the picture is subdivided, in units of which the picture is coded without coding inter-dependencies, and which each of the set of at least one subregion (214) is composed of.

40. Data stream having according to solution 38 or 39, wherein the set of at least one subregion of the picture is a subset of a gapless and overlap-free spatial partitioning of the picture into an array of subregions.

41. Data stream having according to any of solutions 38 to 39, wherein the displacing information comprises a count (220) of the predetermined subregions within the set of at least one predetermined subregions of the picture;

a size parameter (222) defining a size of the target picture area, and for each predetermined subregion of the set of at least one predetermined subregion of the picture, coordinates (224) of a displacement of the respective predetermined subregion of the picture within the target picture area; or the displacing information comprises for each predetermined subregion of the set of at least one predetermined subregion of the picture, first position information on a position of the respective predetermined subregion in the target region, second information on a position of the respective predetermined region within the picture, and information on a rotation and/or information on a mirroring when mapping the respective predetermined subregion between the target region and the picture.

42. Data stream having according to solution 41, wherein the displacing information further indicates a scaling (226) of the respective subregion within the target picture area.

43. Data stream having according to any of solutions 38 to 42, wherein the data stream further comprises a default filling information (228) which indicates a default filling using which a portion (130) of the target picture area (216) is to be filled which is neither covered by any of the set of at least one predetermined subregion of the picture displaced according to the displacing information nor, if the set of at least one predetermined subregion does not completely cover the picture (204), any non-displaced portion of the picture.

44. Data stream having according to any of solutions 38 to 42, wherein the data stream has a sequence of pictures encoded thereinto, wherein the displacing information is valid for the sequence of pictures.

45. Decoder for decoding a data stream having a picture encoded thereinto, the decoder comprising
    a decoding core (234) configured to reconstruct the picture from the data stream, and
    a displacer (236) configured to synthesize a target picture on the basis of the picture by, according to displacing information contained in the data stream, displacing each of a set of at least one predetermined subregion of the picture within an area of the target picture.

46. Decoder according to solution 45, wherein the displacer is configured to, if the set of at least one predetermined subregion does not completely cover the picture (204), copy in a undisplaced manner any non-displaced portion of the picture into the target picture area (216).

47. Decoder according to solution 45 or 46, wherein the displacing information indicates the displacement of the respective subregion in units of one of
    picture samples,
    tiles into which the picture is subdivided, in units of which the picture is coded without coding inter-dependencies, and which each of the set of at least one subregion (214) is composed of.

48. Decoder according to any of solutions 45 to 47, wherein the set of at least one subregion of the picture is a subset of a gapless and overlap-free spatial partitioning of the picture into an array of subregions.

49. Decoder according to any of solutions 45 to 48, wherein the displacer is configured to
    read, as part the displacing information, from the data stream
    a count of the predetermined subregions within the set of at least one predetermined subregions of the picture,
    size parameters defining a size of the target picture area,
    for each predetermined subregion of the set of at least one predetermined subregions of the picture, coordinates of a displacement of the respective predetermined subregion of the picture within an target picture area,
    displace each of the predetermined subregions of the set of at least one predetermined subregions of the picture relative to an overlay of the picture onto the area of the target picture according to the coordinates of displacement read for the respective predetermined subregion.

50. Decoder according to solution 49, wherein the displacer is configured to synthesize a target picture on the basis of the picture by, according to displacing information contained in the data stream, scaling each of a set of at least one predetermined subregions of the picture, displaced relative to the undistorted copying of the picture into the area of the target picture according to the displacing information, within the area of the target picture.

51. Decoder according to any of solutions 45 to 50, wherein the displacer is configured to fill, according to default filling information contained in the data stream, a portion of the target picture area where none of the set of at least one predetermined subregions of the picture lies is displaced to according to the displacing information nor, if the set of at least one predetermined subregion does not completely cover the picture (204), any non-displaced portion of the picture.

52. Decoder according to any of solutions 45 to 51, wherein the decoding core is configured to reconstruct a sequence of pictures from the data stream and the displacer is configured is configured to apply the displacing information onto the pictures of the sequence of pictures.

53. Decoder according to any of solutions 45 to 52, further comprising
    a renderer (238) configured to apply a injective projection onto the target picture area so as to form an output picture.

54. Network device configured to reduce a data stream (200) having encoded thereinto a first picture, into a reduced data stream (232) having encoded thereinto a subareas-specific picture showing a predetermined subarea of the first picture, wherein the data stream (200) comprises a displacing information (206) which indicates for a set of at least one predetermined subregion of the first picture a displacement (218) of the set of at least one predetermined subregion (214) within a target picture area (216) relative to an undisplaced copying of the set of at least one predetermined subregion into the target picture area, wherein
    the network device is configured to modify the displacing information (206) into modified displacing information (206') so that the subarea-specific picture, copied into the target picture area with having a set of at least one predetermined subregion of the subarea-specific picture displaced according to the modified displacing information, coincides within the target picture area with the predetermined subarea of the first picture copied into the target picture area with the set of at least one predetermined subregion (214) of the picture (12) displaced according to the displacing information, and, in reducing the data stream, replace the displacing information with the modified displacing information, or
    the modified displacing information is comprised by the data stream associated with the predetermined subarea of the first pictures and the displacing information is comprised by the data stream associated with the first pictures and the network device is configured to, in reducing the data stream, remove the displacing information and carry over the modified displacing information into the reduced data stream so as to be associated with the subarea-specific pictures.

55. Video data stream having encoded thereinto a sequence of pictures (302) using temporal prediction such that
    a first set of one or more pictures (pictures A) are encoded into the video data stream with suspending temporal prediction at least within a first picture subarea (A) so as to form a set of one or more first random access points, and
    a second set of one or more pictures (pictures B) are encoded into the video data stream with suspending temporal prediction within a second picture subarea (B) different from the first picture subarea (A) as to form a set of one or more second random access points.

56. Video data stream according to solution 55 wherein the first and the second subareas abut each other without overlap.

57. Video data stream according to solution 56 wherein the first and the second subareas form an overlap-free and gapless partitioning of the sequence of pictures (302) which is signaled (319) in the video data stream.

58. Video data stream according to solution 57 wherein the first set of one or more pictures (pictures A) are encoded into the video data stream with suspending temporal prediction over the picture's area completely so as to form a set of one or more picture-wise random access points.

59. Video data stream according to any of solutions 55 to 58 wherein
the second set of one or more pictures (pictures B) are encoded into the video data stream with suspending within the second picture subarea (B) a spatial coding dependency on a spatial portion external to the second picture subarea.

60. Video data stream according to any of solutions 55 to 59 further comprising
a signalization (318) indicating the second set of one or more pictures (pictures B).

61. Video data stream according to solution 60 wherein the signalization (318) indicates the second set of one or more pictures (pictures B) at least partially via a picture type signalization (320) of the video data stream which distinguishes between picture-wise random access points and subarea-specific random access points.

62. Video data stream according to solution 61 wherein the signalization (318) indicates the second set of one or more pictures (pictures B) by the picture type signalization (320) of the video data stream indicating the second set of one or more pictures (pictures B) to be subarea-specific random access points and further associating the second set of one or more pictures (pictures B) to the second picture subarea (B).

63. Video data stream according to solution 61 or 62 wherein the picture type signalization (320) of the video data stream as contained in NAL unit headers of the video data stream.

64. Video data stream according to any of solutions 55 to 63 further comprising a further signalization (321) indicating for the sequence of pictures whether the pictures (302) are encoded into the video data stream in a manner so that temporal prediction of the second picture subarea (B) is restricted to not, or allowed to, reach-out to a picture area of the pictures (302) lying outside the second picture subarea.

65. Video data stream according to any of solutions 55 to 64 wherein pictures (317) between one (picture B) of the second set of one or more pictures and a, in terms of a decoding order, following one (picture A) of the first set of one or more pictures are encoded into the video data stream with restricting temporal prediction within the second picture subarea (B) in a manner so as to not refer to a picture area (A) of reference pictures external to the second picture subarea (B).

66. Video data stream according to any of solutions 55 to 65 wherein pictures (317) between one (picture B) of the second set of one or more pictures and a, in terms of a decoding order, following one (picture A) of the first set of one or more pictures are encoded into the video data stream with restricting temporal prediction within the second picture subarea (B) in a manner so as to not refer to reference pictures upstream, in decoding order, relative to the one (picture B) of the second set of one or more pictures.

67. Video data stream according to any of solutions 65 and 66 wherein the pictures (317) between the one (picture B) of the second set of one or more pictures and a, in terms of a decoding order, following one (picture A) of the first set of one or more pictures are encoded into the video data stream with restricting temporal prediction within the picture area (A) outside the second picture subarea (B) in a manner so as to not refer to the second picture subarea (B) of reference pictures which belong to any of the pictures (317) between the one (picture B) of the second set of one or more pictures and the, in terms of a decoding order, following one (picture A) of the first set of one or more pictures and the one (picture B) of the second set of one or more pictures, respectively.

68. Video data stream according to any of solutions 65 and 66 wherein
the pictures (317) between the one (picture B) of the second set of one or more pictures and a, in terms of a decoding order, following one (picture A) of the first set of one or more pictures are encoded into the video data stream using temporal prediction within the picture area (A) outside the second picture subarea (B) which, at least partially, refers to the second picture subarea (B) of reference pictures which belong to any of the pictures (317) between the one (picture B) of the second set of one or more pictures and the, in terms of a decoding order, following one (picture A) of the first set of one or more pictures and the one (picture B) of the second set of one or more pictures, respectively, and
pictures (317') following, in terms of a decoding order, the following one (picture A) of the first set of one or more pictures are encoded into the video data stream with restricting temporal prediction within the picture area (A) outside the second picture subarea (B) so as to not refer to the second picture subarea (B) of, in terms of a decoding order, preceding reference pictures which belong to any of the following one (picture A) of the first set of one or more pictures and the pictures (317') following the following one (picture A) of the first set of one or more pictures.

69. Encoder for encoding into a video data stream a sequence of pictures using temporal prediction, the encoder configured to
encode a first set of one or more pictures into the video data stream with suspending temporal prediction at least within a first picture subarea so as to form a set of one or more first random access points, and
encode a second set of one or more pictures into the video data stream with suspending temporal prediction within a second picture subarea different from the first picture subarea as to form a set of one or more second random access points.

70. Encoder according to solution 69 wherein the first and the second subarea abut each other without overlap.

71. Encoder according to solution 70 wherein the first and the second subareas form an overlap-free and gapless partitioning of the sequence of pictures (302) and the encoder is configured to provide the video data stream with a signalization (319) of the overlap-free and gapless partitioning.

72. Encoder according to solution 69 configured to encode the first set of one or more pictures into the video data stream with suspending temporal prediction over the picture's area completely so as to form a set of picture-wise random access points.

73. Encoder according to any of solutions 69 to 72 configured to encode the second set of one or more pictures into the video data stream with suspending within the second picture subarea (B) a spatial coding dependency on a spatial portion external to the second picture subarea.

74. Encoder according to any of solutions 69 to 74 further configured to insert a signalization into the video data stream indicating the second set of one or more pictures.

75. Encoder according to any of solutions 69 to 74 configured to insert a further signalization (321) into the video data stream indicating for the sequence of pictures whether the pictures (302) are encoded into the video data stream in a manner so that temporal prediction of the second picture subarea (B) is restricted to not, or allowed to, reach-out to a picture area of the pictures (302) lying outside the second picture subarea.

76. Encoder according to any of solutions 69 to 75 wherein the encoder is configured to encode pictures between one of the second set of one or more pictures and a, in terms of a decoding order, following one of the first set of one or more pictures into the video data stream with restricting temporal prediction within the second picture subarea in a manner so as to not refer to a picture area of reference pictures external to the second picture subarea.

77. Encoder according to any of solutions 69 to 75 wherein the encoder is configured to encode pictures (317) between one (picture B) of the second set of one or more pictures and a, in terms of a decoding order, following one (picture A) of the first set of one or more pictures into the video data stream with restricting temporal prediction within the second picture subarea (B) in a manner so as to not refer to reference pictures upstream, in decoding order, relative to the one (picture B) of the second set of one or more pictures.

78. Encoder according to any of solutions 76 and 77 wherein the encoder is configured to encode the pictures (317) between the one (picture B) of the second set of one or more pictures and a, in terms of a decoding order, following one (picture A) of the first set of one or more pictures into the video data stream with restricting temporal prediction within the picture area (A) outside the second picture subarea (B) in a manner so as to not refer to the second picture subarea (B) of reference pictures which belong to any of the pictures (317) between the one (picture B) of the second set of one or more pictures and the, in terms of a decoding order, following one (picture A) of the first set of one or more pictures and the one (picture B) of the second set of one or more pictures, respectively.

79. Encoder according to any of solutions 76 and 77 wherein the encoder is configured to
encode the pictures (317) between the one (picture B) of the second set of one or more pictures and a, in terms of a decoding order, following one (picture A) of the first set of one or more pictures into the video data stream using temporal prediction within the picture area (A) outside the second picture subarea (B) which, at least partially, refers to the second picture subarea (B) of reference pictures which belong to any of the pictures (317) between the one (picture B) of the second set of one or more pictures and the, in terms of a decoding order, following one (picture A) of the first set of one or more pictures and the one (picture B) of the second set of one or more pictures, respectively, and
encode pictures following, in terms of a decoding order, the following one (picture A) of the first set of one or more pictures into the video data stream with restricting temporal prediction within the picture area (A) outside the second picture subarea (B) so as to not refer to the second picture subarea (B) of, in terms of a decoding order, preceding reference pictures which belong to any of the following one (picture A) of the first set of one or more pictures and the pictures following the following one (picture A) of the first set of one or more pictures.

80. Decoder for decoding from a video data stream a sequence of pictures using temporal prediction, the decoder supporting random access using
a set of one or more first random access points at a first set of one or more pictures which are encoded into the video data stream with suspending temporal prediction at least within a first picture subarea, and
a set of one or more second random access points at a second set of one or more pictures which are encoded into the video data stream with suspending temporal prediction within a second picture subarea different from the first picture subarea.

81. Decoder according to solution 80 configured to, if a current picture one of the second set of one or more pictures,
resume decoding and/or outputting of the sequence of pictures starting with the current picture, but preliminarily restrict at least one of the decoding and/or outputting of the sequence of pictures to the second picture subarea.

82. Decoder according to solution 81 configured to stop the preliminary restriction upon encountering one of set of first random access points.

83. Decoder according to solution 80 configured to, if a current picture one of the first or second sets of one or more pictures,
resume decoding the sequence of pictures starting with the current picture, but restrict the outputting of the sequence of pictures until encountering, since resuming the decoding, one picture of each of sets of one or more pictures, wherein, for each set of one or more pictures, each picture of the respective set of one or more pictures is encoded into the video data stream with suspending temporal prediction within a picture subarea specific for the respective set of one or more pictures, the subareas of the sets of one or more pictures being different from each other and together completely covering an picture area of the sequence of pictures.

84. Decoder according to any of solutions 80 to 83 wherein the first and the second subarea abut each other without overlap, and the decoder is configured to, if a current random access point is one of the second random access points and a next random
access point is one of the first access points, restrict decoding to the second picture subarea between the current and the next random access points and extending decoding from the second picture subarea to also include the first picture subarea.

85. Decoder according to solution 80 wherein the first and the second subareas form an overlap-free and gapless partitioning of the sequence of pictures (302) and the decoder is configured to derive same from a signalization (319) in the video data stream.

86. Decoder according to any of solutions 80 to 83 configured to treat the first set of one or more pictures as a set of one or more picture-wise random access points.

87. Decoder according to any of solutions 80 to 86 configured to decode a data stream according to any of solutions 55 to 68.

88. Network device configured to receive a video data stream having encoded thereinto a sequence of pictures (302) using temporal prediction according to any of solutions 50 to 60, wherein the network device is configured to reduce the data stream to obtain a reduced video data stream having subarea-specific pictures (326) encoded thereinto which show the second picture subarea, by removal of portions video data stream having encoded thereinto a picture area of the pictures external to the second picture subarea and replacing an information (318) within the video data stream which indicates the second set of one or more pictures as subarea-specific random access points by picture type information (320) which indicates the second set of one or more pictures as picture-wise random access pictures.

89. Digital storage medium having stored thereon a data stream according to any of solutions 1 to 10, 33, 38 to 44 and 55 to 68.

90. Method for encoding a video into a video data stream, comprising
- determining coding parameter settings (20) and generate a parameter set portion (16) of the video data stream indicating the coding parameter settings;
- encoding pictures of the video into a payload portion of the video data stream in a manner parameterized using a first set (20a) of the coding parameter settings, the first set being indexed by indices (48) comprised by the payload portion,
- providing the video data stream with an information (50) comprising
  - an indication of a predetermined subarea (22) of the pictures (12), and replacement indices (54) for redirecting the indices comprised by the payload portion so as to refer to, and/or replacement parameters (56) for adjusting the first set of coding parameter settings so as to result in, a second set of coding parameter settings,
- wherein the second set of coding parameters are selected so that a reduced video data stream modified compared to the video data stream by
- removing (68) portions of the payload portion referring to an area of the pictures outside the predetermined subarea, and
- changing (78) location indications in the payload portion so to indicate a location in a manner measured from a circumference of the predetermined subarea instead of the pictures,
- has a reduced payload portion having encoded thereinto subarea-specific pictures showing the subarea of the pictures in a manner parameterized using the second set of coding parameter settings.

91. Method for processing a video data stream, the video data stream comprising
- a parameter set portion indicating coding parameter settings;
- a payload portion into which pictures of the video are coded in a manner parameterized using a first set of the coding parameter settings, the first set being indexed by indices comprised by the payload portion,
- wherein the method comprising
- reading (64) from the video data stream an information comprising
  - an indication of a predetermined subarea of the pictures, and
  - replacement indices for redirecting the indices comprised by the payload portion so as to refer to, and/or replacement parameters for adjusting the first set of coding parameter settings so as to result in, a second set of coding parameter settings,
- reducing (66) the video data stream to a reduced video data stream modified by
- performing the redirection (72) and/or adjustment (88) so that the second set of coding parameter settings is indexed by the payload portion's indices; removing (68) portions of the payload portion referring to an area of the pictures outside the predetermined subarea, and changing (78) location indications (32) in the payload portion so to indicate a location measured from a circumference of the predetermined subarea instead of the pictures,
so that the reduced video data stream has a reduced payload portion which has encoded thereinto subarea-specific pictures showing the predetermined subarea of the pictures in a manner parameterized using the second set of coding parameter settings.

92. Method for encoding a video into a video data stream, comprising
- encoding pictures of the video into a payload portion of the video data stream,
- generating a supplemental enhancement information message indicating supplemental enhancement information matching the manner at which the pictures of the video are coded into the payload portion (18);
- providing the video data stream with an information (50) comprising
  - an indication of a predetermined subarea (22) of the pictures (12), and
  - a replacement supplemental enhancement information message for to be replace the supplemental enhancement information message,
- wherein the replacement supplemental enhancement information message is selected so that a reduced video data stream modified compared to the video data stream by removing (68) portions of the payload portion referring to an area of the pictures outside the predetermined subarea, and
- changing (78) location indications in the payload portion so to indicate a location in a manner measured from a circumference of the predetermined subarea instead of the pictures,
- has a reduced payload portion having encoded thereinto subarea-specific pictures showing the subarea of the pictures in a manner so that the replacement supplemental enhancement information message indicates replacement supplemental enhancement information matching the manner at which the subarea-specific pictures (86) are coded into the reduced payload portion (18).

93. Method for processing a video data stream, the video data stream comprising
- a payload portion into which pictures of the video are coded,
- a supplemental enhancement information message indicating supplemental enhancement information matching the manner at which the pictures of the video are coded into the payload portion (18),
- wherein method comprises
- reading (64) from the video data stream an information comprising
  - an indication of a predetermined subarea of the pictures, and
  - a replacement supplemental enhancement information message for to be replace the supplemental enhancement information message,
- reducing (66) the video data stream to a reduced video data stream modified by replacing the supplemental enhancement information message by the replacement supplemental enhancement information message;
- removing (68) portions of the payload portion referring to an area of the pictures outside the predetermined subarea, and changing (78) location indications (32) in the payload portion so to indicate a location measured from a circumference of the predetermined subarea instead of the pictures, so that the reduced video data stream has a reduced payload portion which has encoded thereinto subarea-specific pictures showing the predetermined subarea of the pictures in a manner so that the replacement supplemental enhancement information message indicates replacement supplemental enhancement information matching the manner at which the subarea-specific pictures (86) are coded into the reduced payload portion (18).

94. Method for processing a video data stream, comprising receiving a video data stream which comprises a fraction of a payload portion into which pictures of the video are coded, wherein the fraction corresponds to an exclusion of portions of the payload portion referring to an area of the pictures outside a predetermined subarea of the pictures, wherein the pictures of the video are coded into the payload portion, in a manner parameterized, without exclusion, using coding parameter settings in a parameter set portion of the video data stream, and/or in a manner matching, without exclusion, supplemental enhancement information indicated by a supplemental enhancement message of the video data stream, modifying the video data stream by changing (78) location indications (32) in the payload portion so to indicate a location measured from a circumference of the predetermined subarea instead of the pictures, and adjust the coding parameter settings in the parameter set portion and/or adjust the supplemental enhancement information message so that the video data stream has the fraction of the payload portion into which subarea-specific pictures showing the predetermined subarea of the pictures are encoded in a manner parameterized using the coding parameter settings and/or matching the supplemental enhancement information supplemental enhancement information indicated by the adjusted supplemental enhancement information supplemental enhancement message as adjusted.

95. Method for decoding a data stream having a picture encoded thereinto, the method comprising reconstructing the picture from the data stream, and synthesizing a target picture on the basis of the picture by, according to displacing information contained in the data stream, displacing each of a set of at least one predetermined subregion of the picture within an area of the target picture.

96. Method for reducing a data stream (200) having encoded thereinto a first picture, into a reduced data stream (232) having encoded thereinto a subareas-specific picture showing a predetermined subarea of the first picture, wherein the data stream (200) comprises a displacing information (206) which indicates for a set of at least one predetermined subregion of the first picture a displacement (218) of the set of at least one predetermined subregion (214) within a target picture area (216) relative to an undisplaced copying of the set of at least one predetermined subregion into the target picture area, wherein the method comprises modifying the displacing information (206) into modified displacing information (206') so that the subarea-specific picture, copied into the target picture area with having a set of at least one predetermined subregion of the subarea-specific picture displaced according to the modified displacing information, coincides within the target picture area with the predetermined subarea of the first picture copied into the target picture area with the set of at least one predetermined subregion (214) of the picture (12) displaced according to the displacing information, and, in reducing the data stream, replacing the displacing information with the modified displacing information, or the modified displacing information is comprised by the data stream associated with the predetermined subarea of the first pictures and the displacing information is comprised by the data stream associated with the first pictures and the method comprises, in reducing the data stream, removing the displacing information and carrying over the modified displacing information into the reduced data stream so as to be associated with the subarea-specific pictures.

97. Method for encoding into a video data stream a sequence of pictures using temporal prediction, the method comprising encoding a first set of one or more pictures into the video data stream with suspending temporal prediction at least within a first picture subarea so as to form a set of one or more first random access points, and encoding a second set of one or more pictures into the video data stream with suspending temporal prediction within a second picture subarea different from the first picture subarea as to form a set of one or more second random access points.

98. Method for decoding from a video data stream a sequence of pictures using temporal prediction, the method comprising randomly accessing the video data stream using a set of one or more first random access points at a first set of one or more pictures which are encoded into the video data stream with suspending temporal prediction at least within a first picture subarea, and a set of one or more second random access points at a second set of one or more pictures which are encoded into the video data stream with suspending temporal prediction within a second picture subarea different from the first picture subarea.

99. Method comprising receiving a video data stream having encoded thereinto a sequence of pictures (302) using temporal prediction according to any of solutions 55 to 68, reducing the data stream to obtain a reduced video data stream having subarea-specific pictures (326) encoded thereinto which show the second picture subarea, by removal of portions video data stream having encoded thereinto a picture area of the pictures external to the second picture subarea and replacing an information (318) within the video data stream which indicates the second set of one or more pictures as subarea-specific random access points by picture type information (320) which indicates the second set of one or more pictures as picture-wise random access pictures.

100. Computer program having a program code for performing, when running on a computer, a method according to any of solutions 90 to 99.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. A method for encoding into a data stream a picture, the method comprising providing the data stream with a displacing information which indicates for a set of at least one predetermined subregion of the picture a displacement of the set of at least one predetermined subregion within a target picture area relative to an undisplaced copying of the set of at least one predetermined subregion into the target picture area, wherein the displacing information comprises
a count of the predetermined subregions within the set of at least one predetermined subregions of the picture;
a size parameter defining a size of the target picture area, and
for each predetermined subregion of the set of at least one predetermined subregion of the picture, an indication of
a displacement of the respective predetermined subregion of the picture within an target picture area, and
a scaling of the respective subregion within the target picture area that results in a magnification or demagnification relative to the respective subregion,
so that each of the predetermined subregions of the set of at least one predetermined subregions of the picture within the target picture is displaceable and scalable according to the indication, wherein the method comprises providing the data stream further with a default filling information which indicates a default filling using which a portion of the target picture area is to be filled which is not covered, according to the displacement of the set of at least one predetermined subregion as indicated by the displacing information, by any of the set of at least one predetermined subregion.

2. A non-transitory digital storage medium storing a data stream having a picture encoded thereinto, the data stream comprising displacing information which indicates for a set of at least one predetermined subregion of the picture a displacement of the set of at least one predetermined subregion within a target picture area, wherein the displacing information comprises
a count of the predetermined subregions within the set of at least one predetermined subregions of the picture;
size parameters defining a size of the target picture area, and
for each predetermined subregion of the set of at least one predetermined subregion of the picture, an indication of
a displacement of the respective predetermined subregion of the picture within an target picture area, and
a scaling of the respective subregion within the target picture area that results in a magnification or demagnification relative to the respective subregion,
so that each of the predetermined subregions of the set of at least one predetermined subregions of the picture within the target picture is displaceable and scalable according to the indication, wherein the data stream further comprises a default filling information which indicates a default filling using which a portion of the target picture area is to be filled which is not covered by any of the set of at least one predetermined subregion of the picture displaced according to the displacing information.

* * * * *